United States Patent [19]
Yoda et al.

[11] Patent Number: 6,046,891
[45] Date of Patent: Apr. 4, 2000

[54] THIN FILM HEAD

[75] Inventors: Hiroaki Yoda, Kawasaki; Yuichi Ohsawa, Yokohama; Kohichi Tateyama, Ichikawa; Reiko Kondoh; Toshihiko Ohta, both of Yokohama; Junichi Akiyama, Kawasaki; Hitoshi Iwasaki, Yokohama, all of Japan

[73] Assignee: Kabushiki Kaisha Toshiba, Kawasaki, Japan

[21] Appl. No.: 09/022,120

[22] Filed: Feb. 11, 1998

Related U.S. Application Data

[63] Continuation of application No. 08/848,733, May 22, 1997, Pat. No. 5,905,611, which is a continuation of application No. 08/520,251, Aug. 28, 1995, abandoned, which is a continuation of application No. 08/159,198, Nov. 30, 1993, abandoned.

[30]      Foreign Application Priority Data

Nov. 30, 1992  [JP]  Japan ..................................... 4-320633
Mar. 15, 1993  [JP]  Japan ..................................... 5-080161

[51] Int. Cl.$^7$ .................................................. G11B 5/127
[52] U.S. Cl. ............................................................ 360/113
[58] Field of Search ............................. 360/113; 324/252

[56]                 References Cited

U.S. PATENT DOCUMENTS

| | | |
|---|---|---|
| 4,949,039 | 8/1990 | Gruenberg . |
| 5,287,238 | 2/1994 | Baumgart et al. . |
| 5,301,079 | 4/1994 | Cain et al. . |
| 5,304,975 | 4/1994 | Saito et al. . |
| 5,617,071 | 4/1997 | Daughton ................................ 324/252 |
| 5,715,120 | 2/1998 | Gill ......................................... 360/113 |
| 5,715,121 | 2/1998 | Sakakima et al. ...................... 360/113 |
| 5,737,157 | 4/1998 | Gill ......................................... 360/113 |
| 5,739,988 | 4/1998 | Gill ......................................... 360/113 |
| 5,768,066 | 6/1998 | Akiyama et al. ....................... 360/113 |
| 5,768,069 | 6/1998 | Mauri ..................................... 360/113 |
| 5,793,576 | 8/1998 | Gill ......................................... 360/113 |

FOREIGN PATENT DOCUMENTS

| | | |
|---|---|---|
| 62-120616 | 6/1987 | Japan . |
| 4358310 | 12/1992 | Japan . |

OTHER PUBLICATIONS

Physical Review Letters, vol. 44, No. 23 Jun. 10, 1991 W.P. Pratt, Jr., et al. Perpendicular Giant Magnetoresistance of Ag/Co Multilayers; pp. 3060–3063.

IEEE Transactions on Magnetics, vol. 24, No. 3; May 1988 John C. Slowczewski, et al. "Micromagnetics of Laminated Permalloy Films"; pp. 2045–2054.

Journal of the Magnetics Society of Japan vol. 15, No. 5; 1991; H. Yamamoto, et al, "Magnetorsistance of Multilayers"; pp. 813–821.

*Primary Examiner*—Allen T. Cao
*Attorney, Agent, or Firm*—Oblon, Spivak, McClelland, Maier & Neustadt, P.C.

[57]                 ABSTRACT

The present invention provides a thin film head having a magnetoresistance effect element which includes at least two magnetic films, a nonmagnetic film sandwiched between the magnetic films, and leads connected to the magnetoresistance effect element wherein the width of one of the magnetic films, which essentially responds to a signal magnetic field, is not more than a distance between leads. The present invention provides a thin film head having a magnetoresistance effect element which includes at least two magnetic films and a nonmagnetic film sandwiched between the magnetic films, which makes use of a change in magnetic resistance caused by spin-dependent scattering, wherein at least a portion of one magnetic films, which essentially respond to a signal magnetic field, extends in a direction same as that of the signal magnetic field.

22 Claims, 56 Drawing Sheets

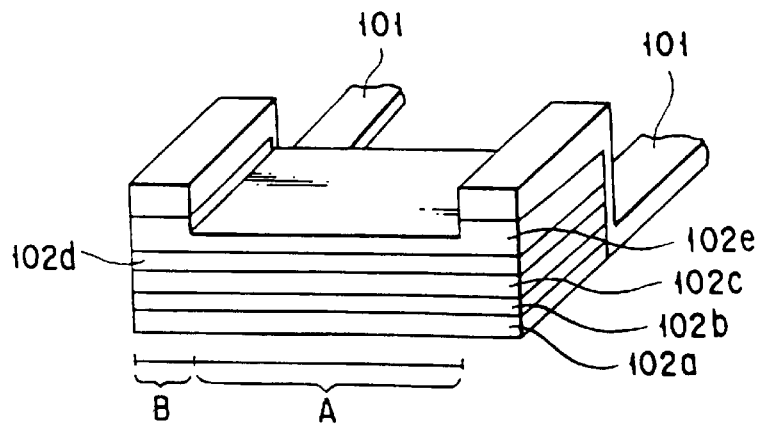
PRIOR ART  FIG. 1
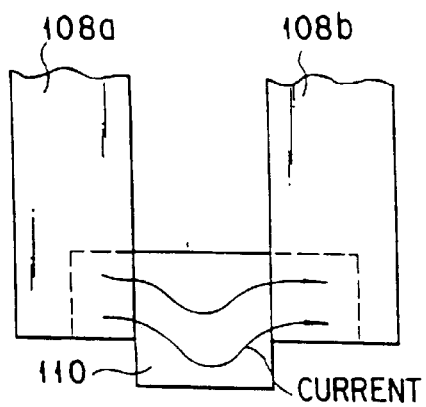
FIG. 2A
PRIOR ART
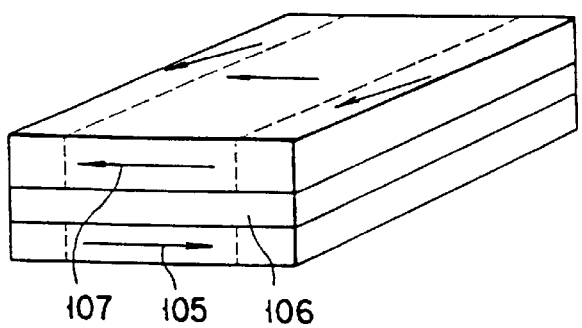
FIG. 2C
PRIOR ART
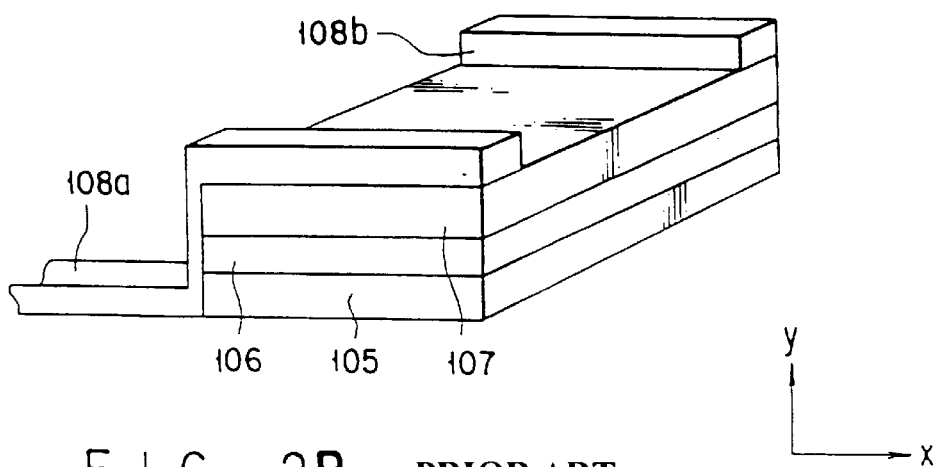
FIG. 2B  PRIOR ART

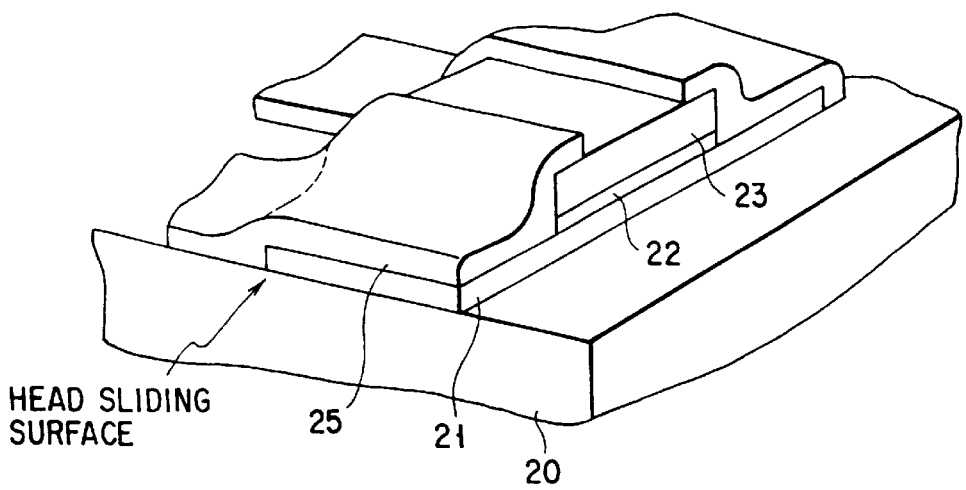
HEAD SLIDING SURFACE
F I G. 17
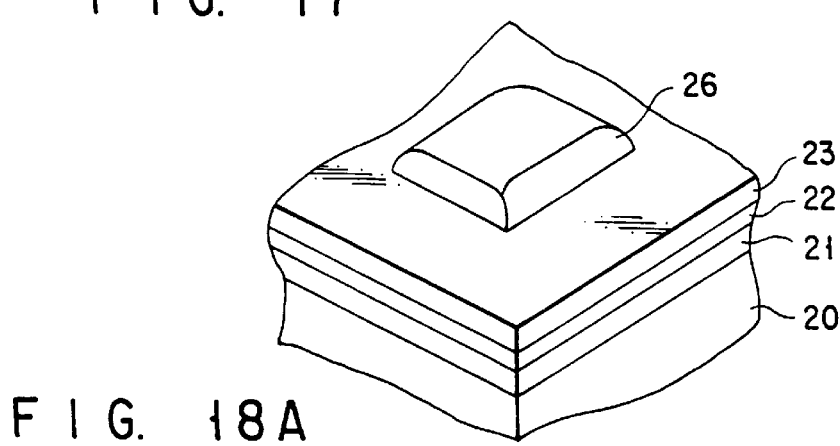
F I G. 18A
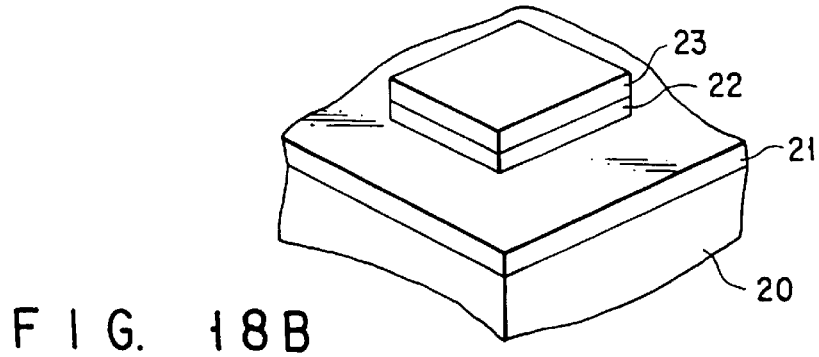
F I G. 18B
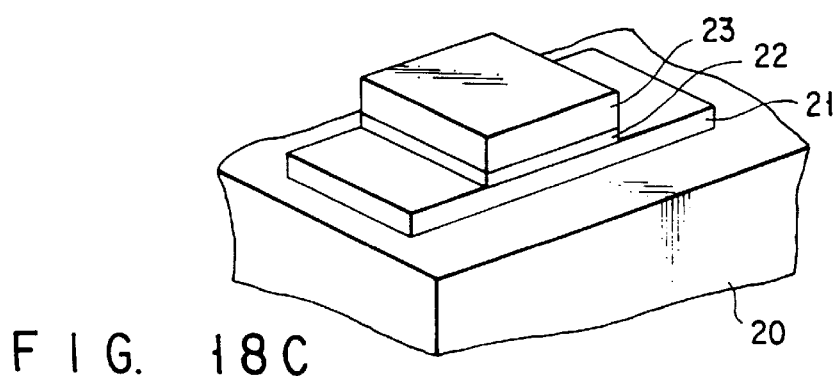
F I G. 18C

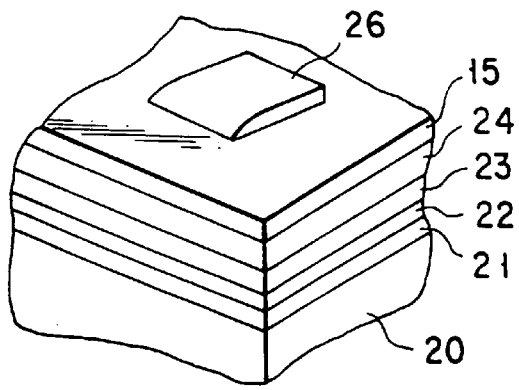
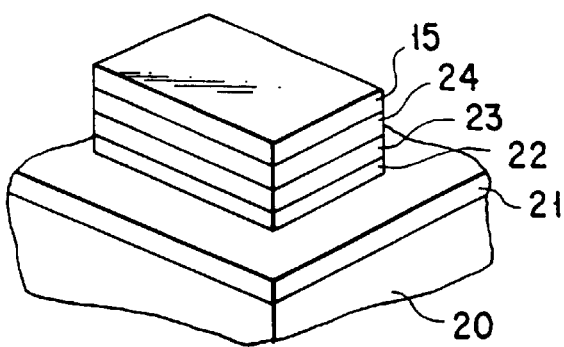
FIG. 22A  FIG. 22B
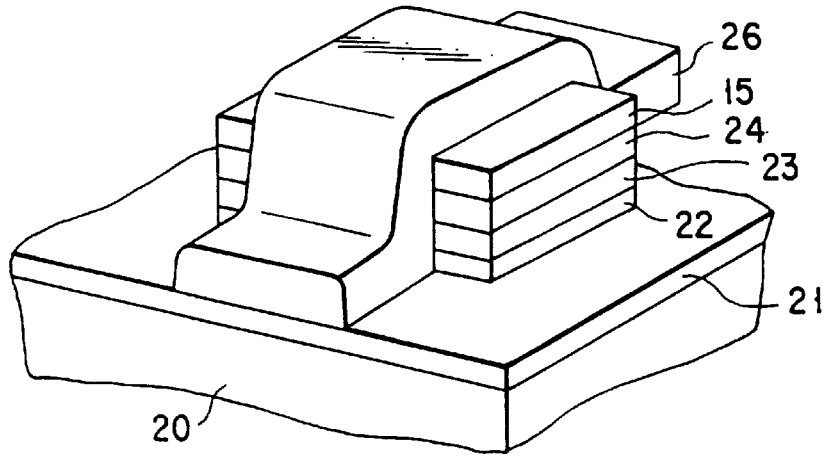
FIG. 22C
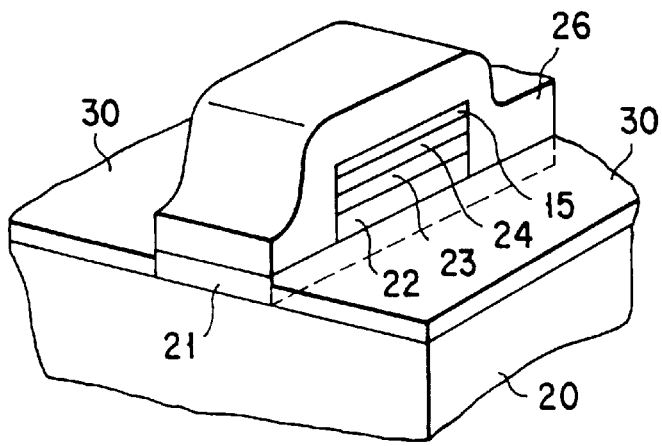
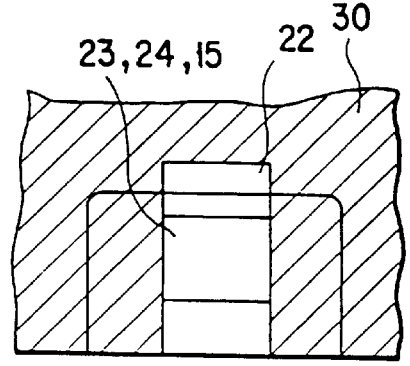
FIG. 22D  FIG. 22E

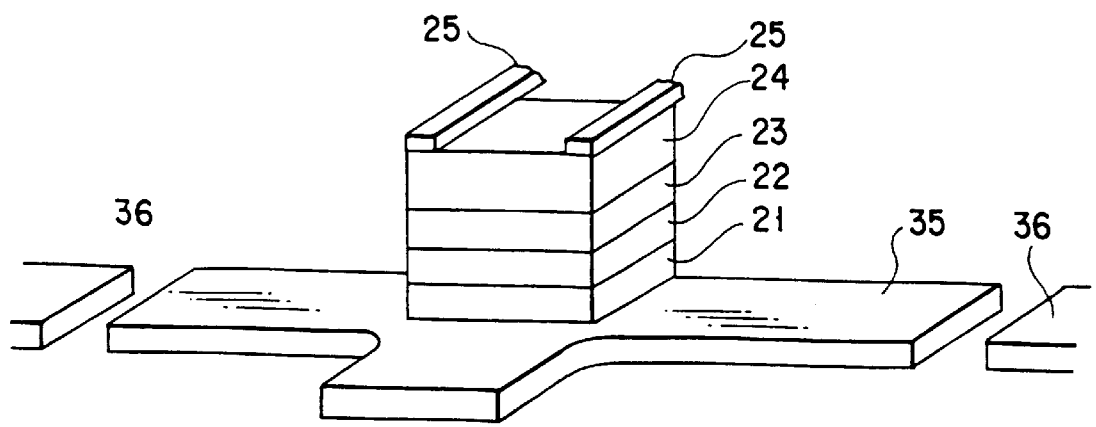
F I G. 27A
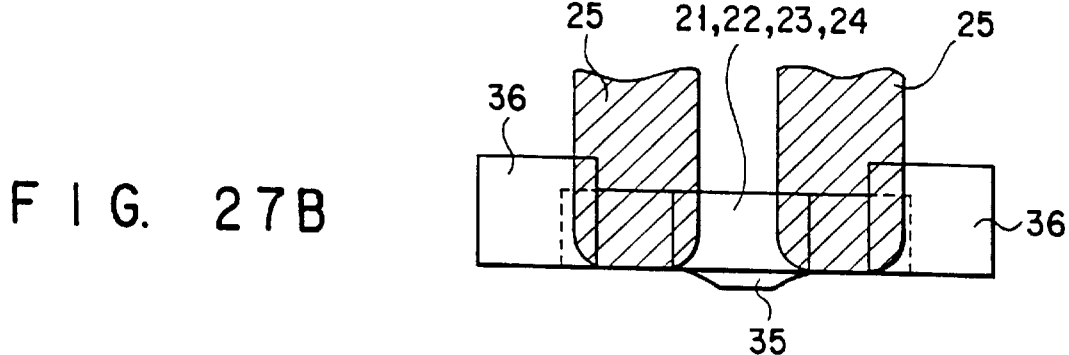
F I G. 27B
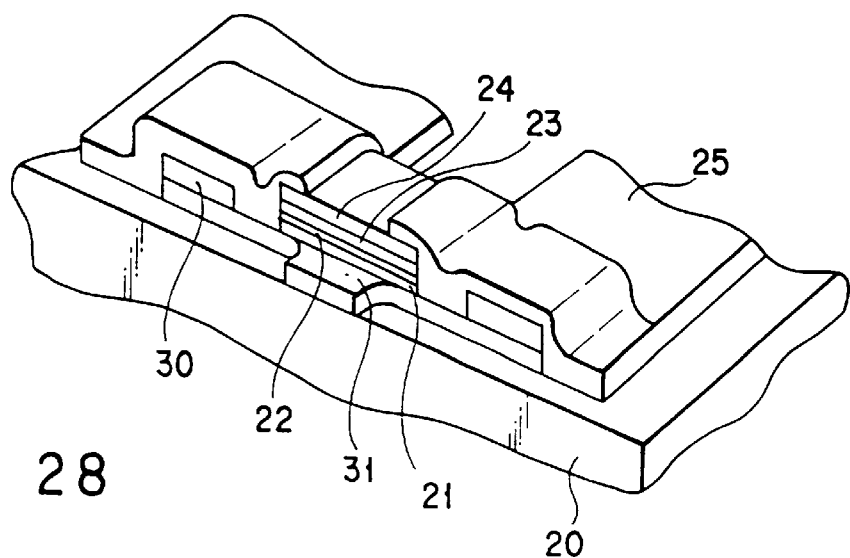
F I G. 28

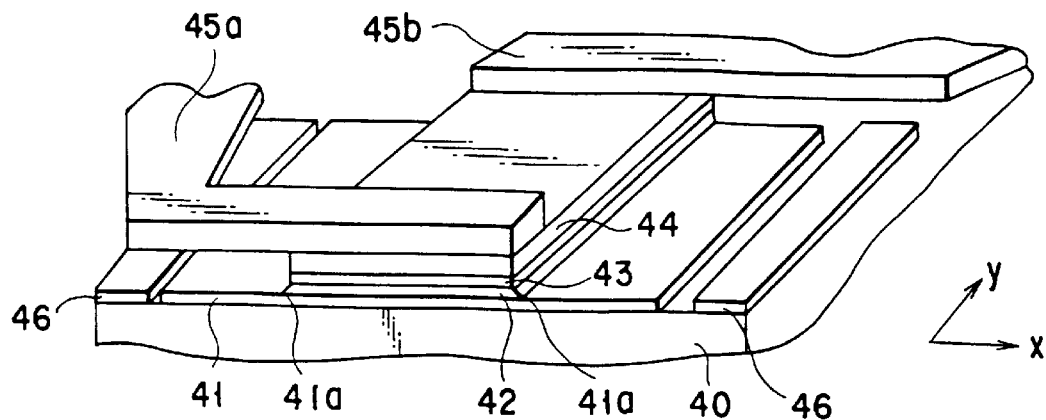
F I G. 36
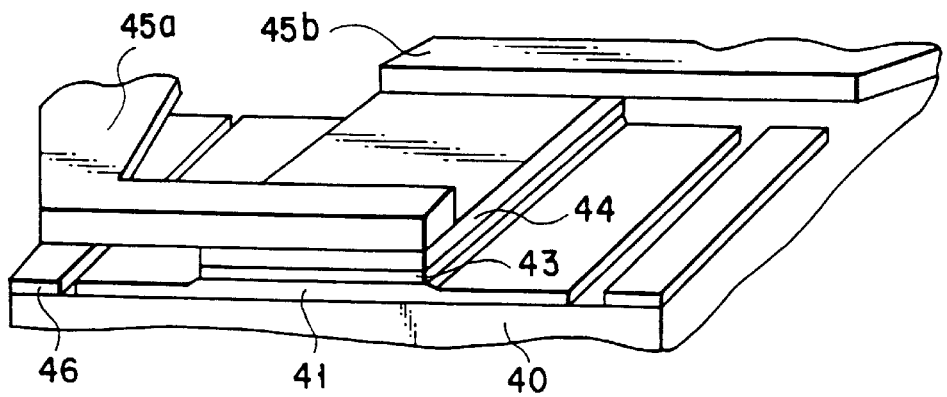
F I G. 37
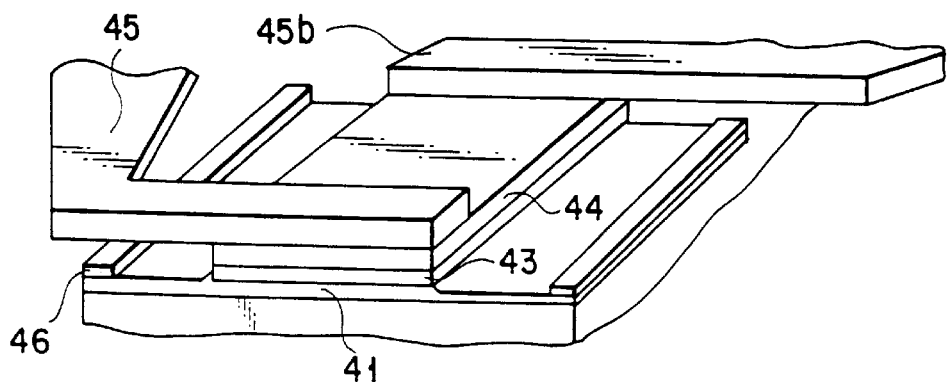
F I G. 38

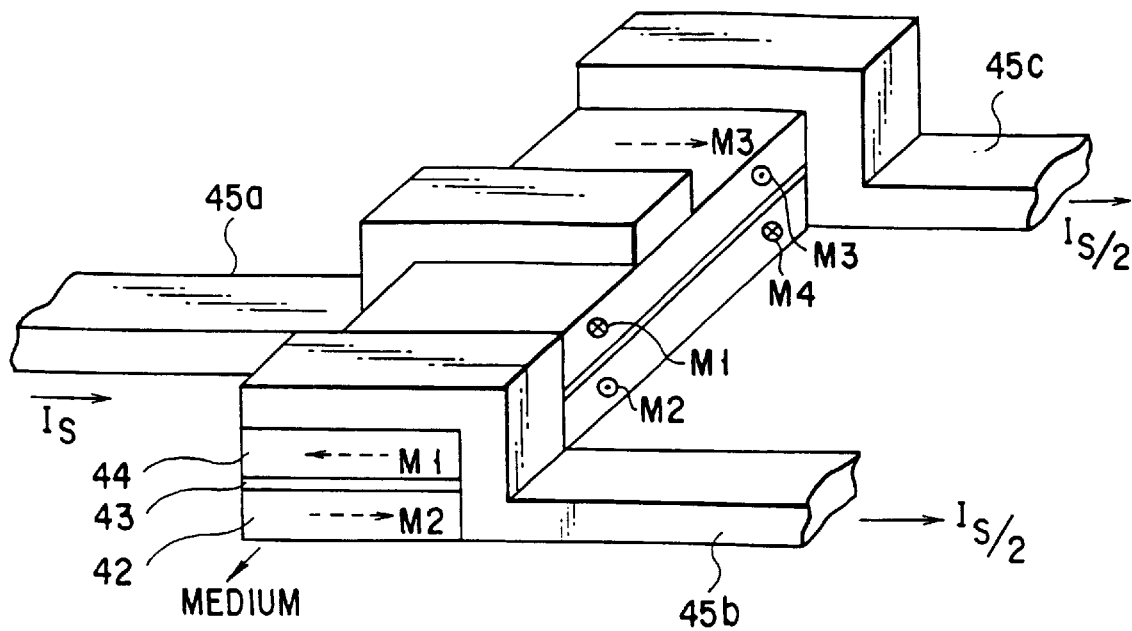
F I G. 41
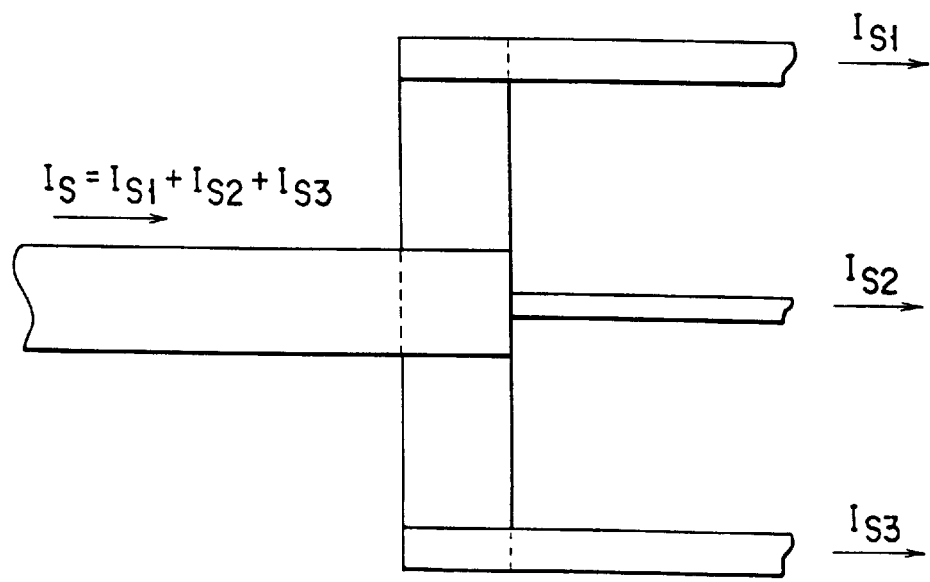
F I G. 42

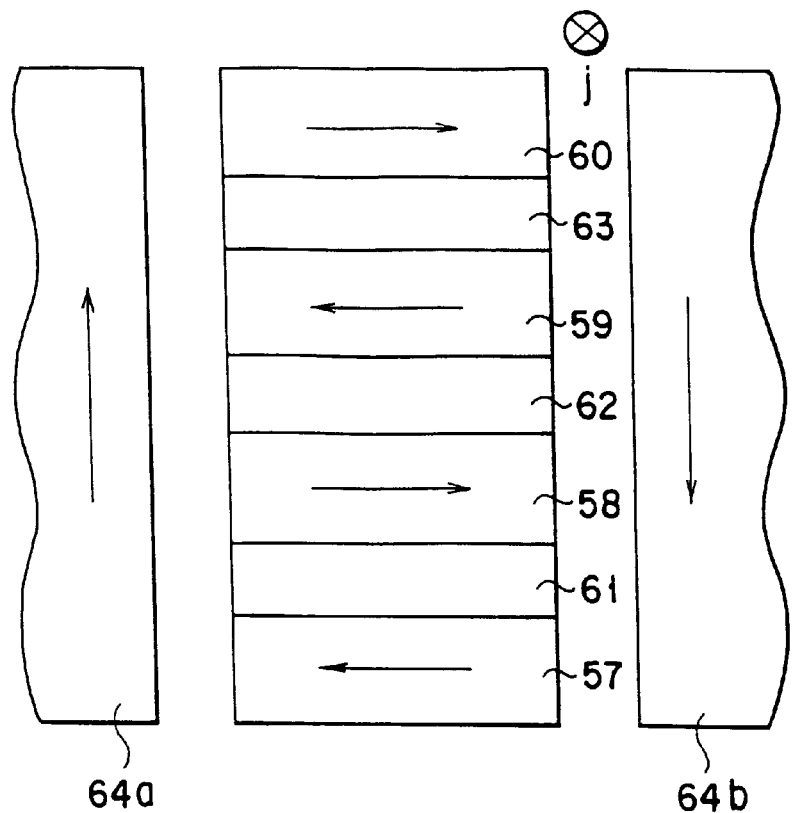
F I G. 50
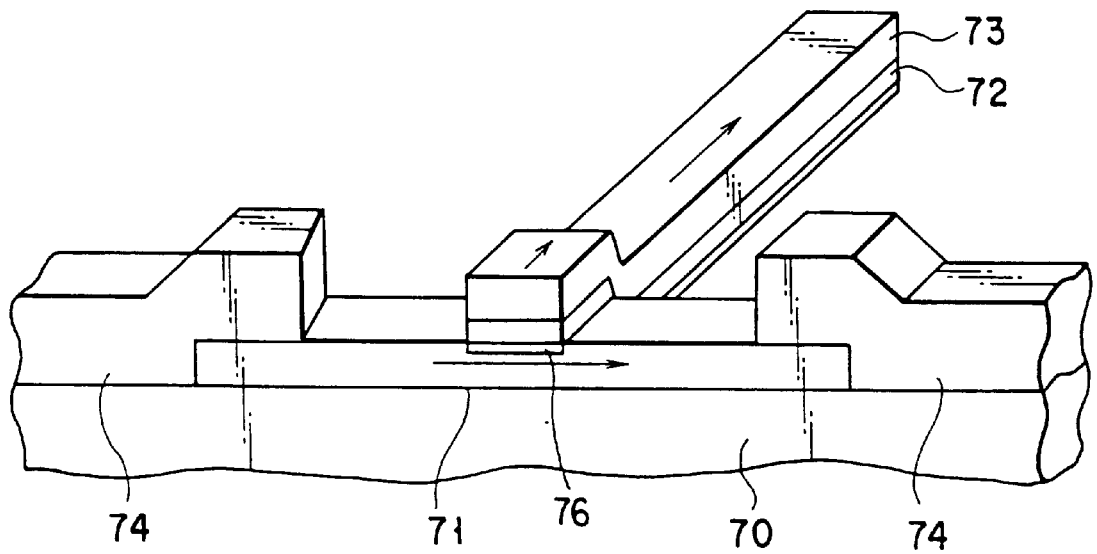
F I G. 51

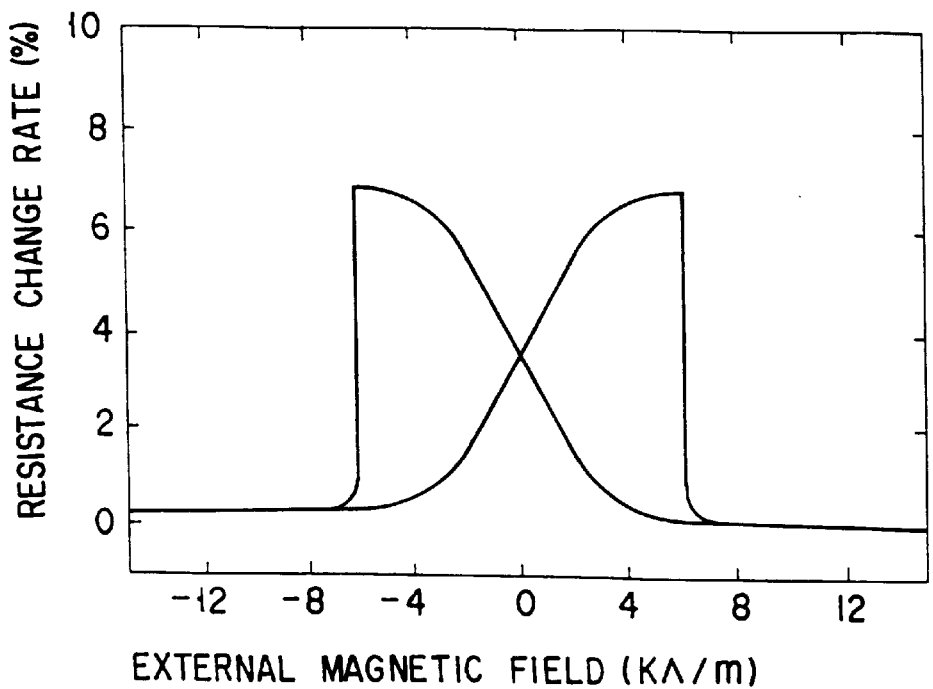
F I G. 52
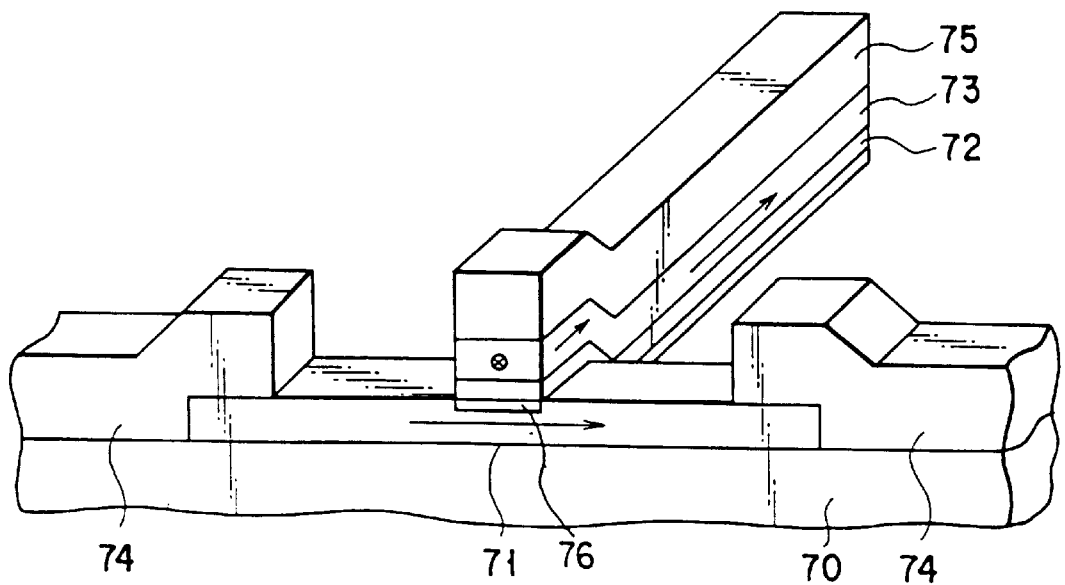
F I G. 53

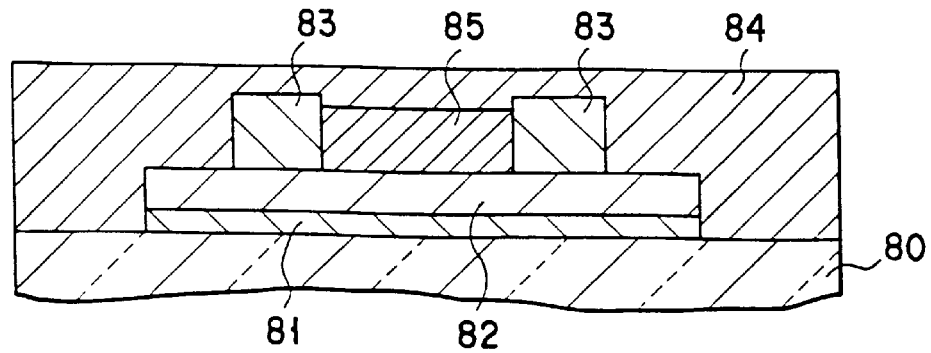
F I G. 57
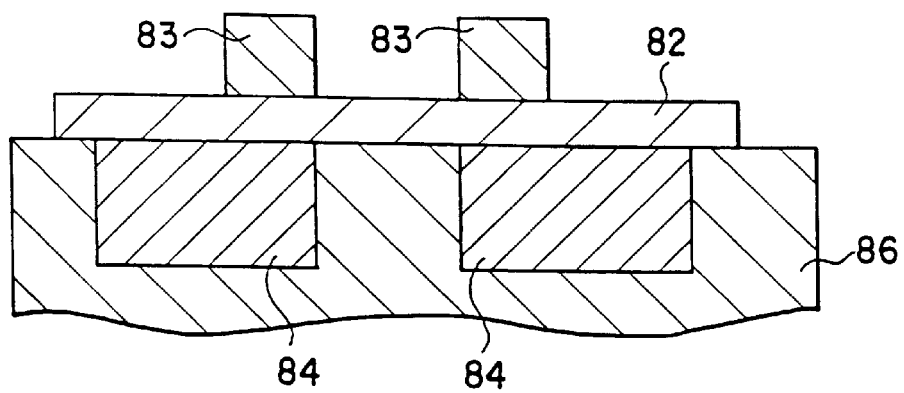
F I G. 58
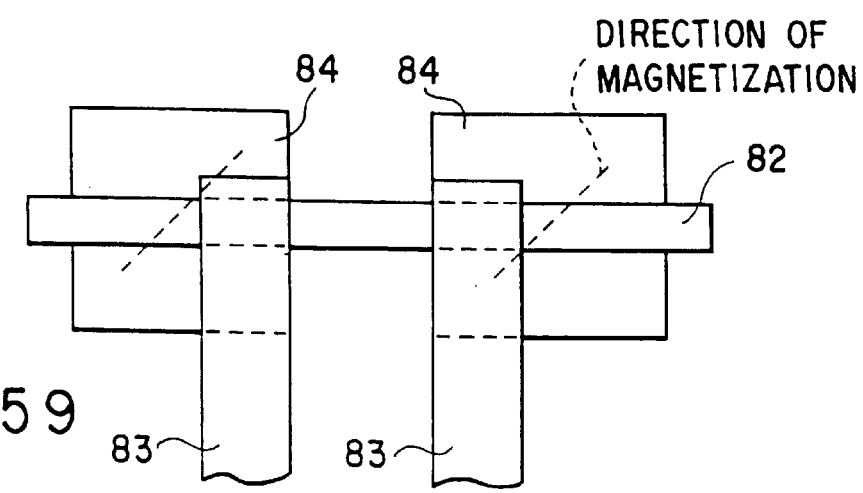
F I G. 59

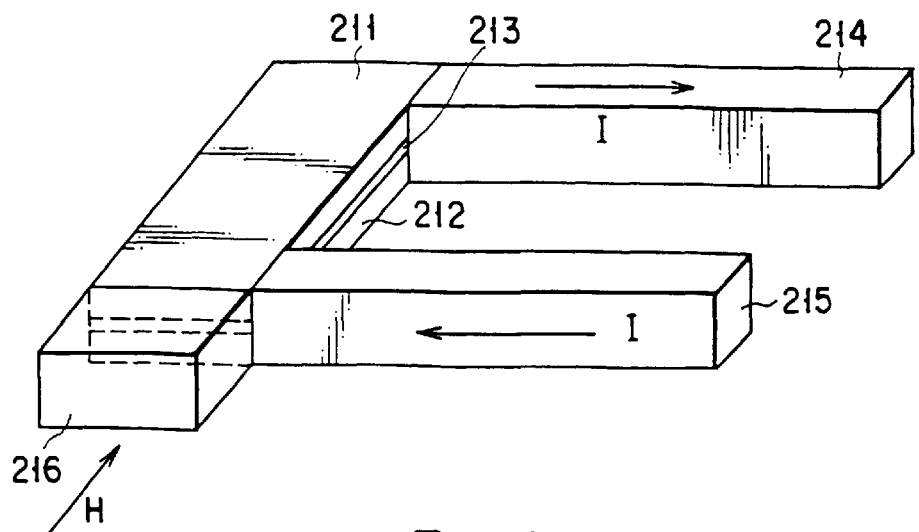
F I G. 64A
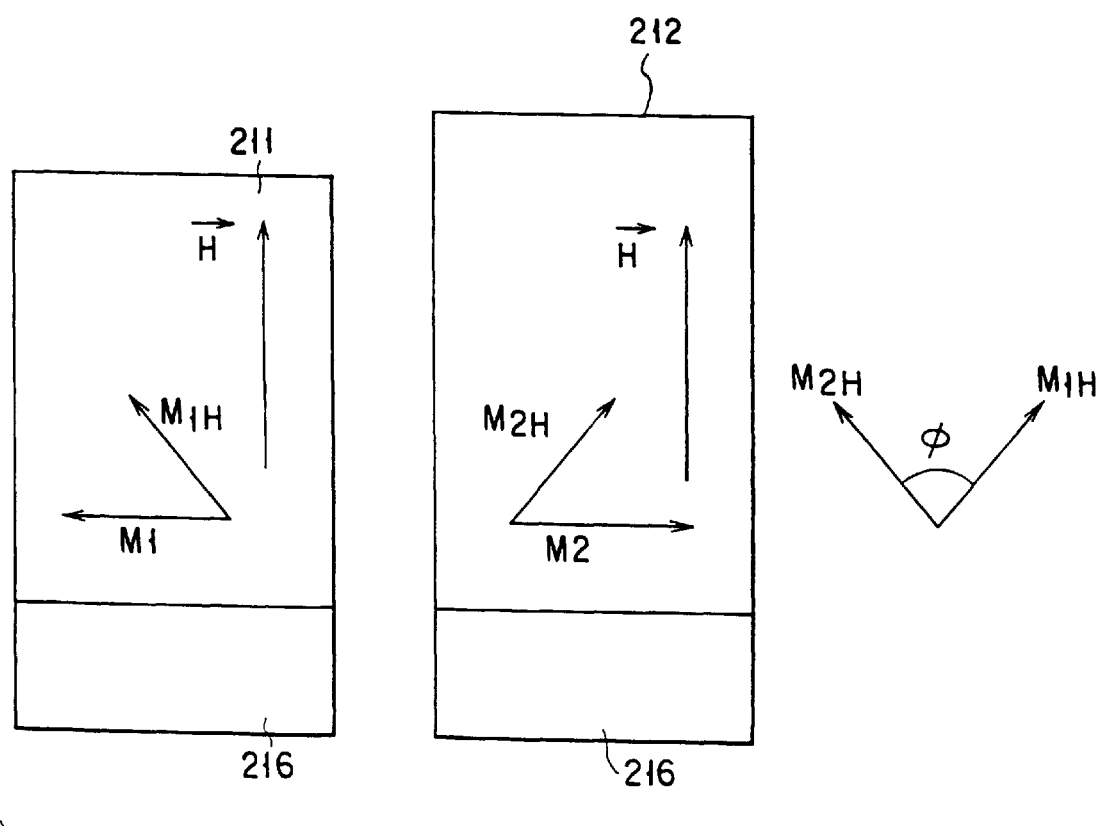
F I G. 64B

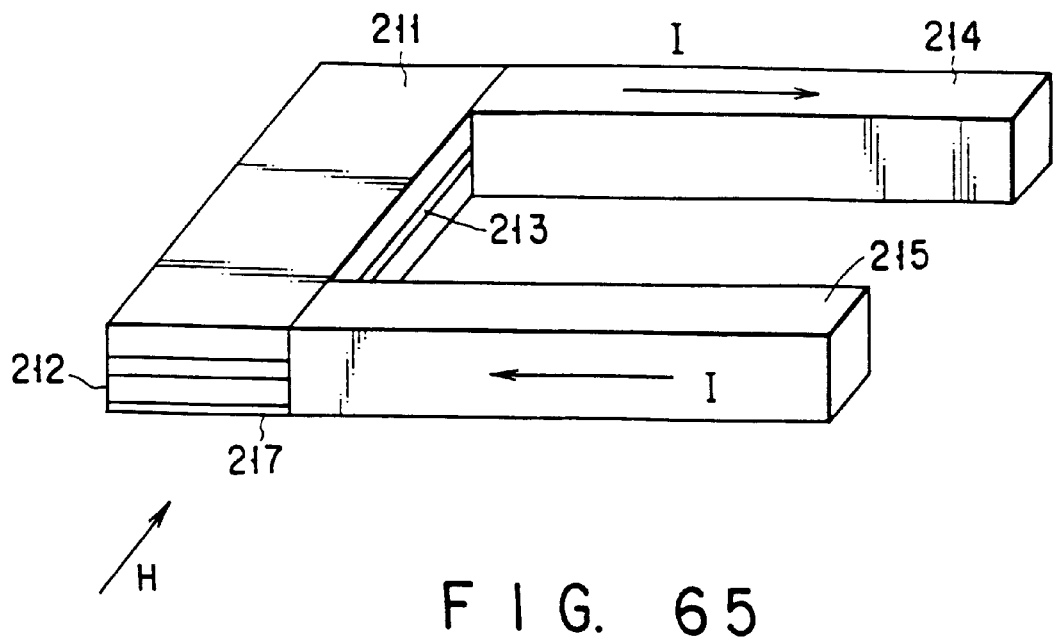
F I G. 65
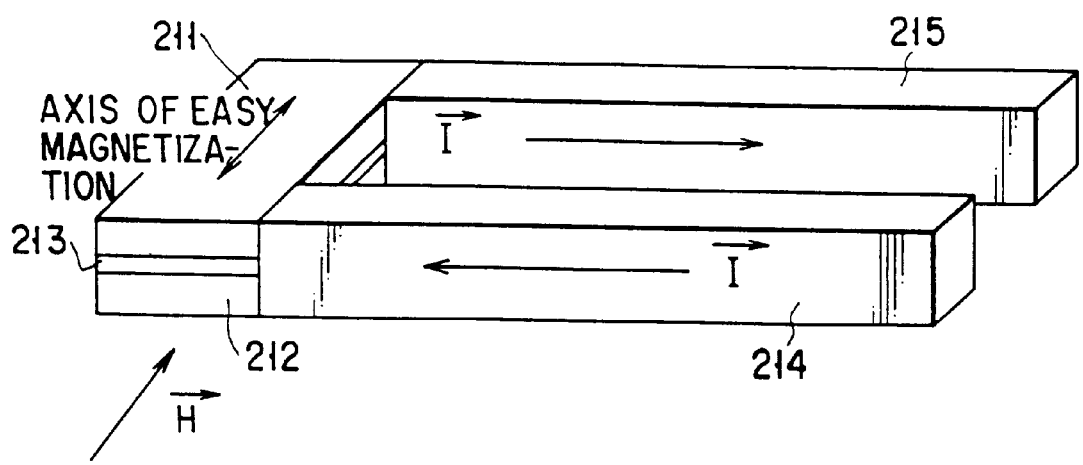
F I G. 66A

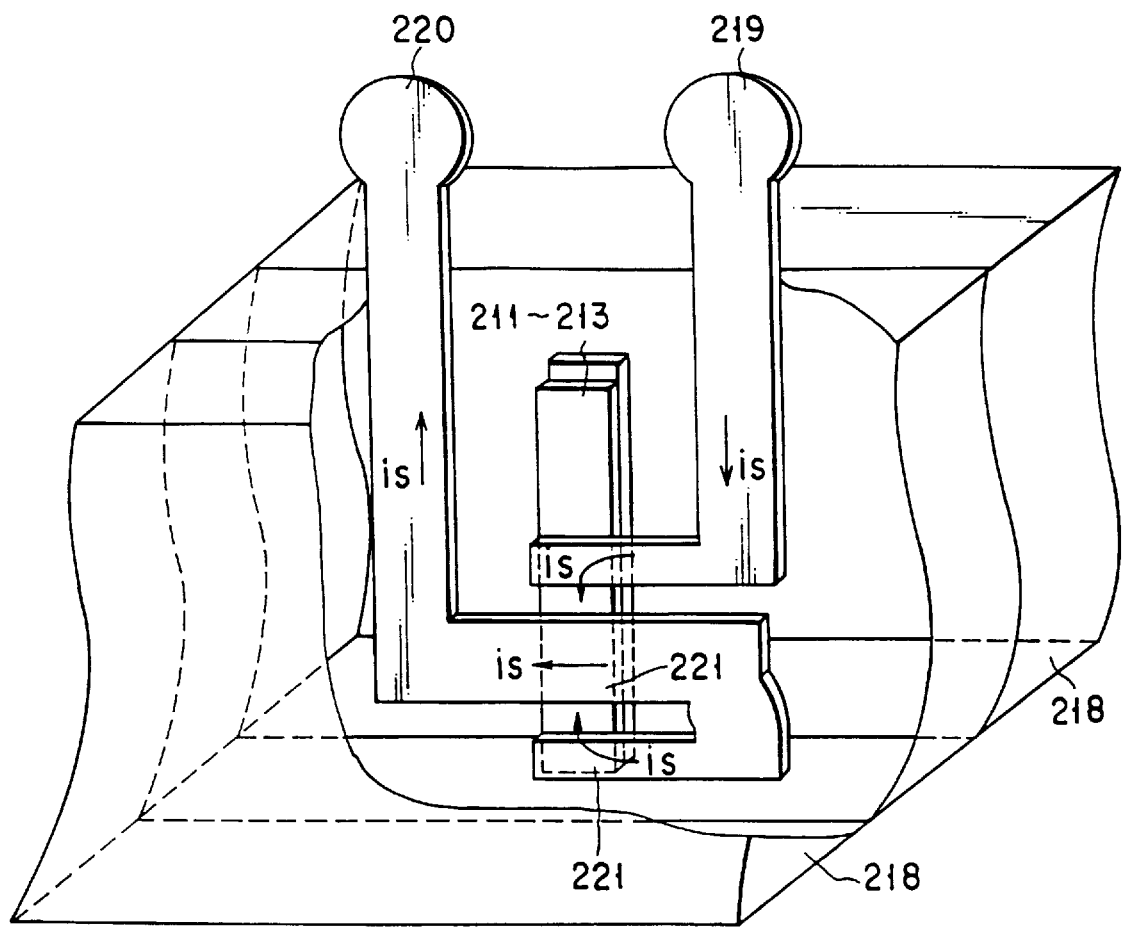
F I G. 67

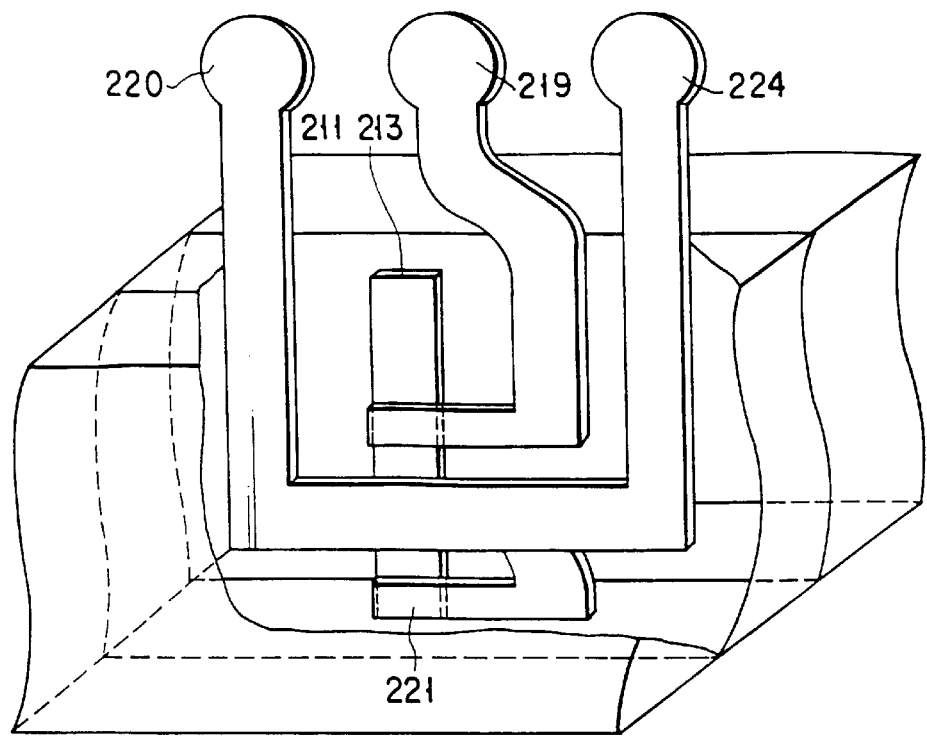
F I G. 69
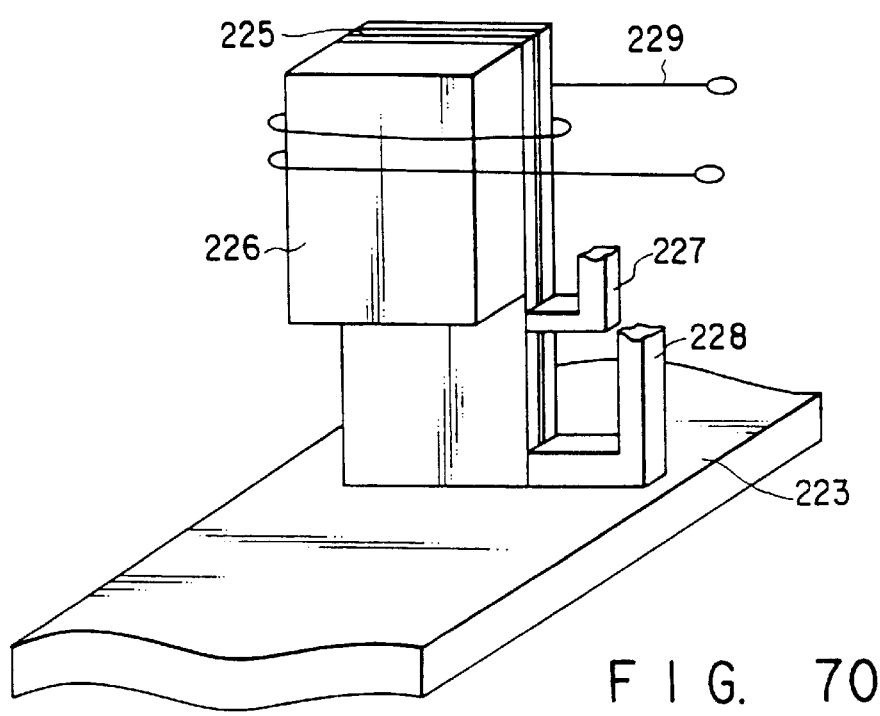
F I G. 70

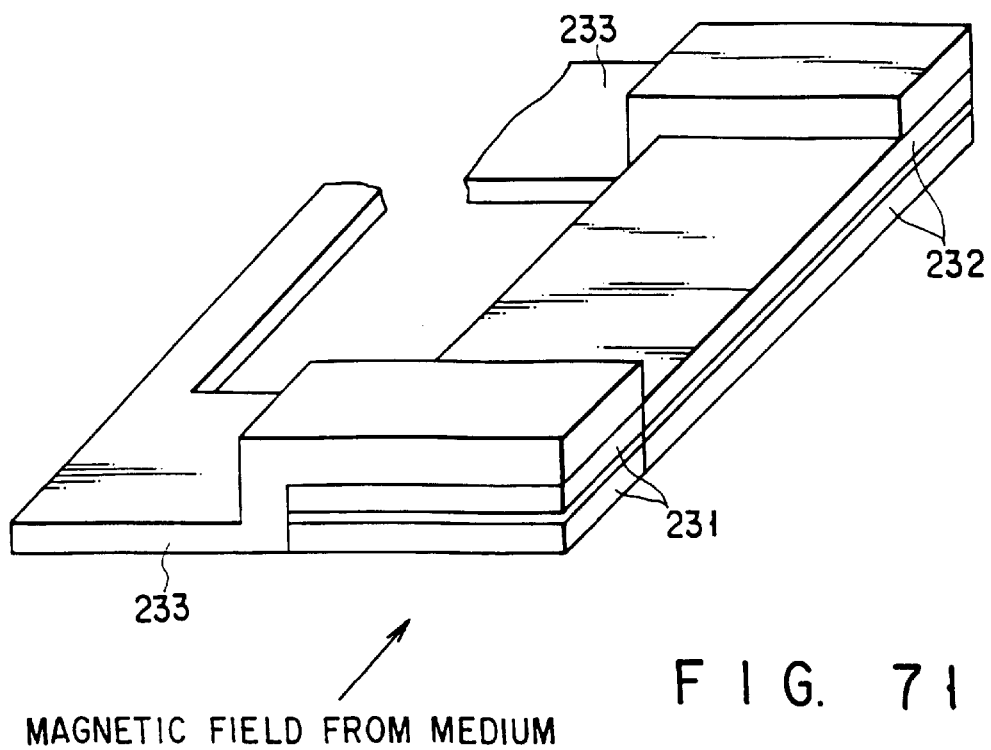
MAGNETIC FIELD FROM MEDIUM
F I G. 71
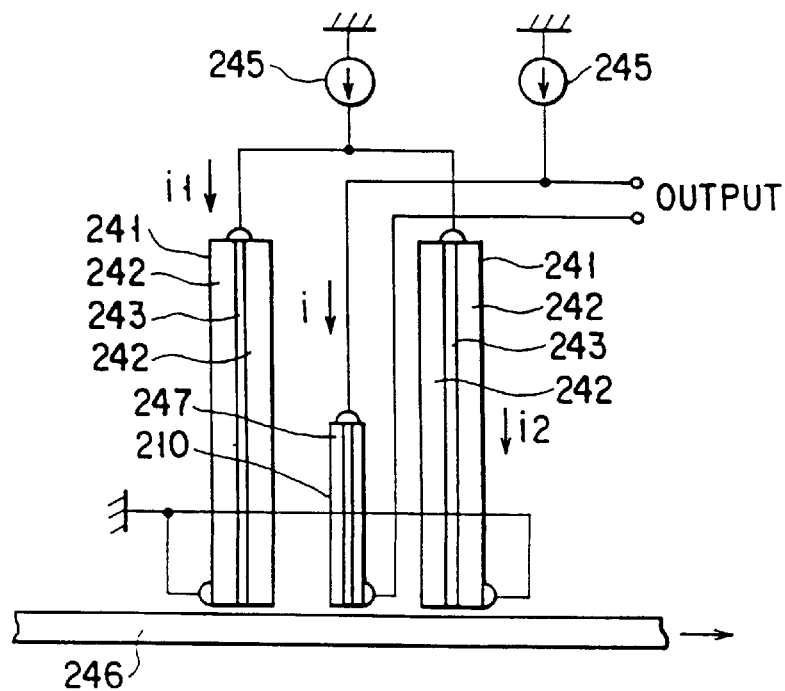
F I G. 72

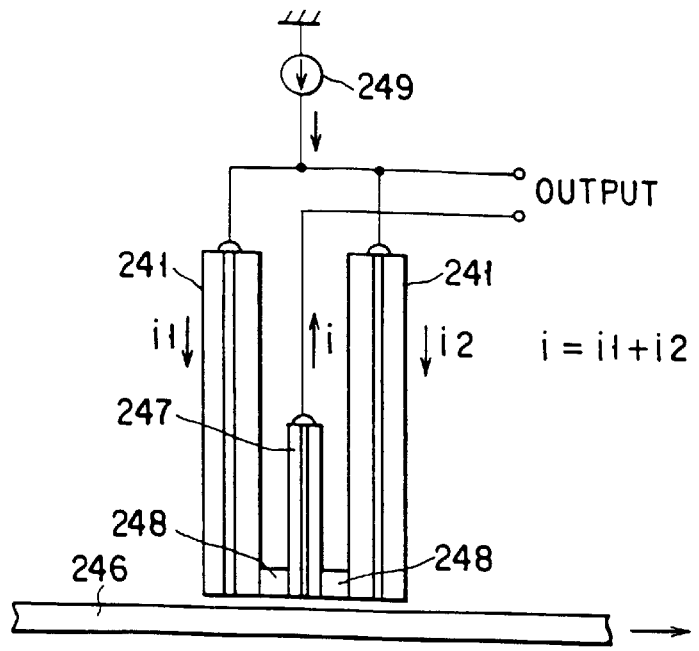
F I G. 73
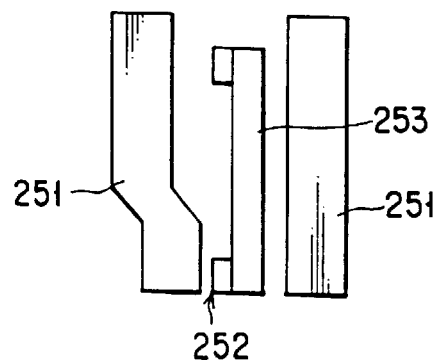
F I G. 74
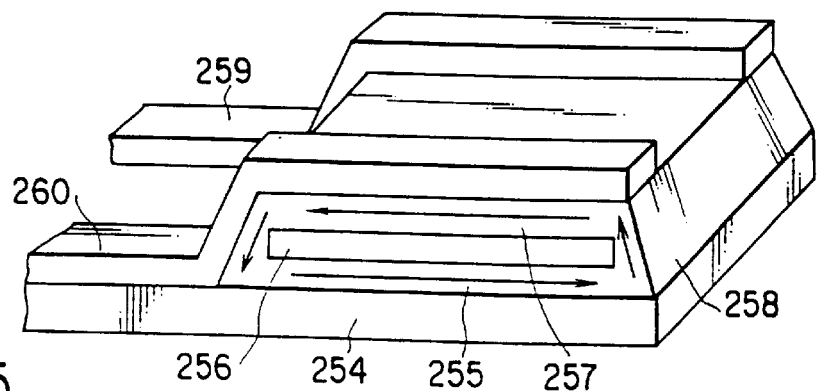
F I G. 75

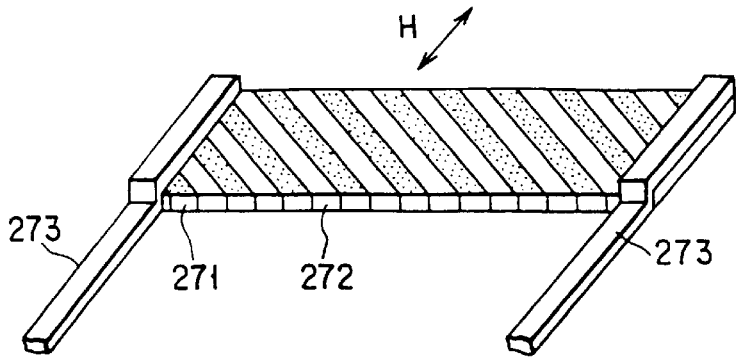
F I G. 84
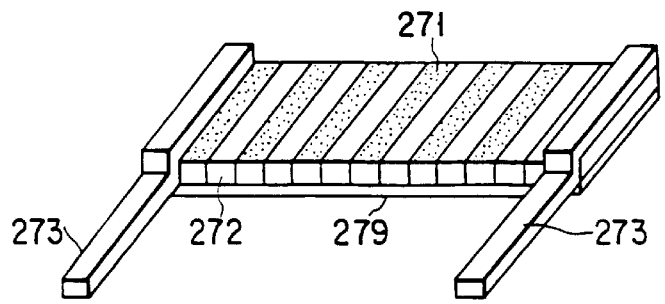
F I G. 85
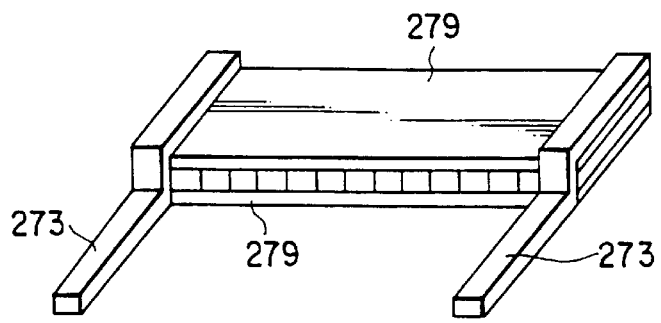
F I G. 86
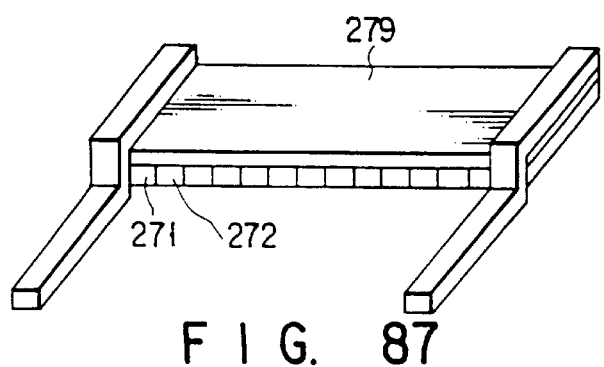
F I G. 87

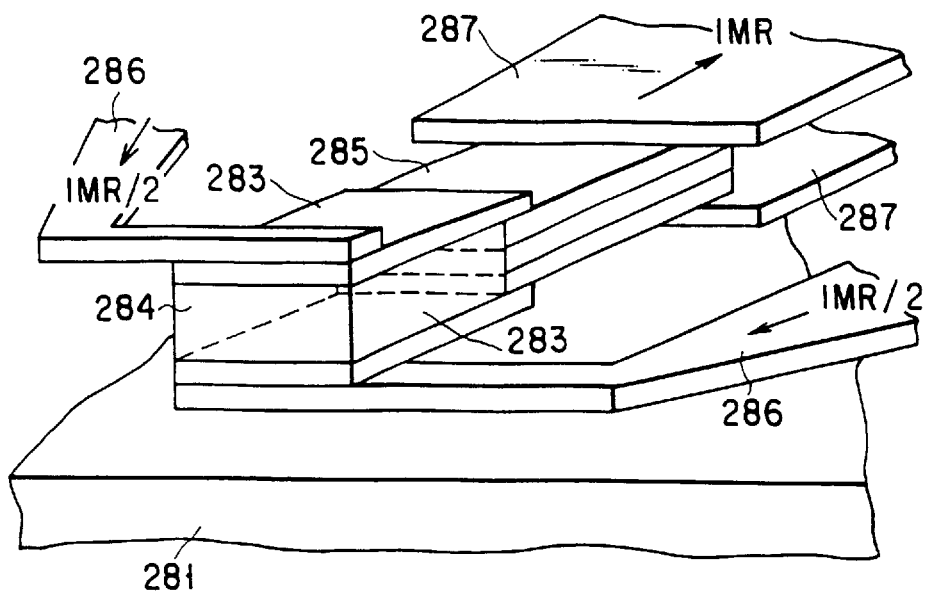
F I G. 91
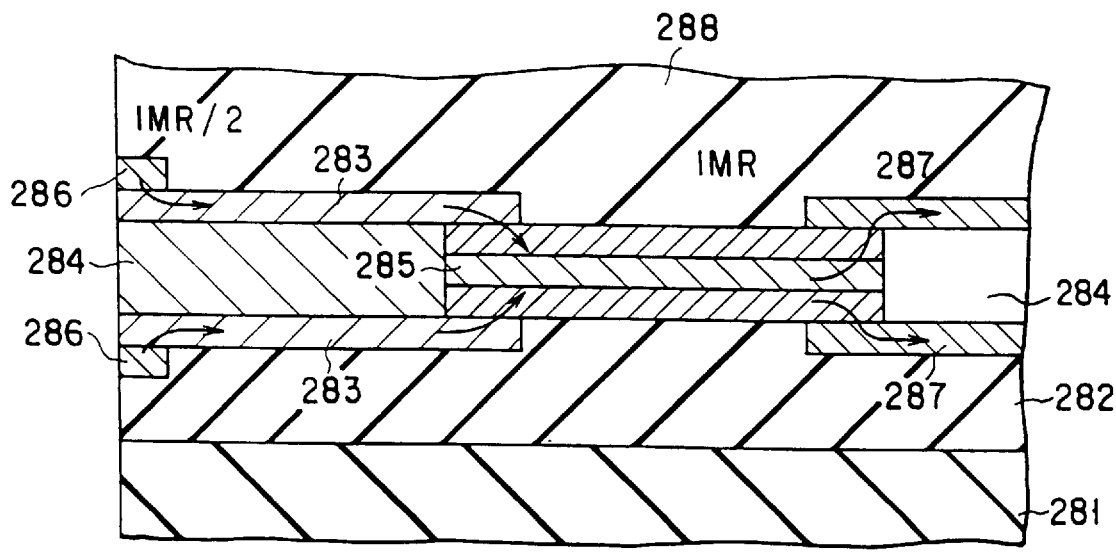
F I G. 92

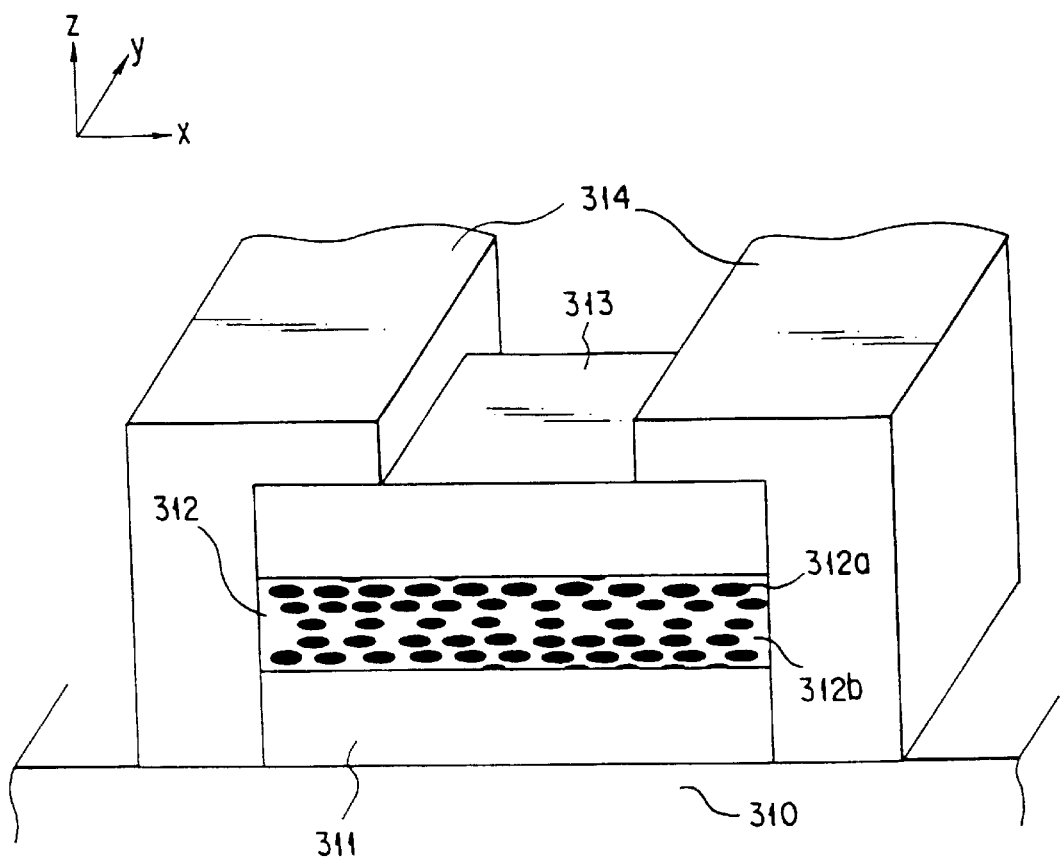
F I G. 95

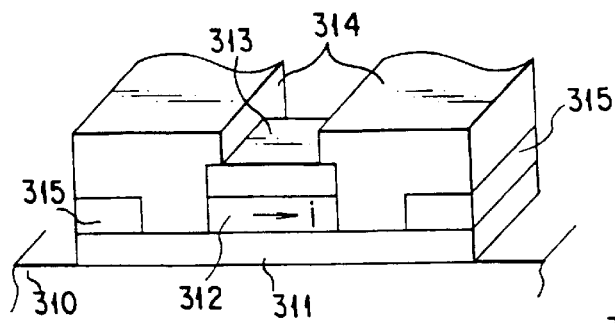
F I G. 96A
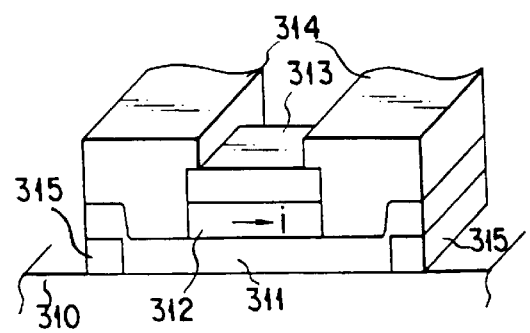
F I G. 96B
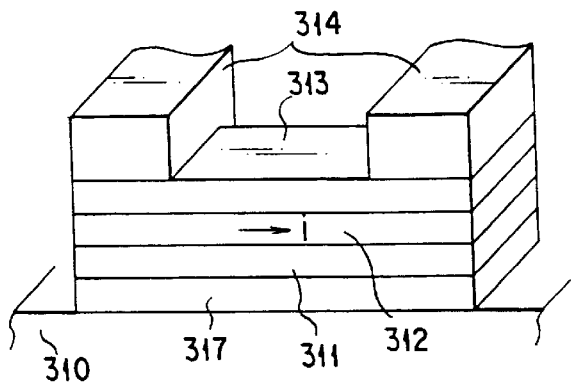
F I G. 96C
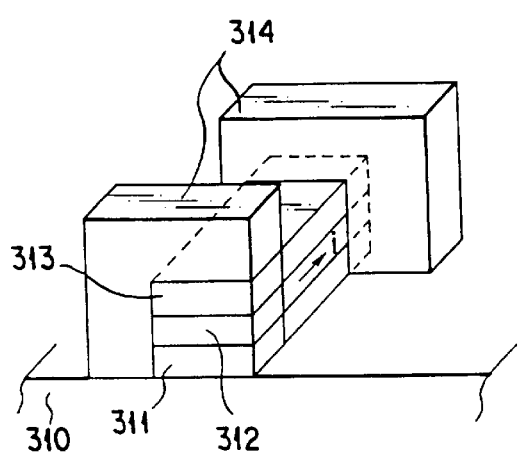
F I G. 96D
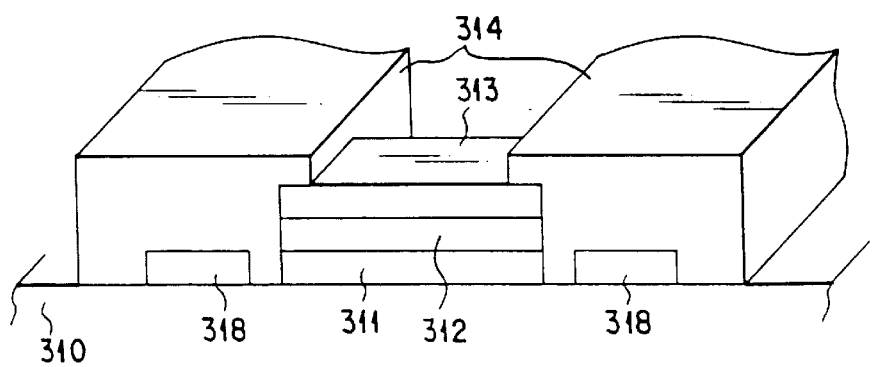
F I G. 96E

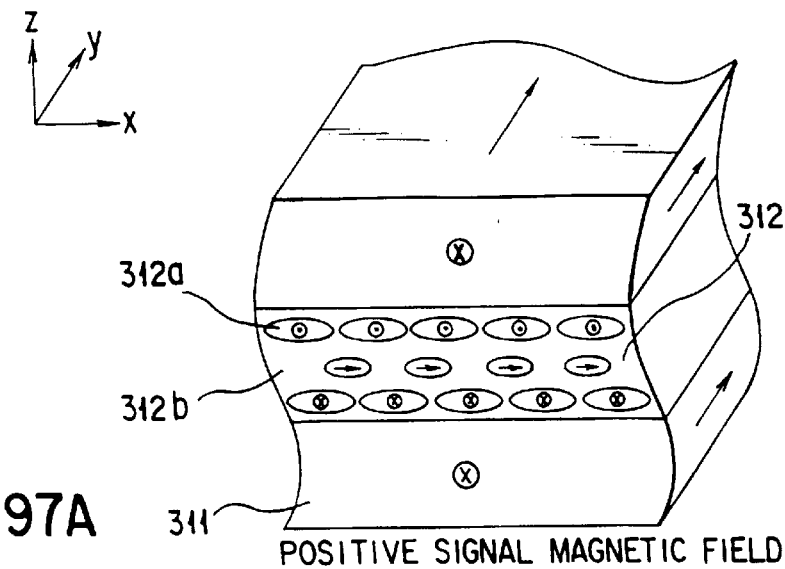
FIG. 97A  POSITIVE SIGNAL MAGNETIC FIELD
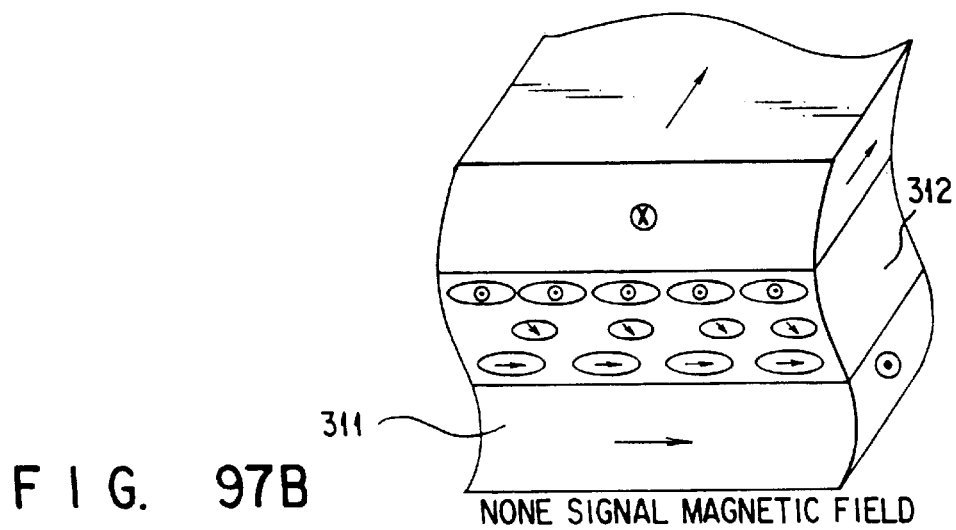
FIG. 97B  NONE SIGNAL MAGNETIC FIELD
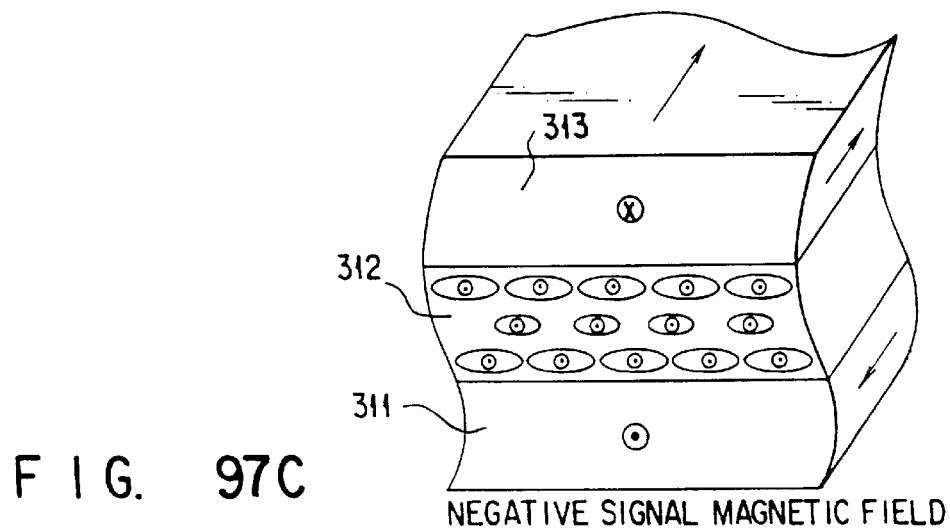
FIG. 97C  NEGATIVE SIGNAL MAGNETIC FIELD

OPERATING POINT BIAS

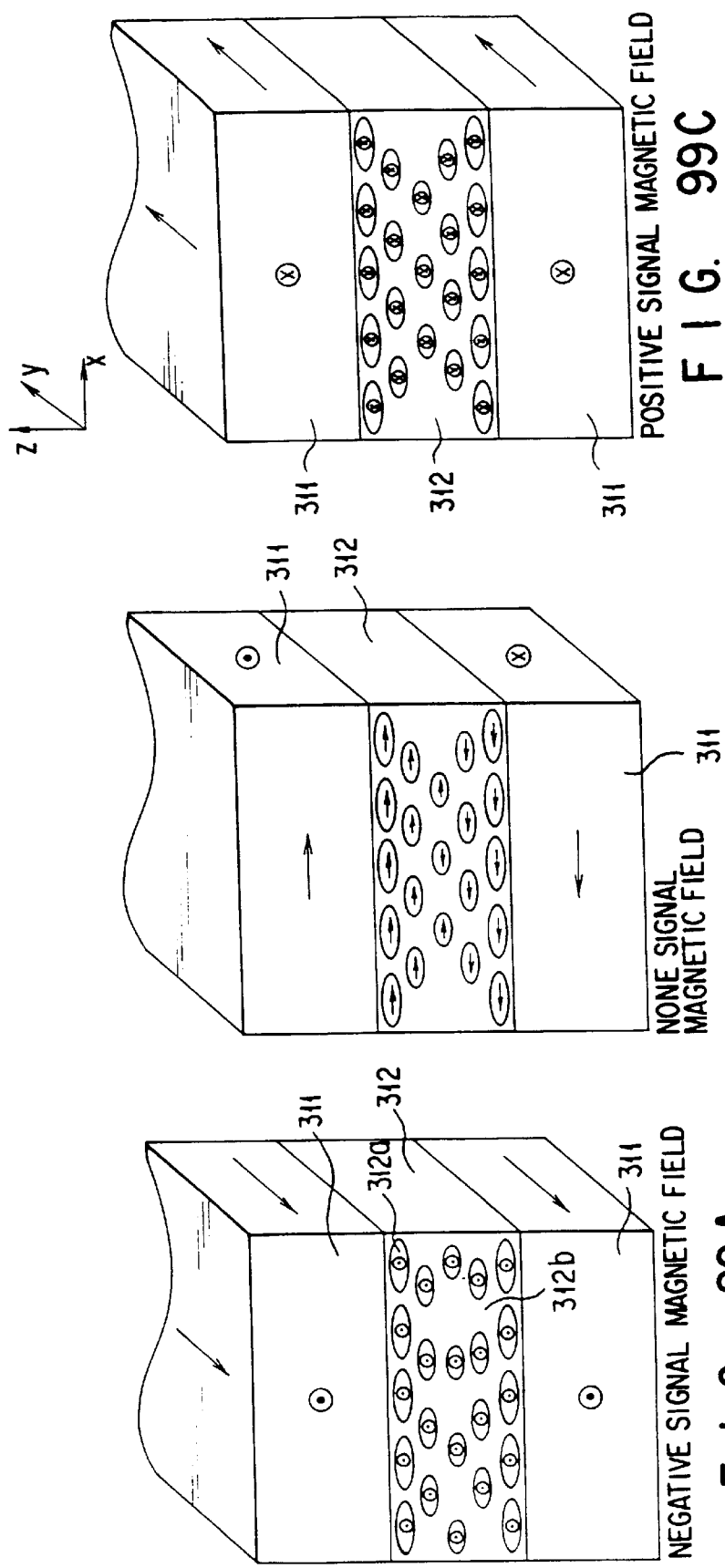

THIN FILM HEAD

This application is a Continuation of application Ser. No. 08/848,733, filed on May 22, 1997, now U.S. Pat. No. 5,905,611; which is a Continuation of application Ser. No. 08/520,251, filed Aug. 28, 1995, now abandoned; which is a Continuation of application Ser. No. 08/159,198, filed on Nov. 30, 1993, now abandoned.

BACKGROUND OF THE INVENTION

1. Field of the Invention

The present invention relates to a thin film head to be used as a head of a magnetic recording/reproducing apparatus.

2. Description of the Related Art

Recently, as the density of magnetic recording has increased more and more, systems with a high recording density of 500 Mb/inch$^2$, as a VTR, and 200 Mb/inch$^2$, as an HDD, have been put into practical use. These systems primarily make use of an induction type magnetic head. In recent years, however, a thin film head is beginning to be used in place of the induction type magnetic head not only in systems for reproducing fixed head type tape media but in compact HDDs with a low relative velocity of several meters/sec, since the magnetoresistance effect head has a high S/N ratio.

Recently, it is known that a very large magnetic resistance change, a magnetic resistance change of a maximum of larger than 100%, appears in a multilayered film, the first example is an artificial lattice film which is formed by stacking ferromagnetic films and nonmagnetic films, such as Fe/Cr or Co/Cu, under certain conditions (Phys. Rev. Lett., Vol. 61, 2472 (1988), Phys. Rev. Lett., Vol. 64, 2304 (1990)). It is also reported that the rate of change in magnetic resistance varies periodically when the thickness of the nonmagnetic film is changed. It is explained that this change is brought about since the ferromagnetic film periodically experiences ferromagnetic coupling or antiferromagnetic coupling depending on the thickness of the nonmagnetic film. The electrical resistance of the stacked film is high in an antiferromagnetic coupled state and low in a ferromagnetic coupled state.

The second example is a system in which two types of films with different coercive forces are used, and a magnetic resistance change is realized by setting magnetizations of these two magnetic films in an antiparallel state by using the difference in coercive force (The Journal of The Japan Applied Magnetics Society, Vol. 15, No. 5, 813 (1991), a so-called Shinjo type).

The third example is a system in which an exchange bias generated by an antiferromagnetic film is applied to one of two magnetic films sandwiching a nonmagnetic film to thereby lock magnetization of that magnetic film, and magnetization of the other magnetic film is reversed by an external magnetic field. This realizes a large change in a magnetic resistance by producing states in which the magnetizations of the magnetic films are parallel and antiparallel to each other via the nonmagnetic film (Phys. Rev. B., Vol. 45806 (1992), J. Appl. Phys., Vol. 69, 4774 (1991), a so-called spin valve type).

FIG. 1 shows a conventional magnetoresistance effect element.

This conventional magnetoresistance effect element has a contact region B for connecting a lead 101 on each side of a region A corresponding to a track width. Since a high-permeability soft magnetic film 102d which responds to magnetization of a medium exists in this region B, this portion also senses recorded information. For this reason, information from the adjacent track is also mixed upon off-track, and this reduces the S/N ratio and makes the track width obscure. When the recording density is 200 Mb/inch$^2$, for example, the track width is 7 μm, and the track spacing is about 2 μm. In this case, since the track width is relatively large and the space between track is also large, the contact region B does not exist on the neighboring track if the width of the contact region B is set to about 1 μm or less. Therefore, a leakage output (crosstalk) from the neighboring track is negligible in off-track with a track spacing of 1 μm or less.

In FIG. 1, numeral 102a represents an undercoat film, numeral 102b represents a soft magnetic film for applying a bias, numeral 102c represents a nonmagnetic film, and numeral 102e represents a protective film.

If, however, the recording density is, e.g., 10 Gb/inch$^2$, the track width and the track spacing decrease to approximately 1 and 0.2 μm, respectively, and so the output itself also decreases. This makes the contact region B to exist an the adjacent track upon off-track, and the leakage output from the adjacent track can no longer be neglected. To avoid this inconvenience, the width of the contact region B may be decreased to about 0.2 μm which is equal to the track spacing. In this case, however, imperfect ohmic contacts readily form in mass production.

The first object of the present invention is as follows.

As described above, as the recording density approaches 10 Gb/inch$^2$, the output leaking from the neighboring track through the contact region B upon off-track becomes no longer negligible. If the area of the contact region B is decreased in order to avoid this leakage output, there arises another problem of the difficulty in forming even ohmic contacts.

In the magnetoresistance effect element, use of a magnetoresistance effect film with a high antiferromagnetic coupled state increases the saturation magnetic field because of a high coupling force of the film. Therefore, there have been reported several systems which use a phenomenon, in which the resistance changes between a parallel magnetization state and an antiparallel magnetization state, rather than the antiferromagnetic coupled state.

The second object of the present invention is as follows.

Another method of precisely defining the track width in a magnetic head is to use a conventional magnetoresistance effect element which extends in the direction of applying the signal magnetic filed as is shown in FIG. 2A or in the opposite direction as shown in FIG. 2A, to acquire an improved sensitivity. Whichever direction the magnetoresistance effect element extends, however, no uniform bias magnetic field can be applied to the magnetoresistance effect element. This is because the magnetoresistance effect element has its resistance changed with the angle between its axis of magnetization and the curved path of sense current. Consequently, the magnetoresistance effect element cannot provide a reliable output. It cannot be used in practice, particularly for tracks which are so narrow that the sense-current path is curved greatly.

Conventional magnetoresistance effect elements include a type constituted by two magnetic films sandwiching a nonmagnetic film as shown in FIGS. 2B and 2C (J. Appl. Phys. 53(3), 2596, 1982). Referring to FIGS. 2B and 2C, reference numeral 105 denotes a lower magnetic film; 106, a nonmagnetic film; 107, an upper magnetic film; and 108a and 108b, leads. In FIGS. 2A and 2B, a sense current flows into the lead 108a and out from the lead 108b. The magnetoresistance effect element with such an arrangement is affected by a magnetic field generated by a self-current. Assuming that a magnetic field generated by a current flowing through the lower magnetic film and the nonmagnetic film is applied to the upper magnetic film, the magnitude of the magnetic field generated by the self-current when the film thickness of each layer is equal to or smaller than the mean free path of conduction electrons is given by Relation (1) below. Note that the mean free path is approximately 300 Å for 300 K in the case of bulk Cu.

$$H_{x1} \text{ to } J*(t+d)/2 \quad (1)$$

wherein j represents a current density, t represents a thickness of the upper magnetic film, and d represents a width of the upper magnetic film.

As an example, $H_x$ to 700 (A/m)=9 (Oe) when $J=2\times10^7$ A/cm$^2$, $t=20$ Å, and $d=50$ Å.

A magnetic field $H_{x2}$ applied to the lower magnetic film is given by $H_{x2}=-H_{x1}$ because it is generated by a current flowing through the upper magnetic film and the nonmagnetic film.

Under these conditions, therefore, the magnetic moments (magnetizations) of the upper and lower magnetic films are antiparallel to each other if an anisotropic magnetic field of each layer is small (up to 3 Oe) like that of a thin permalloy film. However, a domain wall called an edge curling wall is present in an edge portion of the element due to the influence of a demagnetizing field (IEEE Trans. Magn., Vol. 24, No. 3, May 1988), so this portion essentially becomes a dead region.

That Is, the performance of the magnetoresistance effect element as described above can be maximally exhibited if the magnetic moment of each individual layer is uniform in the layer. However, if the edge curling wall exists, the magnetic moment cannot be uniform any longer, and the response of this portion to an external magnetic field is degraded. Consequently, the reproduced output from this magnetoresistance effect element decreases by a ratio corresponding to the width of the edge curling wall.

When magnetic anisotropy is imparted in the widthwise direction of the element, the width of this edge curling wall is obtained by Equation (2) below (IEEE Trans. Magn. Vol. 24, No. 3, May 1988):

$$\pi\Delta/2=\{\pi^3 M_s * d * t/(2*H_k)\}^{0.5} \quad (2)$$

where $M_s$ is the saturation magnetization and $H_k$ is the magnitude of an anisotropic magnetic field. For example, if $H_k=3$ Oe and $M_s=800$ G in the above element, $\pi\Delta/2=0.2$ μm. When a sense current is flowed, $H_k$ in Equation (2) becomes $H_k+H_x$, and consequently $\pi\Delta/2=0.1$ μm.

In ultra-high-density magnetic recording with a surface density of 10 Gb/inch$^2$, the area per bit is about 0.07 μm$^2$, and the track width is 1 μm or less. In this case, the dimensions of the element also decrease to a similar extent (a square of 1 μm side). Therefore, a ratio that the width of the edge curling wall occupies 20% of the whole element; that is, only an 80% portion of the element is usable as an active region. This problem similarly arises in an element in which magnetic films and nonmagnetic films are stacked alternately as well as in an element having two magnetic films.

The third object of the present invention is as follows.

As discussed above, in the magnetoresistance effect element formed by alternately stacking magnetic layers and nonmagnetic films, the magnetic moment of each individual layer in an edge portion of the element tends to be parallel to this edge portion, producing an edge curling wall. When the element is miniaturized, a ratio that this edge curling wall occupies in the entire element increases. In an extreme case, magnetization near a central portion also acquires a component parallel to the edge portion. This lowers the reproduced output from the magnetoresistance effect element.

If an antiferromagnetic film is arranged on at least one side of the above magnetoresistance effect element to apply an uniaxial biasing in the widthwise direction of the element, this edge curling wall can be eliminated. Since, however, an FeMn-based antiferromagnetic film currently being developed in practice has a very low corrosion resistance, it is not possible to make an arrangement in which this antiferromagnetic film is exposed to the atmosphere.

Conventional thin film heads using a permalloy or the like have a practical problem of Barkhausen noise which is derived from an irreversible behavior of a magnetic domain appearing in a magnetic film. As a technique to prevent this problem, there has been proposed a method by which an exchange bias is obtained by stacking antiferromagnetic films consisting of, e.g., FeMn, or a method by which a magnetic substance is allowed to have a single magnetic domain by arranging a magnetic material in the vicinities of both the edges of an element (IEEE MAG-14, 521 (1978), Jpn. Pat. Appln. KOKAI Publication No. 64-1112).

The fourth object of the present invention is as follows.

In the above conventional technique, a single-layered magnetic film or a multilayered magnetic film in which magnetizations of individual magnetic layers point in the same direction can be allowed to have a single magnetic domain by applying a bias magnetic field in one direction. If, however, a magnetic film is constituted by three or more layers and magnetizations of these magnetic layers do not point in the same direction, there is no means for forming a single magnetic domain to each magnetic layer.

The fifth object of the present invention is as follows.

A thin film head is known, wherein the direction of the signal magnetic field is substantially parallel to the direction of the sense current supplied to detect resistance changes, leads are arranged on the surface which opposes the recording medium and at which the magnetic flux density is maximal. To improve the magnetic permeability of the magnetoresistance effect element, the element is elongated about 10 μm in the direction in which the sense current flows, thereby reducing the intensity of the anti-magnetic field extending in the direction of the signal magnetic field. Notwithstanding, in the case of a so-called shield-type magnetoresistance effect head, the magnetic flux form the recording medium leaks into the shield at 1 to 2 μm from the surface of the recording medium. Thus, the resistance changes in a region extending only 1 to 2 μm from the recording medium. Since the magnetoresistance effect element is rather long (about 10 μm), the resistance is proportionally high, inevitably generating a large thermal noise generally known as "Johnson noise."

The sixth object of the present invention is as follows.

Some of the conventional magnetoresistance effect elements having a magnetization-locking film made of antiferromagnetic material such as FeMn generate much heat when a current is supplied to them in a high density of 10$^6$ A/cm$^2$ or more, to exhibit but a very smally resistance changing rate.

The seventh object of the present invention is as follows.

As is known in the art, a magnetoresistance effect element utilizing spin-dependent scattering has a maximum resistance changing rate if the nonmagnetic portion sandwiched between the magnetic portions is made of Cu. As is disclosed in J. Appl. Phys. 69(8), Apr. 15, 1991, a magnetoresistance effect element of type has a maximum resistance changing rate if the magnetic surface portions are made of Co. In ordinary thin-film heads, NiFe is used as recording material and shield material. NiFe has highly corrosion resistant. Hence, a shield made of NiFe was used and arranged close to a magnetoresistance effect element made of Cu and Co. Then, the Cu and Co forming the magnetoresistance effect element were electrolytically corroded during the processing of the head. Furthermore, while a data-reproducing head having only the magnetoresistance effect element was being processed, the Cu and Co forming the magnetoresistance effect element were electrolytically corroded.

The eighth object of the present invention is as follows.

When a hard disk drive (HDD) is operated at a write frequency of 10 MHz or more, the phase difference between the recording current and the recording magnetic flux increases and become problematical. This is because the pole takes a closure domain structure so that the head may record data not only by the magnetization rotation, but also by moving the magnetic barrier. No method of preventing the phase difference has been proposed.

The ninth object of the present invention is as follows. In a system that a current flows in a direction perpendicular to a film surface of a magnetoresistance effect element, electrical resistance is extremely small. Therefore, the system is impractical system.

The tenth object of the present invention is as follows.

A so-called "granular magnetic alloy," in which magnetic regions (formed mainly of Co, Ni, Fe or the like) are isolated form one anther, and nonmagnetic regions (formed mainly of Ag, Au, Cu or the like), is reported to exhibit as great a magnetoresistance effect as does a magnetic/nonmagnetic multi-layered film, more precisely a resistance changing rate of several tens per cent. This alloy cannot be practically used in a magnetic sensor (i.e., a saturation field), however, since it requires an intense magnetic field (10 kA/m or more) to have such a high resistance changing rate. An attempt has been made, wherein a bias film is laid on one surface of a granular magnetic alloy film so that the alloy film may perform its function in a low-intensity magnetic field. Contrary to the objective, the film yet requires a considerably intense saturation field to exhibit a sufficiently high resistance changing rate. Thus far no granular magnetic alloy film has been formed which can exhibit an adequate resistance changing rate in a weak magnetic field as does a spin-valve type multi-layered magnetoresistance effect film.

SUMMARY OF THE INVENTION

The present invention has been made in consideration of the above first to tenth objects.

The present invention has been made in consideration of the above situation and has as its object to provide a magnetoresistance effect element which has a film with a spin valve structure or an artificial lattice film having good soft magnetic characteristics, and which can be applied to a high-sensitivity magnetic head.

In a magnetoresistance effect element which has a film with a spin valve structure or an artificial lattice film having good soft magnetic characteristics, and which can be applied to a high-sensitivity magnetic head, Co, CoFe, CoNi, NiFe, sendust, NiFeCo, $Fe_8N$ and the like may be used as a material of a ferromagnetic film. It is preferable that a thickness of the ferromagnetic film falls in the range of 1 to 20 nm. In the magnetoresistance effect element, a nonmagnetic metal such as Mn, Fe, Ni, Cu, Al, Pd, Pt, Ph, Ru, Ir, Au or Ag and an alloy such as CuPd, CrPt, CuAr, CuNi, as a material CuDi of a nonmagnetic film. It is preferable that a thickness of the nonmagnetic film falls in the range of 0.5 to 20 nm, more preferably 0.8 to 5 nm.

In the present invention, the direction of the current for detecting an electrical resistance, which is flowed through the magnetic films, may be either the direction of the axis of hard magnetization or the direction of the axis of easy magnetization of the two magnetic films.

In the present invention, if there is no magnetic field from the magnetic medium, the angle defined between magnetizations of the two magnetic films is preferably 20° to 180° (antiparallel). This is so because if the angle falls outside this range, the resistance change with respect to the magnetic field becomes extremely small, and this makes it difficult to obtain an output.

In the present invention, the thickness of the nonmagnetic film is preferably 0.5 to 10 nm. This is so because if the thickness of the nonmagnetic film is smaller than 0.5 nm, ferromagnetic coupling becomes too strong. Since, on the other hand, a thickness larger than 10 nm is almost equal to the mean free path of free electrons in the nonmagnetic film, contribution to spin-dependent scattering becomes small. As the material of the nonmagnetic film, conductive materials such as Cu, Au, Ag, and Pt can be used. As the material of the magnetic films, CoFe, NiFe, and NiFeCo are usable.

In the present invention, magnetizations of the two magnetic films of the spin-dependent scattering type head in which no locking of magnetization is caused by exchange coupling are rotated to be antiparallel to each other by a magnetic field formed by a sense current. If a magnetic field from a medium is applied in this state, the magnetizations of the two magnetic films are rotated to be parallel to each other.

The axes of easy magnetization of the two magnetic films are set to be substantially parallel to each other. In this case, the direction of the axes of easy magnetization may be either a direction (parallel to the surface of the medium) perpendicular to the sense current or a direction parallel to the sense current.

If the axis of easy magnetization is in the direction perpendicular to the sense current and no magnetic field of a medium is applied, the magnetizations of the two magnetic films point in opposite directions in the direction of the axis of easy magnetization, yielding a maximum electrical resistance. If a magnetic field of a medium is applied, the magnetizations of the two magnetic films rotate in opposite directions so as to be parallel to each other. At this point, the electrical resistance decreases. In addition, upon application of a strong magnetic field, the magnetizations of the two magnetic films become parallel to each other, yielding a minimum electrical resistance. Therefore, all electrical resistance changes possible as a magnetoresistance effect element can be used.

Furthermore, since this change in the direction of magnetization is magnetization rotation, the magnetoresistance effect element is excellent in response characteristics at high frequencies.

If the two magnetic films have an anisotropic magnetoresistance effect, the angle defined between magnetization and a current is a right angle when there is no external magnetic field, and so a minimum electrical resistance results. If the magnetization becomes parallel to the direction of the current upon application of a strong magnetic field, the electrical resistance reaches a maximum. That is, the increase/ decrease of the electrical resistance caused by the anisotropic magnetoresistance effect is opposite to that caused by spin-dependent scattering.

To detect a magnetic field of a medium by using a magnetoresistance effect obtained by spin-dependent scattering, therefore, it is necessary to use a stacked film having a two-layered structure in which a change in electrical resistance caused by the anisotropic magnetoresistance effect is small. As an example, when a stacked film having a two-layered structure consisting of NiFe is used, the electrical resistance change caused by the magnetoresistance effect obtained by spin-dependent scattering is about 4%, and the electrical resistance change caused by the anisotropic magnetoresistance effect is about 3%. Since the increase and the decrease of these electrical resistances cancel each other out with respect to an external magnetic field, such a stacked film is unsuitable for the thin film head of the present invention.

The response of the magnetoresistance effect element of the thin film head according to the present invention with respect to an external magnetic field is not linear with respect to the magnetic field. In situations where linearity is required for convenience in signal processing, therefore, it is necessary to provide means for applying a bias magnetic field in a direction parallel to the sense current.

If the axis of easy magnetization is parallel to the sense current and a magnetic field generated by the sense current is applied, the magnetizations of the two magnetic films are rotated in opposite directions through a certain angle from the axis of easy magnetization. This angle is determined by balance between an anisotropic magnetic field of the magnetic film, a magnetic field generated by the sense current, and a demagnetizing field, and can take a value from 0° to 90°. If a magnetic field from a medium is applied, the magnetizations of the two magnetic films rotate in opposite directions so as to be parallel to each other, and this decreases the electrical resistance. If the angle defined between the magnetizations of the two magnetic films is a right angle upon application of a magnetic field generated by a maximum sense current which is allowable in respect of the reliability of the magnetoresistance effect element and there is no signal magnetic field, the linearity of the electrical resistance change is good with respect to the signal magnetic field.

That is, the first invention of the present invention provides a thin film head comprising a magnetoresistance effect element which includes at least two magnetic films, a nonmagnetic film sandwiched between the magnetic films, and leads connected to the magnetoresistance effect element wherein the width of one of the magnetic films, which essentially responds to a signal magnetic field, is not more than a distance between leads.

In the first invention, it is preferable to obtain an electrical contact between the leads and the magnetoresistance effect element in the nonmagnetic film slightly larger than a track width or in a portion of the magnetic films except for the track width.

It is also preferable to fabricate at least one magnetic film precisely into the size of the track width and fabricate a conductive layer or a film for magnetization locking, such as an antiferromagnetic film or a hard magnetic film, to be slightly larger than the track width, thereby forming a contact region in a portion except for the track width of the antiferromagnetic film or the hard magnetic film.

In addition, it is preferable that a conductive layer be formed as an undercoating film and a contact region be formed such that at least the conductive layer is left behind and at least a soft magnetic film is removed by etching.

In the first invention, precisely a portion between the leads alone serves as a region for responding to magnetic information of a magnetic recording medium. Therefore, crosstalks from adjacent tracks can be decreased to be negligibly small if an off-track is smaller than the track interval, and the track width can be defined precisely.

Furthermore, since the contact region does not respond to a magnetic field at all, the contact region can be so increased as to extend over an adjacent track. This can ensure an ohmic contact between the lead and the element by carrying out the appropriate steps as described above.

The first invention is applicable to a thin film head of shunt bias system as well.

The second invention of the present invention provides a thin film head comprising a magnetoresistance effect element which includes at least two magnetic films and a nonmagnetic film sandwiched between the magnetic films, which makes use of a change in magnetic resistance caused by spin-dependent scattering, wherein at least a portion of one magnetic films, which essentially respond to a signal magnetic field extends in a direction same as that of the signal magnetic field.

The anisotropic magnetoresistance effect element, which extends in the direction of the signal magnetic field, cannot provide a reliable output since the sense current flows in a curved path. Hence, this element cannot be used for narrow tracks, either.

The magnetoresistance effect element of this invention, shown in FIG. 28, can define a track width precisely. The magnetoresistance effect element utilizes spin-dependent scattering and has an anti-ferromagnetic body 24 and magnetic bodies arranged in the form of layers. The body 24 applies an operation-point bias, and the magnetic bodies extend in the direction of the signal magnetic field. Hence, an uniform bias magnetic field is applied, and the magnetoresistance effect element can produce a reliable output even if the tracks are narrow. This is why the magnetoresistance effect element can define a track width with precision, in particular if used in a head wherein a sense-current magnetic field is used as a bias field.

In the above inventions, it is preferable that an antiferromagnetic film and a magnetic film locked by this antiferromagnetic film exist inside the head, and other magnetic films be exposed to a head sliding surface.

It is also preferable that, of the spin-dependent scattering type magnetoresistance effect films using the two or more magnetic films, only the magnetic films, which respond to a signal magnetic field, be exposed to a head sliding surface, and interlayers be present inside the head.

In the above inventions, it becomes possible to manufacture a magnetic head by using a spin valve type magnetoresistance effect element including an antiferromagnetic film which causes a problem in corrosion resistance when exposed to outside the head. Therefore, a thin film head with a high sensitivity which is the characteristic feature of a spin valve type magnetoresistance effect element can be obtained with a high reliability.

In addition, this structure can be applied to various device structures, such as a structure having three or more magnetic films, or to a structure of any bias method (as a countermeasure against Barkhausen noise), provided that an antiferromagnetic film and a ferromagnetic film whose magnetization is locked by the antiferromagnetic film are present inside a head, and a magnetic film for sensing signals from a magnetic recording medium is exposed to a head sliding surface.

The second invention of the present invention can define a track width with precision even if the track is considerably narrow.

The third invention of the present invention provides a thin film head comprising a magnetoresistance effect element which includes at least two magnetic films and a nonmagnetic film sandwiched between the magnetic films, wherein one of the magnetic films extends in a width-wise direction of tracks of a recording medium and has a step at an edge portion of the other magnetic film and track-width-direction components of magnetization of the at least two magnetic films are anti-paralleled with each other when a signal magnetic field is zero.

The extending magnetic film has a thicker portion facing the other magnetic film with which magnetoresistance element is formed, and a thinner portion of the rest of the film. It is also preferable to apply a bias magnetic field in the widthwise direction to the magnetic film whose portion extends in the track width direction by using, e.g., a hard magnetic film. In addition, the magnetic film having the portion extending in the track width direction is preferably a stacked film constituted by a wide magnetic film with a high specific resistance.

In the third invention, almost no magnetic poles are generated at the edges of the magnetoresistance effect element. For example, if two hard magnetic films are formed via a nonmagnetic film and magnetized opposite direction, magnetic fields in opposite directions are applied to the upper and lower magnetic films. Therefore, almost no magnetic poles of the hard magnetic films caused or decreases a demagnetizing field of magnetoresistance effect element, resulting in an extremely small edge curling wall at the edges of the magnetoresistance effect element. Consequently, a magnetoresistance effect head with a high reproduction output can be obtained by the use of this magnetoresistance effect element.

The fourth invention of the present invention provides a thin film head comprising a magnetoresistance effect element which includes an odd number (not less than three) of magnetic films and nonmagnetic films sandwiched between the magnetic films, and in which directions of magnetizations of adjacent magnetic films are substantially anti-parallel to each other, wherein two bias applying hard magnetic bodies magnetized in a substantially same direction along the surfaces of the magnetic films are arranged on both sides of the magnetoresistance effect element in a direction of the track width.

The fourth invention of the present invention provides a thin film head comprising a magnetoresistance effect element which includes an even number (not less than four) of magnetic films and nonmagnetic films sandwiched between the magnetic films, and in which the directions of magnetizations of adjacent magnetic films are substantially anti-parallel to each other, wherein two bias applying hard magnetic bodies magnetized in opposite directions substantially perpendicular to the surfaces of the magnetic films are arranged on both sides of the magnetoresistance effect element in a direction of the track width.

In the above inventions, if the number of the magnetic films is an odd number, it is preferable to use, as means for forming a single magnetic domain in each magnetic film, a magnetic field generated by a permanent magnet arranged adjacent to the magnetic film.

If the number of the magnetic films is an even number, it is preferable to use, as means for allowing each magnetic film to have a single magnetic domain, a current magnetic field obtained by flowing a sense current, which is to be flowed through the magnetic film, in a direction perpendicular to the direction of magnetization of that magnetic film. In this case, the use of a film with perpendicular magnetization adjacent to the magnetic film is preferable. Note that it is also possible to use a combination of the magnetic field generated by the permanent magnet and the current magnetic field.

In the above inventions, each magnetic film comprising a magnetoresistance effect element is applied with, as a bias magnetic field, the sum of the magnetic field from the permanent magnet or the current magnetic field generated by the sense current and a static magnetic field from other magnetic film. Therefore, it is possible to apply a bias magnetic field, which is oriented in different direction each other to each individual film by balancing the magnetic fields by property designing, the distance with respect to the multilayered film, the magnitude of the sense current, and a change in the dimensions of the multilayered film.

Therefore, fifth invention of the present invention is to provide a thin film head in which a signal magnetic field extends substantially in the same direction of a sense current flowing to detect resistance changes, and which has a magnetoresistance element having a high magnetic permeability and causing no Johnson noise.

The fifth invention of the present invention provides a thin film head comprising a magnetoresistance effect element which includes at least two magnetic films and a nonmagnetic film sandwiched between the magnetic films, wherein a direction of a signal magnetic field is substantially parallel to a direction of a sense current for sensing a resistance change, wherein at least three current terminals are separately juxtaposed to one another on the magnetoresistance effect element.

In the above invention, the directions of currents flowing through two regions of magnetic films between neighboring current terminals are either the same or different depending on the conditions.

The sixth invention of the present invention provides a thin film head comprising a magnetoresistance effect element which includes at least two magnetic films and a nonmagnetic film sandwiched between the magnetic films, wherein a magnetization of one of the magnetic films is essentially blocked, and a flowing direction of a sense current for sensing the resistance change is chosen so that a direction of a magnetic field caused by the sense current is substantially the same as that of the locked-magnetization of one of magnetic films.

Accordingly, the sixth invention of this invention is to provide a thin film head which comprises a magnetoresistance effect element having a magnetizationlocking film made of anti-ferromagnetic material and which maintains a resistance changing rate at a sufficiently great value even if the magnetoresistance effect generates heat when a large current flows through the magnetoresistance effect element.

The seventh invention of the present invention provides a thin film head comprising a magnetoresistance effect element which includes at least two magnetic films and a nonmagnetic film sandwiched between the magnetic films, a magnetic multilayered film containing a soft magnetic body and having a stacked structure of at least two layers arranged on the side of the surface of the magnetoresistance effect element, which opposes to a recording medium, so as to be in contact with or in the neighborhood of the magnetoresistance effect element, and means for supplying a current through the magnetic multilayered film in a direction substantially parallel to that of a signal magnetic field.

Accordingly, the seventh object of the present invention is to provide a magnetoresistance effect utilizing spin-dependent scattering, whose corrosion resistance is improvide without jeopardizing the data-reproducing property.

In the seventh invention, an example of the corrosion-resistant material constituting the magnetic multilayered films are NiFe. In addition, in the seventh invention, it is preferable to supply power to the multilayered films to form a signal magnetic domain in the magnetic multilayered films by using the resultant current magnetic field.

In the seventh invention, a pair of magnetic multilayered films are arranged on both sides of magnetism-sensitive portions of the magnetoresistance effect effect. This significantly stabilizes the signal domain states of the pair of magnetic multilayered film whose magnetizations are anti-parallel to each other, and the signal domain states of the magnetism-sensitive portions of the magnetoresistance effect element whose magnetizations are antiparallel to each other. In addition, the signal domain states of the magnetic multilayered films are further stabilized by magnetic fields generated by currents flowed through the magnetic multi-layered films. For this reason, Brakhausen noise can be removed completely.

According to the eighth invention of this invention, there is provided a thin film head having a thin film recording magnetic pole having a nonmagnetic layer and at least two magnetic layers sandwiching the nonmagnetic layer, and a coil extending across the recording head. The head further comprises at least one electrode located near that surface of the recording magnetic pole which opposes a medium, and an electrode located at a portion of the recording magnetic pole. These electrodes serving to supply a current to the recording magnetic pole, thereby to stabilize the domain structure of the poles.

The eighth invention of the present invention provides a thin film head having a thin film recording magnetic pole which includes at least two magnetic films and a nonmagnetic film sandwiched between the magnetic films, and a coil inducing a magnetic flux, characterized by further comprising:

means for supplying a current through the recording magnetic pole in a direction substantially perpendicular to a surface opposing a recording medium.

Accordingly, the eighth invention of the invention is to provide a recording/reproducing head with which it is possible to minimize the phase difference between the recording current and the recording magnetic flux even the write frequency is high, and to reduce the error of alignment between a recording track and a reproducing track.

In the eighth invention, the reproducing head having the magnetoresistance effect element with a stacked film structure and the leads connected to this magnetoresistance effect element can be arranged in a portion of a magnetic circuit of the recording head consisting of a coil and yokes. In this structure, the linearity of the magnetoresistance effect element can be kept by performing reproduction by flowing a very small current to the coil while applying a bias to the magnetoresistance effect element. In addition, the magnetic domain structure of the tip of a magnetic pole can be controlled by performing recording by flowing a current through the magnetoresistance effect element. This makes it possible to stably carry out recording with a high reproducibility.

The ninth invention of the present invention provides a thin film head comprising a magnetoresistance effect film consisting of at least one nonmagnetic conductor and at least one magnetic body, wherein the nonmagnetic conductor and the magnetic body are arranged alternately in the same plane, and a direction of a sense current for sensing a resistance change is a direction extending through the interfacial boundary between the nonmagnetic conductor and the magnetic body.

In the ninth invention, "the flowing direction of a sense current is a direction extending through the interfacial boundary between the nonmagnetic conductor and the magnetic body" does not mean that the flowing direction of a sense current is perpendicular to the interfacial boundary. In addition, in the this invention, the number of magnetic bodies to be arranged is preferably an even number in order to stabilize magnetostatic coupling. As the material of the nonmagnetic conductor, it is possible to use, e.g., Cu, Au, Ag, and Pt.

In the ninth invention, in the magnetic bodies alternately arranged in line with the nonmagnetic conductors, neighboring magnetic moments are set in a substantially antiparallel state so as to reduce the magnetostatic energy. Upon application of a magnetic field, the magnetic moment of each magnetic body is either rotated or reversed, and the angle defined between adjacent magnetic moments changes in accordance with the applied magnetic field, thereby causing a change in the electrical resistance of the magnetoresistance effect element.

An electrical resistance R" of the magnetoresistance effect element is considered as a series resistance of an electrical resistance $R_{N.M.}$ of the nonmagnetic conductor and an electrical resistance $R_M$ of the magnetic body. Like in the calculation described in Prior Art, assuming that $$R_{N.M.} = \rho_{N.M.} * 1_{N.M.} / (w_{N.M.} * t_{N.M.})$$

$1_{N.M.} = d_2 \times \text{repeating number} = 1"/2, 1 = 10^{-4}$ cm $w_{N.M.} = w" = 0.5 \times 10^{-4}$ cm, and $t_{N.M.} = t" = 100$ Å.

$R_{N.M.}$ to $3 \times 10^{-6} * 0.5 \times 10^{-4} / (0.5 \times 10^{-4} * 100 \times 10^{-8}) = 6 \ \Omega$ Assuming that $$R_M = \rho^*_M 1_M / (w_M * t_M)$$

$1_{N.M.} = d_1 \times \text{repeating number} = 1"/2, t_M = t" = 100$ Å, and $w_M = 0.5 \times 10^{-4}$ cm, $R_M$ to $30 \times 10^{-6} * 10^{-4} / (0.5 \times 10^{-4} * 100 \times 10^{-8}) = 60 \ \Omega$ Therefore, $$R" = R_{N.M.} + R_M = 66 \ \Omega$$

That is, a high resistance which is sufficiently usable as the magnetoresistance effect element can be obtained.

An electrical resistance change rate α" will be considered next. Since the leads are arranged such that the flowing direction of the sense current extends through the interfacial boundaries between the nonmagnetic conductors and the magnetic bodies, all conduction electrons pass through all the boundaries between the nonmagnetic conductors and the magnetic bodies.

This makes it possible to obtain a maximum electrical resistance change. As an example, when the track width is 1 μm and lengths $d_1$ and $d_2$ of the nonmagnetic conductor and the magnetic body are 20 Å, which is equivalent to that in a regular artificial lattice film, the number of interfacial boundaries between the nonmagnetic conductors and the magnetic bodies is 500, which is about 10 times that in a regular artificial lattice film. Therefore, the value of $\alpha''$ is also large.

A calculation of an output $\Delta V''$ is as follows.

A sense current I is given by:

$$I''=J''*w''*t''=10^7*0.5\times10^{-4}*100\times10^{-8}=0.5 \text{ mA}$$

Therefore, $$\Delta V''=I''*\Delta R=I*\alpha''*R$$

Even if it is assumed that $\alpha''=\alpha'$, $=0.5\times10^{-3}*0.4*66=13.2$ mV ($\Delta V''>>\Delta V$ or $\Delta V'$) This demonstrates that an output by far higher than those in conventional systems can be obtained.

In the ninth invention, the structure may also have a magnetic film to be exchange-coupled to the magnetoresistance effect film, and the direction of the axis of easy magnetization of this magnetic film may be substantially parallel or perpendicular to the flowing direction of a signal magnetic field. It is perferable that the direction of the axis of easy magnetization of this magnetic film is substantially perpendicular to the flowing direction of a signal magnetic field. This structure makes the use of a magnetoresistance effect film in which magnetic bodies are dispersed in nonmagnetic conductors possible.

As described above, according to the magnetoresistance effect head of the ninth invention, a practically high enough electrical resistance of the magnetoresistance effect element can be obtained, and the rate of change in electrical resistance can also be increased. This consequently increases the output greatly.

The tenth invention of the present invention provides a thin film head comprising a magnetoresistance effect element which includes a magnetic alloy film having a magnetic region and a nonmagnetic region; and a bias film, which applies a bias magnetic field to the magnetic alloy film, formed on each surface of the magnetic alloy film directions of bias magnetic field applied to the magnetic alloy film by each of the bias film has a predetermined angle.

According to the tenth invention, there is provided a thin film head which comprises a magnetic alloy film having magnetic regions isolated from one another and nonmagnetic regions, and two bias films formed on both surfaces of the magnetic alloy film. The magnetic alloy film may comprise a plurality of nonmagnetic layers and a plurality of layers made of the magnetic alloy and magnetically isolated from one another by the nonmagnetic layers. The bias films generate a first bias magnetic field and a second bias magnetic field, respectively. The first and second bias magnetic fields differ in direction or intensity, or both. Preferably, these bias magnetic fields extend at right angles to each other or anti-parallel to each other, at a neutral signal magnetic field.

The case where the first and second bias magnetic fields extend at right angles to each other will be described first.

In this case, the first bias film is made of antiferromagnetic material such as FeMn, NiO or the like, or hard magnetic material such as CoPt. Made of such material, the first bias film has its magnetization direction substantially unchanged when the signal magnetic field is applied to it. Therefore, the magnetic field the first bias film generates, i.e., an exchange bias magnetic field, locks the magnetization at the interface between the granular magnetic alloy film and the first bias film (hereinafter referred to as "magnetization-locking interface").

The second bias film is made of such material that its magnetization axis rotates when the signal neutral magnetic field is applied to it. The magnetic field the second bias film generates, i.e., another exchange bias magnetic field, therefore rotating the magnetization axis at the interface between the granular magnetic alloy film and the second bias film (hereinafter referred to as "magnetization-rotating interface." The magnetization axis of the magnetization-rotating interface can thereby rotated easily by a relatively weak signal magnetic field, by 90° with respect to the magnetization-locking interface.

When a signal magnetic field is applied in the magnetization direction of the magnetization-locking interface, the magnetization axis of the magnetization-rotating interface rotates to be identical to that of the magnetization-locking interface. In this case, the granular magnetic alloy film becomes ferromagnetic, and its resistance decreases. When a signal magnetic field is applied in the direction opposite (i.e., at 180°) to the magnetization direction at the magnetization-locking interface, the magnetization axis of the magnetization-rotating interface rotate by 180°, and the magnetization direction become opposite to that of the magnetization-locking interface. In this case, the granular magnetic alloy film becomes antiferromagnetic, and its resistance increases.

As a result, the magnetoresistance effect element, wherein the two bias magnetic fields extend at right angles, has the linear resistance-magnetic field characteristic shown in FIG. 98. This magnetoresistance effect element does not require an operating-point bias which needs to be applied in the anisotropic magnetic effect element. In addition, the magnetoresistance effect element acquires a higher resistance changing rate (i.e., several tens percent) in a relatively weak magnetic field, than the anisotropic magnetic effect element or the spin-valve type multi-layered magnetoresistance effect element.

The case where the two bias magnetic fields extend anti-parallel to each other will now be described.

In this case, both the first bias film and the second bias film are made of soft ferromagnetic material (e.g., amorphous Co-based material, NiFe containing transient metal such as Ta or Zr, a precious metal such as Pd or Rh, or Fe-based or Co-based fine-crystal material containing nitrogen or carbon). The first and second bias films are arranged so that the magnetization axes of the magnetization-locking and -rotating surfaces are anti-parallel, each being at right angles to a neutral signal magnetic field. Hence, that surface portion of the granular magnetic alloy film which contacts the first bias film is magnetized in a first direction, whereas that surface portion of the granular magnetic alloy film which contacts the first bias film is magnetized in a second direction which is opposite and parallel to that first direction. Hence, the granular magnetic alloy film exhibits a high resistance.

When a signal magnetic field is applied to the magnetoresistance effect element, the magnetization axes of the surface portions of the granular magnetic alloy film rotate in the opposite directions. The granular magnetic alloy film thereby becomes ferromagnetic, and its resistance decreases. As a result, the element acquires has the nonlinear resistance-magnetic field. To make the sensor acquire a linear resistance-magnetic field characteristic, it is necessary to apply a bias magnetic field in addition to the signal magnetic field. Nonetheless, the magnetoresistance effect element has sensitivity twice as high as the element wherein the two bias magnetic fields extend at right angles. This is because the magnetization axes of both, not only one, of the surface portions of the granular magnetic alloy film rotate in the opposite directions.

Also, the magnetoresistance effect element, wherein the two bias magnetic fields extend antiparallel to each other, does not require an operating-point bias, either, provided that the magnetization axes of both bias films are set at +45° and −45°, or +135° and −135°, respectively, to the axis of the signal magnetic field and thereby intersect at 90° with respect to each other. If the magnetization axes of both bias films are set so, however, the dynamic range of the element will be narrowed, and it will be impossible to apply the bias magnetic fields anti-parallel to each other.

In the element wherein the two bias magnetic fields extend at right angles, and also in the element wherein the two bias magnetic fields extend anti-parallel to each other, it is desirable that both bias films be thicker than the granular magnetic alloy film. Otherwise, the magnetization axis of either bias film would change due to the reaction of the granular magnetic alloy film. It is required that both bias films have higher resistance than the granular magnetic alloy film; a sense current would otherwise flow into the bias films, inevitably lowering the sensitivity of the magnetoresistance effect element. In other words, the bias films must have a resistivity greater than that of the granular magnetic alloy film. The higher their resistivity, the better. Hence, the bias films should better be made of either amorphous magnetic material or fine-crystal soft magnetic material.

In the case where exchange bias magnetic fields are applied to the granular magnetic alloy film through the magnetization-locking and -rotating surfaces, particularly where the bias films are made of anti-ferromagnetic material such FeMn or NiO, it is desirable that a film of NiFe or the like having a very small thickness (0.2 to 3 nm) be interposed between the granular magnetic alloy film and either bias film.

In order to achieve exchange coupling among the magnetic regions, it is required that magnetic regions be concentrated in either surface portion of the granular magnetic alloy film. Conversely, to rotate the magnetization axes of the magnetization-locking and -rotating surfaces, it is desirable that the magnetic regions be concentrated in the middle portion of the granular magnetic alloy film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view showing a conventional magnetoresistance effect element;

FIGS. 2A to 2C are perspective views showing conventional magnetoresistance effect elements;

FIG. 17 is a perspective view showing still another embodiment of the second invention of the present invention;

FIGS. 18A to 18C are sectional views showing steps of manufacturing a magnetoresistance effect element shown in FIG. 17;

FIGS. 22A to 22E are sectional views showing steps of manufacturing a magnetoresistance effect element shown in FIG. 21;

FIG. 27A is a perspective view showing still another embodiment of the second invention of the present invention, and FIG. 27B is a plan view showing a modification of FIG. 27A;

FIG. 28 is a perspective view showing still another embodiment of the second invention of the present invention;

FIG. 36 is a perspective view showing one embodiment of the third invention of the present invention;

FIG. 37 is a perspective view showing another embodiment of the third invention of the present invention;

FIG. 38 is a perspective view showing still another embodiment of the third invention of the present invention;

FIG. 41 is a perspective view showing one embodiment of the fifth invention of the present invention;

FIG. 42 is a plan view showing the shape of a lead used in the fifth invention of the present invention;

FIG. 50 is a sectional view showing another embodiment of the fourth invention of the present invention;

FIG. 51 is a perspective view showing a modification of the third invention of the present invention;

FIG. 52 is a graph showing the external magnetic field dependency of the resistance change rate of a magnetoresistance effect element shown in FIG. 51;

FIG. 53 is a perspective view showing another modification of the third invention of the present invention;

FIG. 57 is a sectional view showing another modification of the second invention of the present invention;

FIG. 58 is a sectional view showing still another modification of the second invention of the present invention;

FIG. 59 is a plan view showing a magnetoresistance effect element shown in FIG. 58;

FIG. 64A is a perspective view showing another embodiment of the thin film head according to the second invention of the present invention, and FIG. 64B is a view for explaining movement of magnetization in the thin film head shown in FIG. 64A;

FIG. 65 is a perspective view showing still another embodiment of the thin film head according to the second invention of the present invention;

FIG. 66A is a perspective view showing still another embodiment of the thin film head according to the second invention of the present invention.

FIG. 67 is a view showing an example of applying a bias magnetic field to the thin film head according to the second invention of the present invention;

FIG. 69 is a view showing one example of applying a bias magnetic field to the thin film head according to the eighth invention of the present invention;

FIG. 70 is a perspective view showing a recording/reproducing head using the thin film head according to the eighth invention of the present invention;

FIG. 71 is a perspective view showing still one embodiment of the thin film head according to the seventh invention of the present invention;

FIGS. 72 to 74 are schematic views showing examples of a shield type magnetic head using the thin film head according to the eighth invention of the present invention;

FIG. 75 is a perspective view showing another embodiment of a thin film head according to the third invention of the present invention;

FIGS. 82 to 90 are perspective views showing embodiments of a thin film head according to the ninth invention of the present invention;

FIG. 91 is a perspective view showing an embodiment of a thin film head according to the seventh invention of the present invention;

FIG. 92 is a sectional view showing the thin film head shown in FIG. 91;

FIGS. 95 to 97C and 99A to 99C are perspective views showing embodiments of the tenth invention of the present invention.

DETAILED DESCRIPTION OF THE PREFERRED EMBODIMENTS

The embodiments of the present invention will be described in detail below with reference to the accompanying drawings.

Embodiment A

Figure 3A:
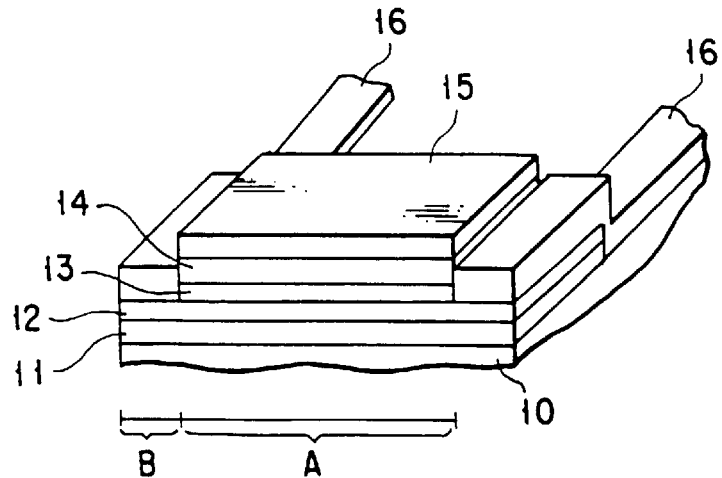
FIGS. 3A to 3C are perspective views showing embodiments of the first invention of the present invention.

FIG. 3A is a perspective view showing one embodiment according to the first invention of the present invention. Referring to FIG. 3A, reference numeral 10 denotes a substrate. An antiferromagnetic film 11 consisting of, e.g., FeMn or a hard magnetic film consisting of, e.g., CoPt is formed on the substrate 10. On top of this antiferromagnetic film 11, a lower magnetic film 12 consisting of, e.g., NiFe, a nonmagnetic film 13 consisting of, e.g., Cu, and an upper magnetic film 14 consisting of, e.g., NiFe are formed. A protective film 15 composed of, e.g., $SiO_2$ is also formed on the upper magnetic film 14. Regions except for an active region are etched away from the nonmagnetic film 13, the upper magnetic film 14, the protective film 15, and a portion of the lower magnetic film 12. Leads 16 made from, e.g., Cu/Cr are formed on the lower magnetic film 12 in portions except the active region.

In the magnetoresistance effect element shown in FIG. 3A, magnetization of the lower magnetic film 12 is entirely locked by the antiferromagnetic film 11. In addition, since contact regions B of the upper magnetic film 14 are removed by etching, the active region of the magnetoresistance effect element is strictly a region A between the leads. Therefore, large contact regions B can be obtained because the contact regions do not detect recorded information.

In addition, as will be described later, portions of the nonmagnetic film 13, the upper magnetic film 14, and the protective film 15 corresponding to the contact regions B and a portion of the lower magnetic film 12 are etched away and the resultant structure is cleaned immediately prior to forming the leads 16. This makes it possible to reliably obtain ohmic contacts of the contact regions.

Although the portions of the nonmagnetic film 13 corresponding to the contact regions B are removed by etching in this element, they need not be always removed. The portions of the lower magnetic film 12 corresponding to the contact regions B are also partially etched away, but they need not be etched at all or may be etched away entirely if the antiferromagnetic film 11 or the hard magnetic film has conductivity.

In this case, it is desirable that the film thickness of the magnetic film whose magnetization is locked by FeMn be larger than that of the magnetic film on the opposite side. With this arrangement, antiparallel magnetizations of the upper and lower magnetic films can be realized easily even if the track width is small.

Figure 3B:
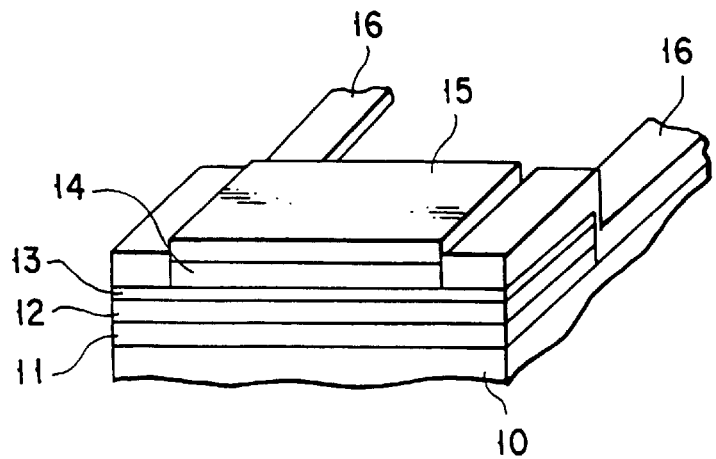
Figure 3C:
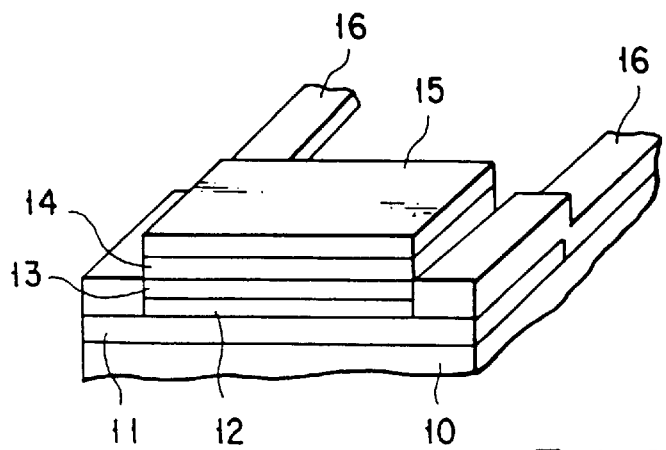
Figure 4A:
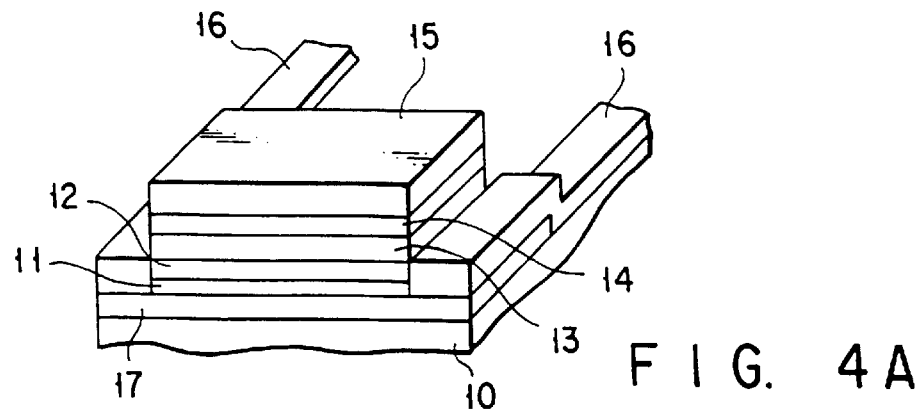
FIGS. 4A to 4D are perspective views showing embodiments of the first invention of the present invention.
Figure 4B:
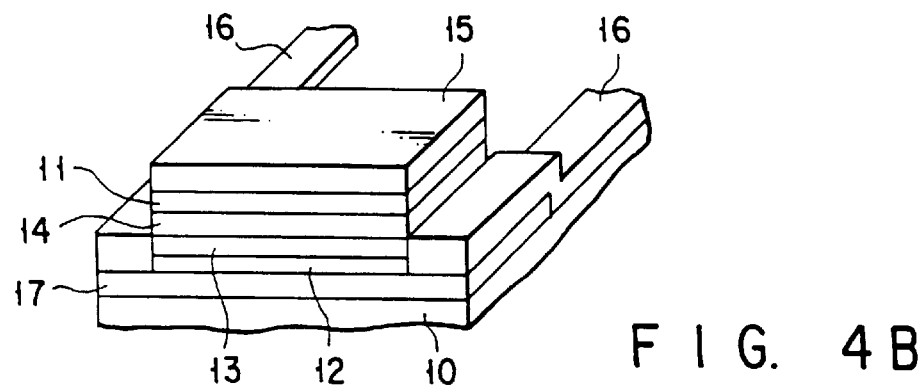
Figure 4C:
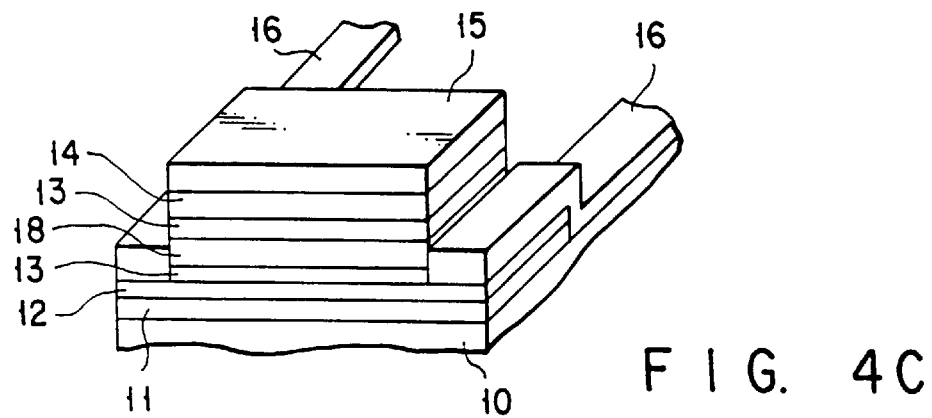
Figure 4D:
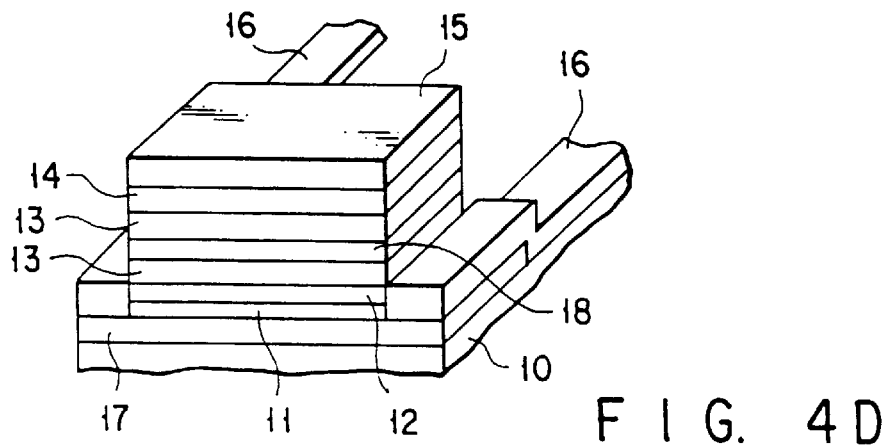

FIGS. 3B and 3C and FIGS. 4A to 4D are perspective views showing other embodiments according to the first invention of the present invention. More specifically, FIG. 3B illustrates a structure in which portions of a nonmagnetic film 13 are also left behind in contact regions B. FIG. 3C illustrates a structure in which portions of a lower magnetic film 12 in contact regions B are entirely removed by etching. In a structure shown in FIG. 4A, an antiferromagnetic film 11, a lower magnetic film 12, a nonmagnetic film 13, an upper magnetic film 14, and a protective film 15 are formed in sequence on an active region A of a conductive undercoating film 17, and leads 16 are formed on contact regions B of the undercoating film 17. In FIG. 4B, a lower magnetic film 12, a nonmagnetic film 13, an upper magnetic film 14, an antiferromagnetic film 11 or a hard magnetic film, and a protective film 15 are formed in sequence on an active region A of a conductive undercoating film 17, and leads 16 are formed on contact regions B of the undercoating film 17. FIG. 4C shows a structure in which a lower magnetic film 12, a nonmagnetic film 13, an intermediate magnetic film 18, another nonmagnetic film 13, an upper magnetic film 14, and a protective film 15 are sequentially formed on an antiferromagnetic film 11, and leads 16 are formed on the lower magnetic film 12 which is partially left behind in contact regions B. This magnetoresistance effect element is of a type in which magnetization of the lower magnetic film 12 is locked by the antiferromagnetic film 11 or the hard magnetic film, and the intermediate magnetic film 18 and the upper magnetic film 14 respond to information recorded in a recording medium. In a structure illustrated in FIG. 4D, a lower magnetic film 12, a nonmagnetic film 13, an intermediate magnetic film 18, another nonmagnetic film 13, an upper magnetic film 14, an antiferromagnetic film 11, and a protective film 15 are formed in this order on an active region A of a conductive undercoating film 17, and leads 16 are formed on contact regions B of the undercoating film 17. This magnetoresistance effect element is of a type in which magnetization of the upper magnetic film 14 is locked by the antiferromagnetic film 11 or the hard magnetic film, and the intermediate magnetic film 18 and the lower magnetic film 12 respond to information recorded in a recording medium.

FIGS. 5A to 5E illustrate an example of steps of manufacturing the magnetoresistance effect element according to the first invention of the present invention.

Figure 5A:
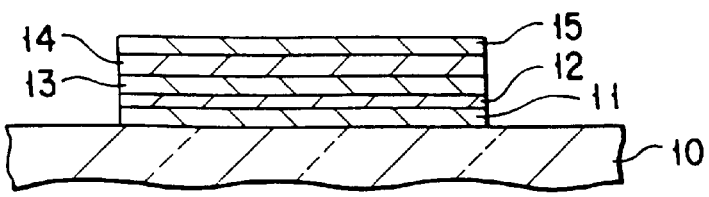
FIGS. 5A to 5E are sectional views showing steps of manufacturing a magnetoresistance effect element according to the first invention of the present invention.
Figure 5B:
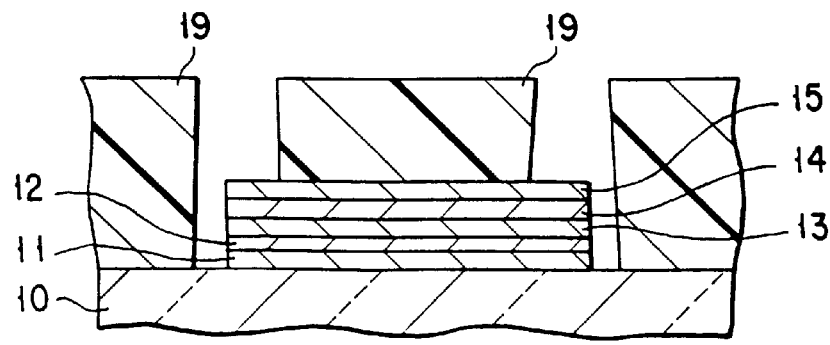
Figure 5C:
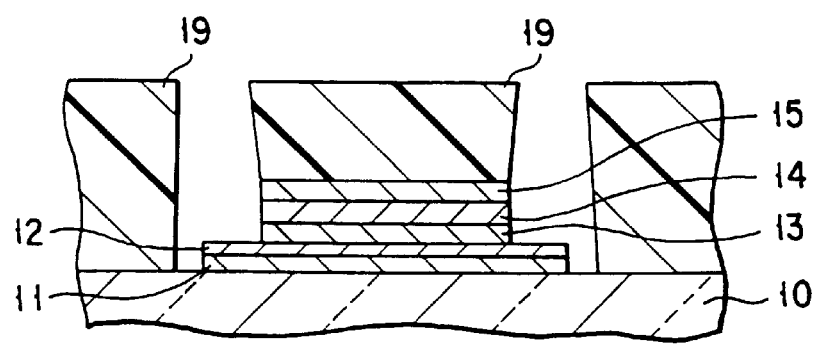

First, as shown in FIG. 5A, an antiferromagnetic film 11 or a hard magnetic film, a lower magnetic film 12, a nonmagnetic film 13, an upper magnetic film 14, and a protective film 15 are formed in sequence on a substrate 10 and then so etched as to have a substantially rectangular shape. Subsequently, as shown in FIG. 5B, reverse-tapered resists 19 are formed on the substrate 10 and on the protective film 15, and patterned. The resultant structure is placed in a vacuum chamber such as a vapor deposition apparatus and subjected to reverse sputtering as shown in FIG. 5C, thereby etching away portions of the protective film 15, the upper magnetic film 14, and the nonmagnetic film 13 in contact regions B and portions of the lower magnetic film 12.

Figure 5D:
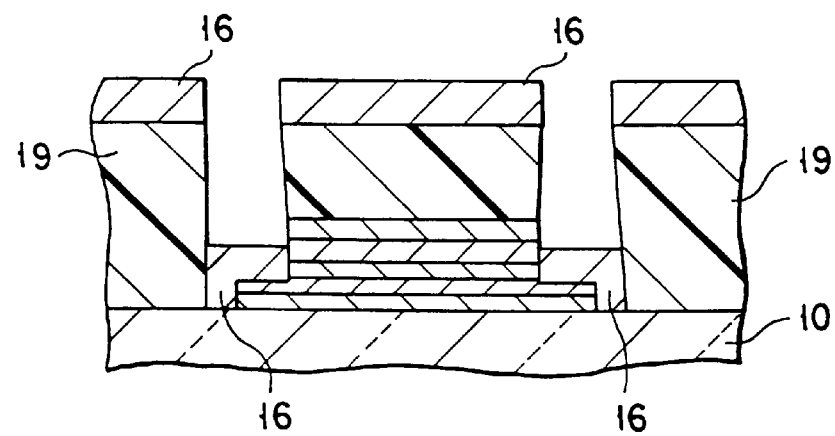
Figure 5E:
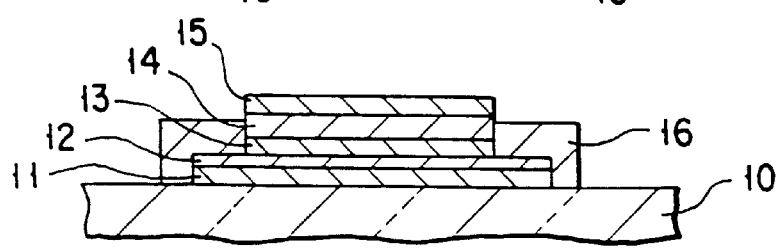

Subsequently, as shown in FIG. 5D, Cr and Cu films are formed sequentially without breaking the vacuum. Thereafter, as shown in FIG. 5E, lift-off is performed by performing ultrasonic cleaning by using acetone or the like.

Embodiment B1

Figure 7:
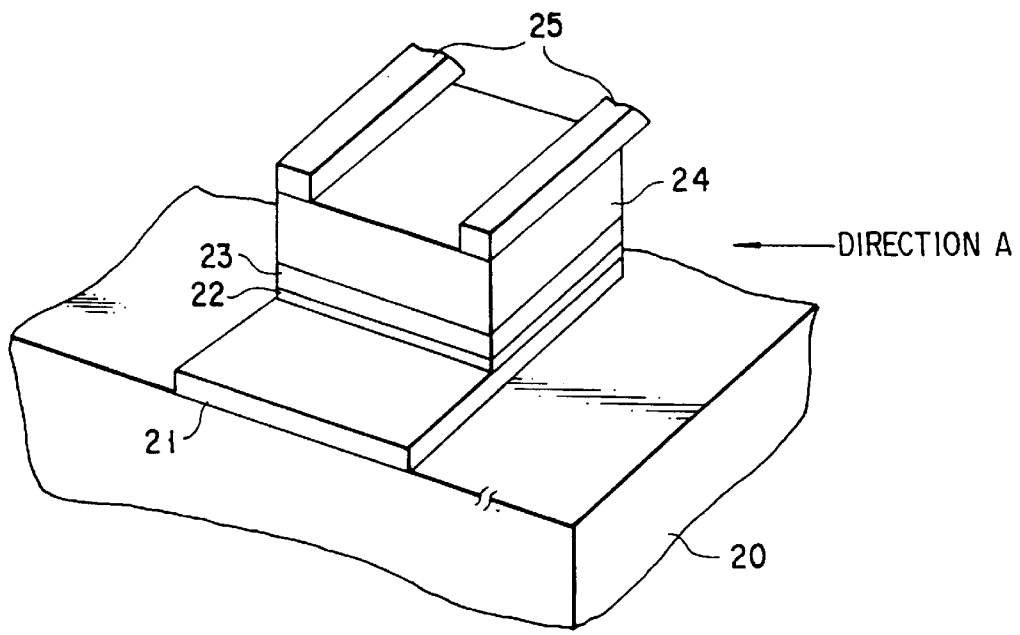
FIG. 7 is a perspective view showing one embodiment of the second invention of the present invention.

FIG. 7 is a perspective view showing one embodiment of a spin valve type magnetoresistance effect element according to the second invention of the present invention.

Referring to FIG. 7, a lower magnetic film 21 consisting of an NiFe alloy or the like is formed on a substrate 20. The end face of this lower magnetic film 21 is so exposed as to function as a head sliding surface and may be sometimes covered with an ultrathin protective layer. A nonmagnetic film 22 consisting of, e.g., Cu, an upper magnetic film 23 consisting of, e.g., an NiFe alloy, and an antiferromagnetic film 24 are formed in sequence on the lower magnetic film 21. Predetermined portions of these films are removed by etching so as not to be exposed as the head sliding surface. Leads 25 are formed on top of the antiferromagnetic film 24.

Figure 8A:
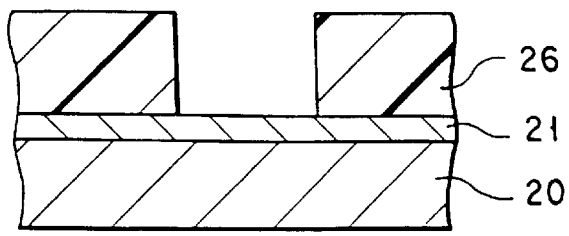
FIGS. 8A to 8C are sectional views showing steps of manufacturing a magnetoresistance effect element shown in FIG. 7.
Figure 8B:
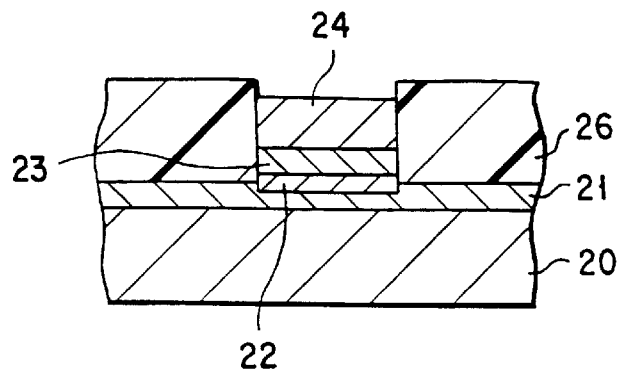
Figure 8C:
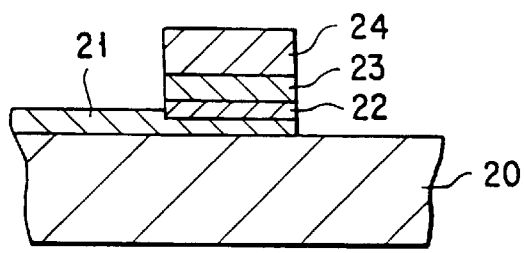

A method of manufacturing the magnetoresistance effect element shown in FIG. 7 is illustrated in FIGS. 8A to 8C. FIGS. 8A to 8C are sectional views viewed in a direction A in FIG. 7.

First, the lower magnetic film 21 for sensing a signal magnetic field is formed to have a thickness of approximately 8 nm on the substrate 20 by sputtering. Subsequently, as shown in FIG. 8A, a resist layer 26 is formed on portions except for a portion on which films such as an antiferromagnetic film are formed later.

Thereafter, as shown in FIG. 8B, the nonmagnetic film 22 about 2 nm in thickness, the upper magnetic film 23 about 4 nm in thickness, and the antiferromagnetic film 24 about 14 nm in thickness are formed by a lift-off process. In this case, it is desirable to perform sputter etching for the purpose of cleaning the surface of the lower magnetic film 21 prior to forming these films.

Subsequently, as shown in FIG. 8C, after the resist layer 26 is removed, patterning is carried out by partially removing the lower magnetic film 21 by etching. This patterning process is not necessarily needed. Lastly, the leads 25 are formed on the antiferromagnetic film 24 by the lift-off process, thereby completing the magnetoresistance effect element as shown in FIG. 7.

In this embodiment, after the lower magnetic film 21 alone is formed, the other magnetic films are formed by the lift-off process. However, it is also possible to form the other magnetic films after formation of the lower magnetic film and the nonmagnetic film by using a material with a high corrosion resistance as the nonmagnetic film. In this case, both the lower magnetic film and the nonmagnetic film are exposed to the head sliding surface.

In FIG. 8B, after the lower magnetic film 21 is etched, the nonmagnetic film 22 is formed in succession. However, after etching of the lower magnetic film 21, it is possible to form another magnetic film of the same material to have a thickness of several nanometers, e.g., approximately 3 nm and then form the nonmagnetic film 22, the upper magnetic film 23, and the antiferromagnetic film 24.

Embodiment B2

Figure 9:
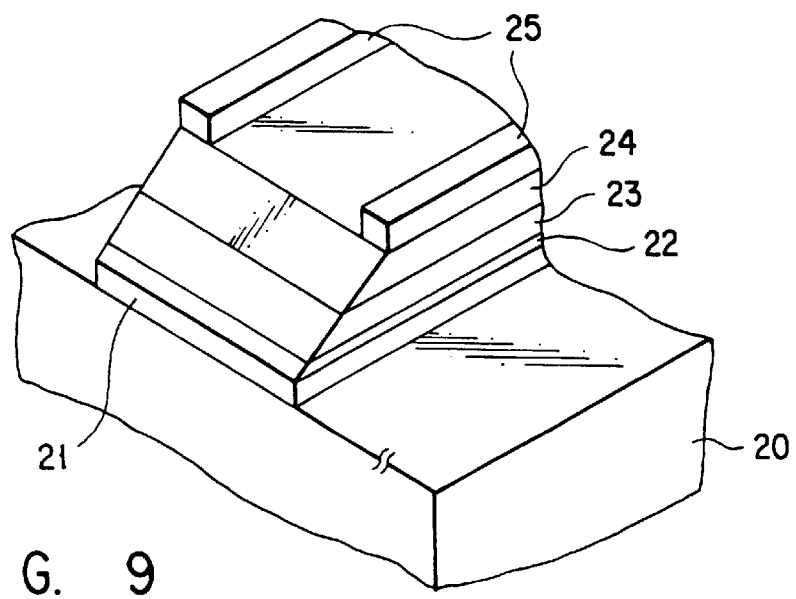
FIG. 9 is a perspective view showing another embodiment of the second invention of the present invention.

FIG. 9 is a perspective view showing another embodiment of the spin valve type magnetoresistance effect element according to the second invention of the present invention. The magnetoresistance effect element shown in FIG. 9 is manufactured as illustrated in FIGS. 10A to 10C.

Figure 10A:
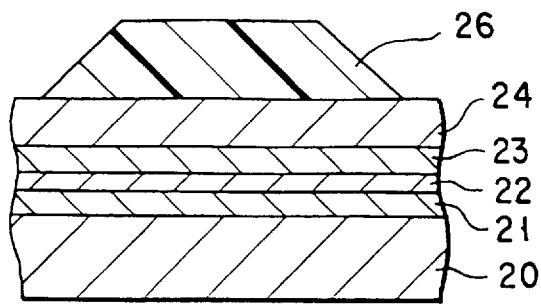
FIGS. 10A to 10C are sectional views showing steps of manufacturing a magnetoresistance effect element shown in FIG. 9.

First, as shown in FIG. 10A, a lower magnetic film 21 consisting of, e.g., an NiFe alloy and having a thickness of about 8 nm, a nonmagnetic film 22 consisting of, e.g., Cu and having a thickness of about 2 nm, an upper magnetic film 23 consisting of, e.g., an NiFe alloy and having a thickness of about 4 nm, and an antiferromagnetic film 24 consisting of, e.g., FeMn and having a thickness of about 14 nm are formed in sequence on a substrate 20. A resist layer 26 is then formed on top of the antiferromagnetic film 24.

Figure 10B:
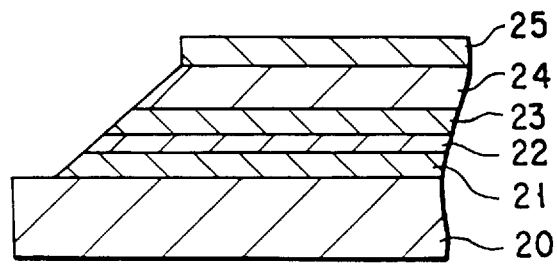
Figure 10C:
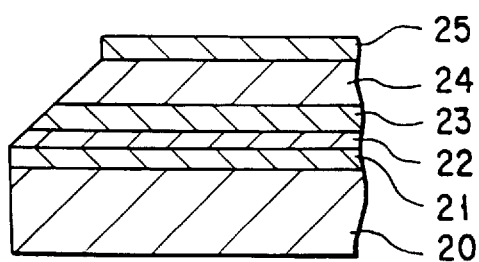

Subsequently, as shown in FIG. 10B, ion beam etching is so performed as to give a desired taper angle to these stacked films, the resist layer 26 is removed, and leads 25 are formed in the same fashion as in Embodiment B1. Furthermore, the element better be covered with protective layer made of e.g. $Al_2O_3$ and having a thickness of more than 0.5 $\mu$m. Thereafter, as shown in FIG. 10C, the substrate 20 is polished in the direction of depth by using a head sliding surface polishing method normally used in a head manufacturing step. In this case, even if the polishing reaches the nonmagnetic film 22 and the upper magnetic film 23, no problem arises as long as the antiferromagnetic film 24 is not externally exposed. In this manner, the magnetoresistance effect element shown in FIG. 9 is manufactured.

The second invention of the present invention is applicable to various element structures, such as a structure having three or more magnetic films and structures making use of various bias methods as countermeasures against Barkhausen noise, by using the magnetoresistance effect elements according to Embodiments B1 and B2 as the basic structures. The embodiments in which the second invention of the present invention is applied to these various element structures will be described below.

Embodiment B3

Figure 11:
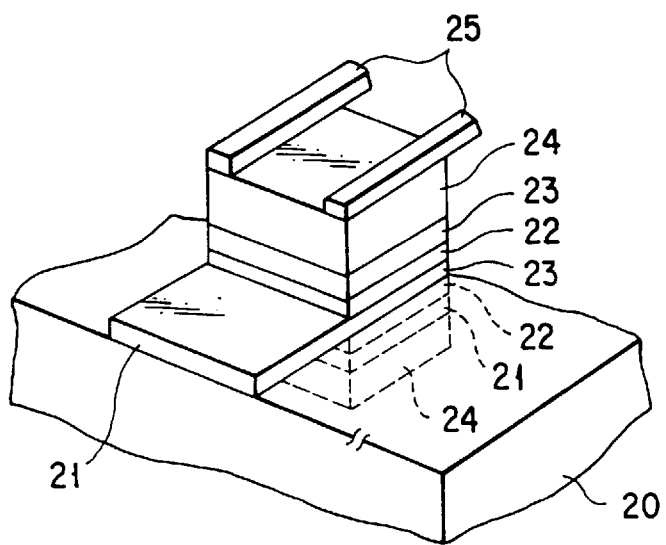
FIG. 11 is a perspective view showing still another embodiment of the second invention of the present invention.

FIG. 11 is a perspective view showing still another embodiment of the spin valve type magnetoresistance effect element according to the second invention of the present invention. The magnetoresistance effect element shown in FIG. 11 is manufactured as illustrated in FIGS. 12A to 12D.

Figure 12A:
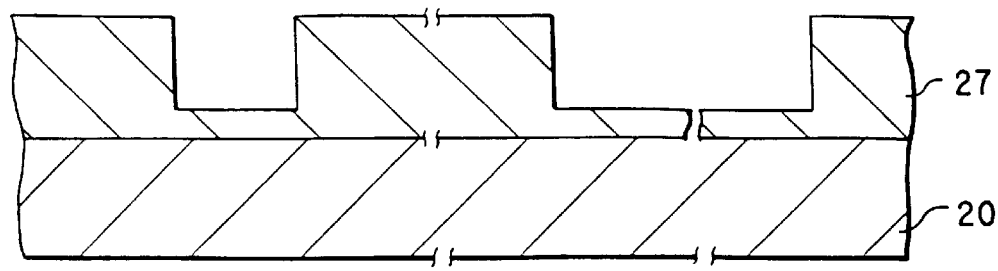
FIGS. 12A to 12D are sectional views showing steps of manufacturing a magnetoresistance effect element shown in FIG. 11.

As shown in FIG. 12A, an $SiO_2$ film 27 is formed on a substrate 20, and RIE (reactive Ion Etching) is performed by using $CF_4$ gas to form trenches 28 of a desired shape. At the same time, an identical trench with dimensions by which a stopper can be recognized during polishing is also formed in a portion having no influence on a head portion.

Figure 12B:
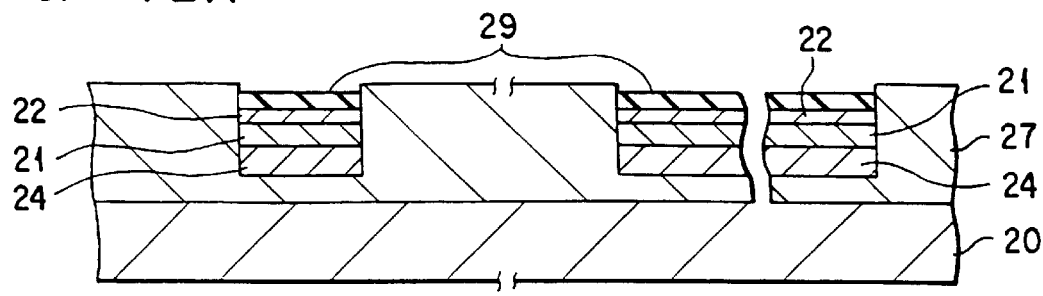

Subsequently, as shown in FIG. 12B, an antiferromagnetic film 24 consisting of, e.g., FeMn and having a thickness of about 14 nm, a lower magnetic film 21 consisting of, e.g., NiFe and having a thickness of about 4 nm, a nonmagnetic film 22 consisting of, e.g., Cu and having a thickness of about 2 nm, and a polysilicon film 29 serving as a stopper in polishing and having a thickness of about 0.5 nm are formed.

Figure 12C:
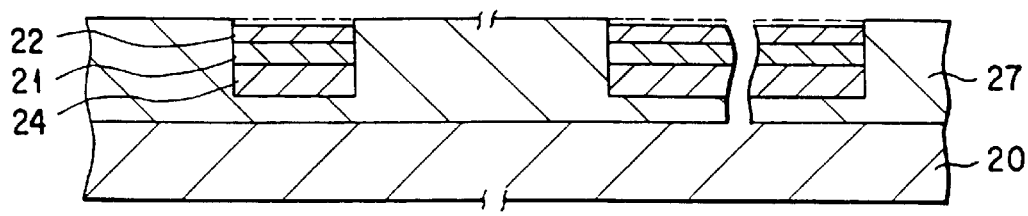
Figure 12D:
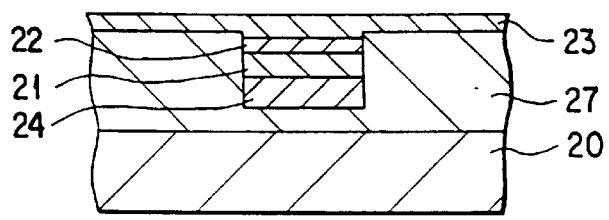

Subsequently, as shown in FIG. 12C, after polishing is performed until the stopper is partially or almost entirely removed, CDE (Chemical Dry Etching) is carried out by using $CF_4$ gas to remove the residual polysilicon as the stopper. Thereafter, as shown in FIG. 12D, an upper magnetic film 23 composed of, e.g., NiFe is formed to have a thickness of approximately 8 nm. Film formation is then performed on top of the upper magnetic film 23 in the same manner as in Embodiment B1, thereby completing the magnetoresistance effect element with the structure shown in FIG. 11.

With this arrangement, the resistance change rate can be nearly doubled since the magnetic films whose magnetizations are locked by the antiferromagnetic films are arranged on both sides of the magnetic film for sensing signals. In addition, the sensitivity is further improved by setting the magnetization locking direction of the two antiferromagnetic films in the direction of depth, and the direction of the axis of easy magnetization of the magnetic film for sensing signals in the direction of the track width, thereby making magnetizations perpendicular to each other. Also, since only one magnetic film is exposed to the head sliding surface while the antiferromagnetic films and the magnetic films whose magnetizations are locked by these antiferromagnetic films are formed inside the head, a magnetic head with a high reliability can be obtained.

Embodiment B4

Figure 13:
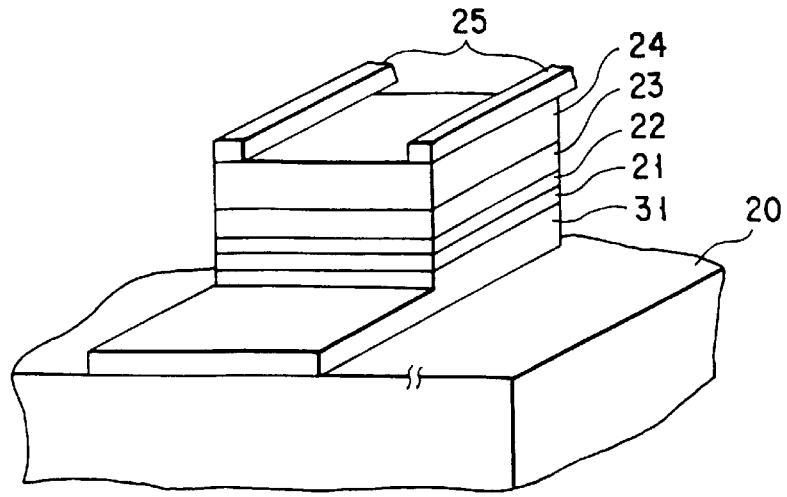
FIG. 13 is a perspective view showing still another embodiment of the second invention of the present invention.

FIG. 13 is a perspective view showing still another embodiment of the spin valve type magnetoresistance effect element according to the second invention of the present invention. The magnetoresistance effect element shown in FIG. 13 is manufactured as illustrated in FIGS. 14A to 14C.

Figure 14A:
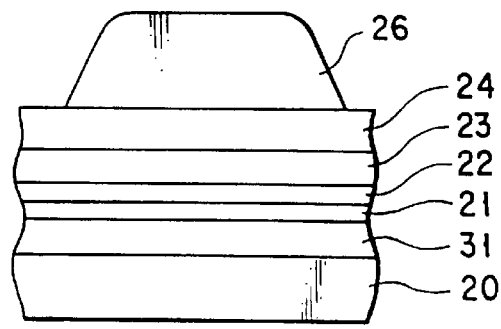
FIGS. 14A to 14C are sectional views showing steps of manufacturing a magnetoresistance effect element shown in FIG. 13.

As shown in FIG. 14A, an amorphous film 31 made from, e.g., CoZrNb and having a thickness of about 15 nm is formed on a substrate 20. Subsequently, a lower magnetic film 21 consisting of, e.g., CoFe or Co and having a thickness of about 4 nm, a nonmagnetic film 22 consisting of, e.g., Cu and having a thickness of about 3 nm, an upper magnetic film 23 consisting of, e.g., CoFe or Co and having a thickness of about 4 nm, and an antiferromagnetic film 24 consisting of, e.g., FeMn and having a thickness of about 14 nm are formed in this order. In addition, a resist layer 26 is formed on top of the antiferromagnetic film 24.

Figure 14B:
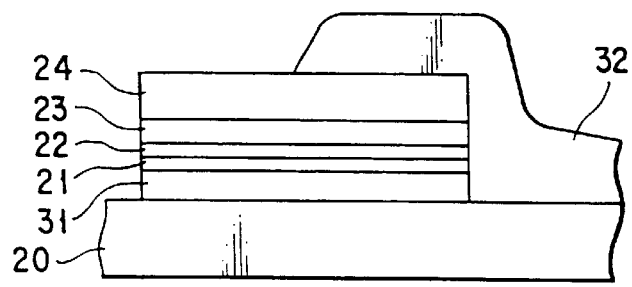
Figure 14C:
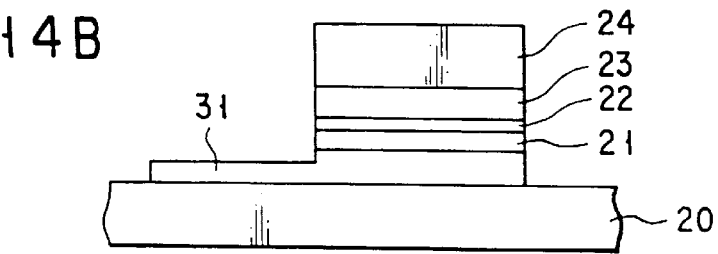

Subsequently, as shown in FIG. 14B, these stacked films are etched by using ion beam etching or the like, the resist layer 26 is removed, and a resist layer 32 with a desired shape is formed on a portion constituting a back spin valve layer. Thereafter, as shown in FIG. 14C, the resultant structure is etched by using, e.g., ion beam etching such that the amorphous film 31 is left behind. Although ion beam etching is usable as this etching, chemical etching also can be performed by selecting a solvent (which dissolves the films from the lower magnetic film 21 to the antiferromagnetic film 24 but does not dissolve the amorphous film 31), since an amorphous film generally have difficulty in dissolving in a solvent such as an acid. In this etching, the amorphous film 31 may be over-etched to some extent if soft magnetic characteristics are retained, or, in contrast, the lower magnetic film 21 may be left behind.

In addition, the use of chemical etching can prevent over-etching of the amorphous film 31.

Lastly, leads 25 are formed in the same way as in Embodiment B1, and polishing of a head sliding surface used in a regular head manufacturing step is performed in the direction of depth, completing the magnetoresistance effect element with the structure shown in FIG. 13.

In this structure, the amorphous film 31 is exchange-coupled to the lower magnetic film made from, e.g., CoFe or Co. Consequently, it is possible to obtain a thin film head having both good magnetic characteristics (a low coercive force) inherent in an amorphous film and a high resistance change rate inherent in a spin valve element using a Co-based magnetic film. In addition, since the amorphous film 31 has a high resistance, a shunt current from a sense current is small, and this prevents a decrease in sensitivity. It is also possible to form a very thin insulating film (about 1 nm thick) between the amorphous film 31 and the Co-based lower magnetic film 21. Furthermore, the bottom magnetic film, in this case amorphous film 31 may be a high-resistance magnetic film consisting of, e.g., ferrite, or a high-resistance film composed of a material formed by adding an additive element to NiFe, such as NiFeNb or NiFeMo.

Embodiment B5

Figure 15:
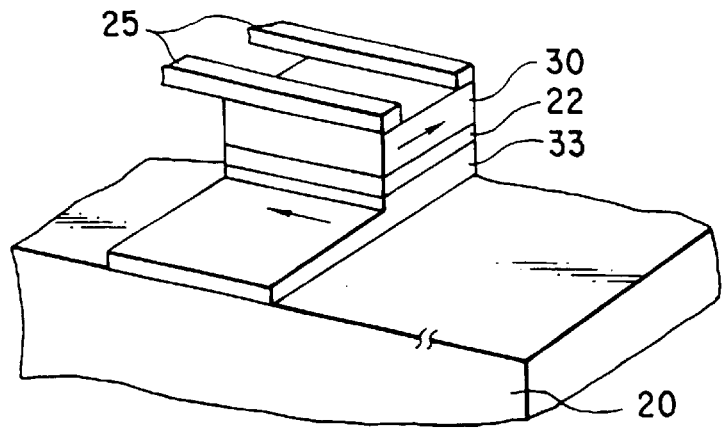
FIG. 15 is a perspective view showing still another embodiment of the second invention of the present invention.

FIG. 15 is a perspective view showing still another embodiment of the spin valve type magnetoresistance effect element according to the second invention of the present invention. The magnetoresistance effect element shown in FIG. 15 is manufactured as illustrated in FIGS. 16A to 16C.

Figure 16A:
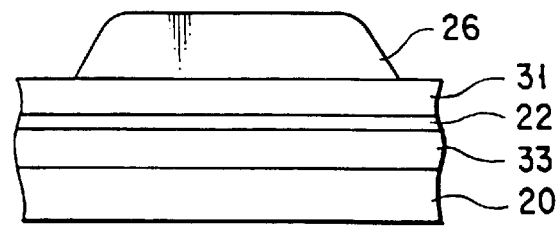
FIGS. 16A to 16C are sectional views showing steps of manufacturing a magnetoresistance effect element shown in FIG. 15.

As shown in FIG. 16A, a magnetic film 33 consisting of NiFe and having a thickness of about 8 nm is formed on a substrate 20. Subsequently, a nonmagnetic film 22 consisting of Cu and having a thickness of about 3 nm and a high-coercive-force film 30 consisting of CoFe or Co and having a thickness of about 8 nm are formed in this order. In addition, a resist layer 26 is formed on top of the high-coercive-force film 30.

Figure 16B:
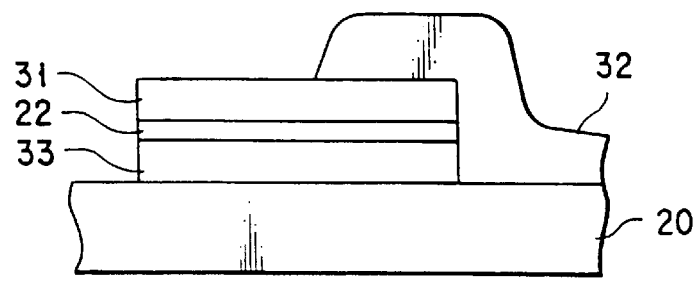
Figure 16C:
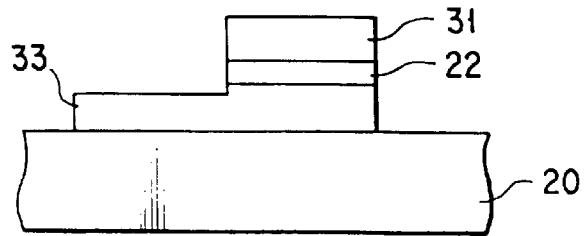

Subsequently, as shown in FIG. 16B, these stacked films are etched by using ion beam etching or the like, the resist layer 26 is removed, and a resist layer 32 with a desired shape is formed on a portion (the interlayer and the magnetic film) for constituting a back spin valve layer. Thereafter, as shown in FIG. 16C, the resultant structure is etched by using, e.g., ion beam etching such that the magnetic film 33 is left behind. In this etching, the magnetic film 33 may be over-etched to some extent if soft magnetic characteristics are retained, or, in contrast, the nonmagnetic film 22 may be left behind.

Lastly, leads 25 are formed in the same way as in Embodiment B1, and polishing of a head sliding surface used in a regular head manufacturing step is performed in the direction of depth, completing the magnetoresistance effect element with the structure shown in FIG. 15.

With this arrangement, magnetization can be locked by magnetizing Co without using FeMn. In addition, a high resistance change rate can be obtained for a signal magnetic field by setting the magnetization direction of Co in the direction of depth, arranging the leads 25 as shown in FIG. 15, and locking the magnetization of the magnetic film 33 in the direction of the track width by using a current magnetic field generated by a sense current.

It is also possible to greatly decrease an increase in Hc which is a problem in a Shinjo type magnetoresistance effect element in which Co, Cu, and NiFe have the same shape, since the magnetic film 33 is formed to be larger than the Co-based magnetic film. Although a problem of an influence on a medium may be brought about when a high-coercive-force film such as a Co-based magnetic film is arranged on the head sliding surface, such a problem can be eliminated by arranging the high-coercive-force film away from the head sliding surface as in the structure of this embodiment.

Embodiment B6

FIG. 17 is a perspective view showing still another embodiment of the spin valve type magnetoresistance effect element according to the second invention of the present invention. The magnetoresistance effect element shown in FIG. 17 is manufactured as illustrated in FIGS. 18A to 18C.

As shown in FIG. 18A, a lower magnetic film 21 consisting of, e.g., CoFe or Co and having a thickness of 4 nm, a nonmagnetic film 22 consisting of, e.g., Cu and having a thickness of about 3 nm, and an upper magnetic film 23 consisting of, e.g., CoFe or Co and having a thickness of 4 nm are formed in sequence on a substrate 20. In addition, a resist layer 26 is formed on top of the upper magnetic film 23 to form a portion constituting an intermediate spin valve layer.

Subsequently, as shown in FIG. 18B, the nonmagnetic film 22 and the upper magnetic film 23 are removed by ion beam etching or the like except for portions below the resist layer 26. Subsequently, as shown in FIG. 18C, the lower magnetic film 21 is removed by, e.g., ion beam etching so as to leave portions extending back and forth from the nonmagnetic film 22 and the upper magnetic film 23. Thereafter, leads are formed in the same fashion as mentioned earlier, thereby completing the magnetoresistance effect element with the structure shown in FIG. 17.

In the structure shown in FIG. 17, an amorphous film composed of, e.g., CoZrNb as described above may be formed as an undercoating film of the lower magnetic film 21 such that this amorphous film is exposed to the head sliding surface, and the films from the lower magnetic film 21 to the upper magnetic film 23 are stacked in a middle portion. It is also possible to form an antiferromagnetic film or a high-coercive-force film on top of the upper magnetic film such that at least the nonmagnetic film, the upper magnetic film, and the antiferromagnetic film or the high-coercive-force film exist inside the head, and the lower magnetic film or the amorphous film is exposed to the head sliding surface.

In this case, the antiferromagnetic film or the high-coercive-force film serves to lock magnetization of the upper magnetic film. The direction of this magnetization locking may be either the direction of the track width or a direction perpendicular to the track width direction. When the magnetization of the upper magnetic film is locked in the track width direction, the magnetizations of the upper and lower magnetic films are antiparallel to each other since the axis of easy magnetization of the lower magnetic film is also in the track width direction, thereby magnetostatically coupling them. This enhances the effect of suppressing noise but decreases the sensitivity. When the magnetization of the upper magnetic film is locked in the direction perpendicular to the track width direction, on the other hand, the magnetizations of the upper and lower magnetic films are perpendicular to each other because the axis of easy magnetization of the lower magnetic film is in the track width direction. This makes it possible to realize parallel and antiparallel states by using an external magnetic field. Therefore, a high enough sensitivity can be obtained, but the noise reducing effect is weakened.

Figure 19:
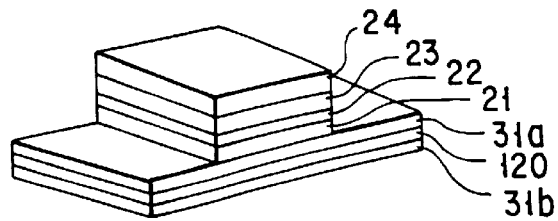
FIG. 19 is a perspective view showing still another embodiment of the second invention of the present invention.

When an amorphous film is to be exposed to the head sliding surface, it is preferred to form, as shown in FIG. 19, a nonmagnetic film 120 consisting of Ta or the like between amorphous films 31a and 31b for the purpose of reducing noise. This is so because this stacked structure of the amorphous film magnetostatically couples the magnetizations of the upper and lower magnetic films, making it possible to point the axis of easy magnetization in the direction of the track width more easily (as indicated by an arrow in FIG. 19), thereby preventing formation of domain walls. In addition, since the magnetization of the lower amorphous film 31b is applied with a magnetic field in the opposite direction due to coupling with the upper magnetic film 23, the film thickness of the lower amorphous film 31b may be set to be larger than that of the upper amorphous film 31a.

Figure 20:
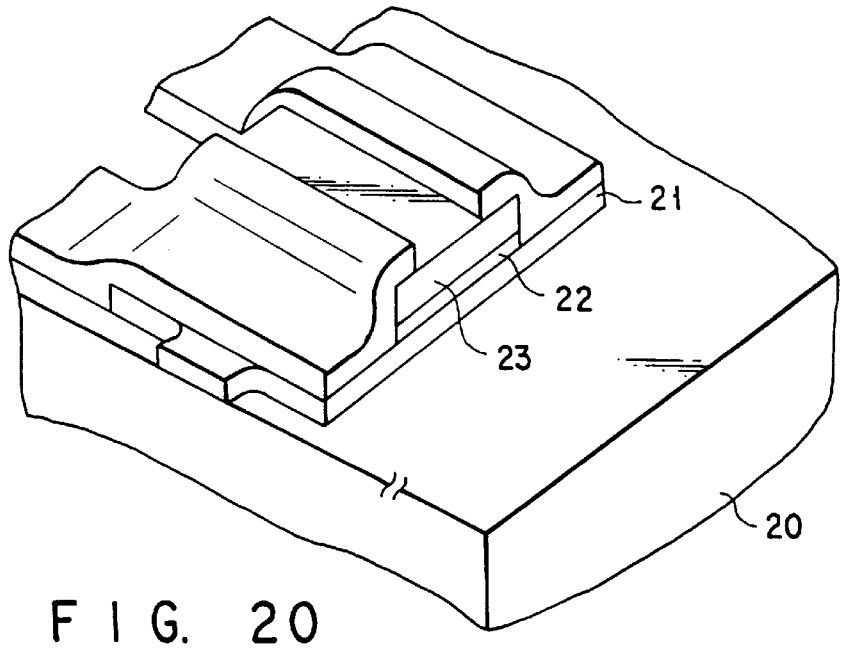
FIG. 20 is a perspective view showing still another embodiment of the second invention of the present invention.

In this structure, if the track width is small, the area that the spin valve unit occupies becomes small, and this may lead to a decrease in sensitivity. It is, however, possible to obtain a magnetoresistance effect element which maintains a high sensitivity regardless of the track width by forming the lower magnetic film 21 into a shape as illustrated in FIG. 20. In this arrangement, leads may be exposed to the head sliding surface.

The second invention of the present invention is applicable to various element structures, such as a structure having three or more magnetic films and structures making use of various bias methods as countermeasures against Barkhausen noise, by using the magnetoresistance effect elements according to Embodiments B1 to B5 as the basic structures. The embodiments in which the second invention of the present invention is applied to these various element structures will be described below.

Embodiment B7

Figure 21:
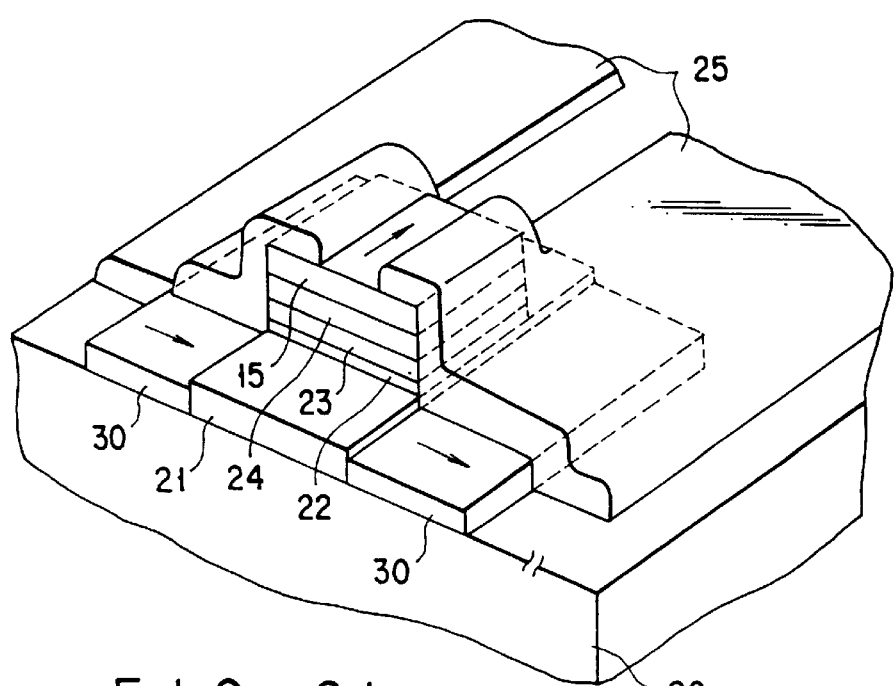
FIG. 21 is a perspective view showing still another embodiment of the second invention of the present invention.

FIG. 21 is a perspective view showing still another embodiment of the spin valve type magnetoresistance effect element according to the second invention of the present invention. The magnetoresistance effect element shown in FIG. 21 is manufactured as illustrated in FIGS. 22A to 22E.

As shown in FIG. 22A, a lower magnetic film 21 consisting of, e.g., CoFe or Co and having a thickness of about 4 nm, a nonmagnetic film 22 consisting of, e.g., Cu and having a thickness of about 3 nm, an upper magnetic film 23 consisting of, e.g., CoFe or Co and having a thickness of about 4 nm, and an antiferromagnetic film 24 consisting of, e.g., FeMn and having a thickness of about 14 nm are formed in sequence on a substrate 20. A resist layer 26 is also formed on the antiferromagnetic film 24 in a portion constituting a back spin valve layer. At this time, a protective film 15 made from, e.g., Ti may be formed to have a thickness of approximately 10 nm between the antiferromagnetic film 24 and the resist layer 26.

Subsequently, as shown in FIG. 22B, the nonmagnetic film 22, the upper magnetic film 23, the antiferromagnetic film 24, and the protective film 15 are etched by ion beam etching or the like. Thereafter, a resist layer 26 patterned into a shape as illustrated in FIG. 22C is formed, and the films from the lower magnetic film 21 to the protective film 15 are etched by, e.g., ion beam etching.

Subsequently, as shown in FIG. 22D, a high-coercive-force film 30 is formed without removing the resist layer 26. After the resist layer 26 is removed, as shown in FIG. 22E, a resist is formed into a desired shape on the high-coercive-force film, the lower magnetic film, and the spin valve unit. Thereafter, the resultant structure is etched by using ion beam etching or the like, and leads are formed in the same manner as described above, thereby completing the magnetoresistance effect element with the structure shown in FIG. 21.

In this structure, the lower magnetic film 21 may extend not only to the head sliding surface but to inside the head. That is, as shown in FIG. 21, the spin valve unit may be present in a middle portion of the lower magnetic film 21. The structure can also be modified in consideration of a demagnetizing field such that the lower magnetic film 21 extends only to the head sliding surface, i.e., the spin valve unit exits in a side edge portion of the lower magnetic film 21 inside the head. Furthermore, an amorphous film composed of, e.g., CoZrNb may be formed as an undercoating film of the lower magnetic film 21 such that this amorphous film is exposed to the head sliding surface and the stacked films from the lower magnetic film to the upper magnetic film are present in the middle portion.

In this case, the film thickness of the high-coercive-force film 30 may be equal to that of the lower magnetic film 21. When, however, the influence of an exchange coupling force that the antiferromagnetic film 24 has on the upper magnetic film and the influence of the magnitude of an anisotropic magnetic field that the high-coercive-force film 30 has on the lower magnetic film 21 are taken into account, the film thicknesses may increase toward the upper magnetic film 23, or, in contrast, the thickness of the high-coercive-force film 30 may be smaller than that of the lower magnetic film 21. It is desirable that the film thickness of the high-coercive-force film 30 be smaller than that of the lower magnetic film 21 when the influence of a leakage magnetic field from the high-coercive-force film is taken into consideration.

When the influence of an exchange coupling force that the antiferromagnetic film 24 has on the upper magnetic film 23 and the influence of the magnitude of an anisotropic magnetic field that the high-coercive-force film 30 has on the lower magnetic film 21 are further taken into account, the high-coercive-force film 30 and the lower magnetic film 21 need not be coupled, and the high-coercive-force film 30 may be formed inside the head without being exposed to the head sliding surface.

Figure 23:
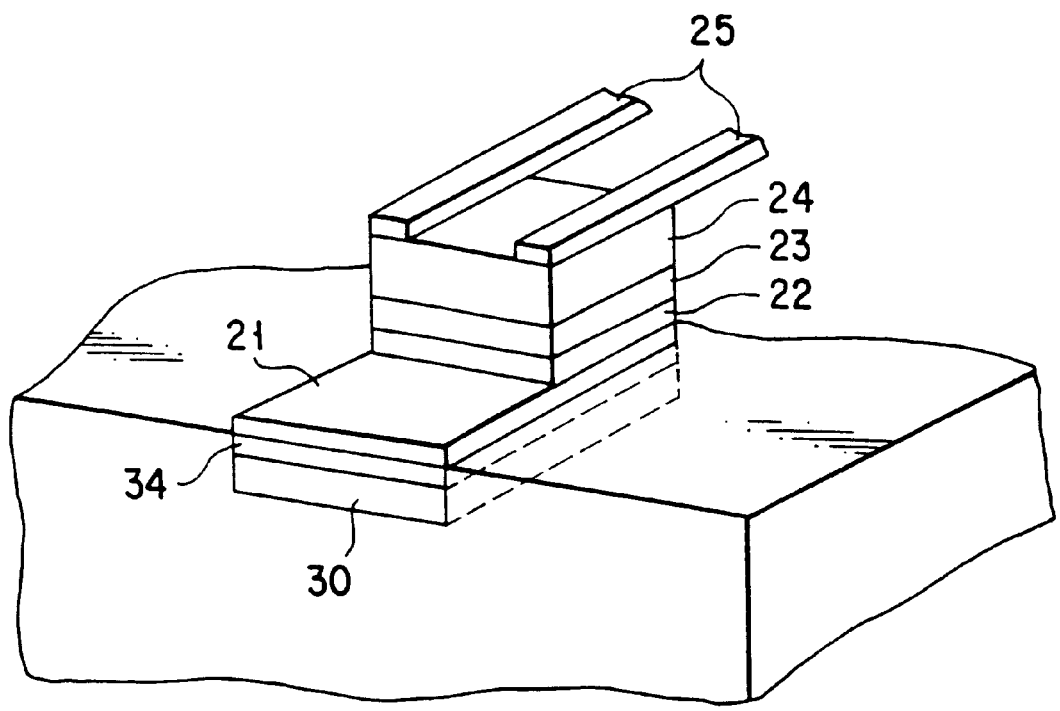
FIG. 23 is a perspective view showing still another embodiment of the second invention of the present invention.

In addition, by using the method of burying described in Embodiment B3, it is possible to form a high-coercive-force film 30 and a magnetic insulating film 34 in this order, as shown in FIG. 23, thereby allowing a lower magnetic film 21 to have a single magnetic domain by using magnetostatic coupling with this high-coercive-force film 30.

In this case, the magnetization of this high-coercive-force film desirably points in the direction of the film surface for the reason explained below. That is, assume, for example, that a high-coercive-force film is arranged on both sides of a magnetic film (the lower magnetic film 21 shown in FIG. 21) whose magnetization is to be locked, as shown in FIG. 21. In this case, if the magnetization of the high-coercive-force film has a perpendicular component, not only an adverse effect on magnetization locking of the lower magnetic film 21 is brought about, but a leakage magnetic field to the upper magnetic film is generated, making it difficult to control the magnetization state.

Assume also that, as shown in FIG. 23, a high-coercive-force film is stacked, via a nonmagnetic film, on a magnetic film (the lower magnetic film 21 shown in FIG. 23) whose magnetization is to be locked. In this case, if the magnetization of the high-coercive-force film has a perpendicular component, the magnetization of the lower magnetic film can no longer be locked in the surface of the film, and this adversely affects the soft magnetic characteristics of the lower magnetic film. The direction of magnetization of this high-coercive-force film largely depends upon its crystal structure. That is, when an hcp(002) orientation is strengthened in the high-coercive-force film, its magnetization tends to point in a direction perpendicular to the film surface. Therefore, the magnetization becomes difficult to aim in the direction perpendicular to the film surface by suppressing this hcp(002) orientation, and this makes it possible to obtain a high-coercive-force film suitable as a magnetization locking film.

In the magnetic head manufacturing process, on the other hand, a high-coercive-force film is formed by a lift-off method in many cases. In the lift-off method, a high-coercive-force film is formed by sputtering in a hole formed in a resist layer. In this method, therefore, in order to smoothly remove the resist layer after the film formation without forming burrs, a target and a substrate must be opposed each other. However, a high-coercive-force film readily causes the hcp(002) orientation when it is formed by sputtering with a target and a substrate opposed each other.

Figure 24A:
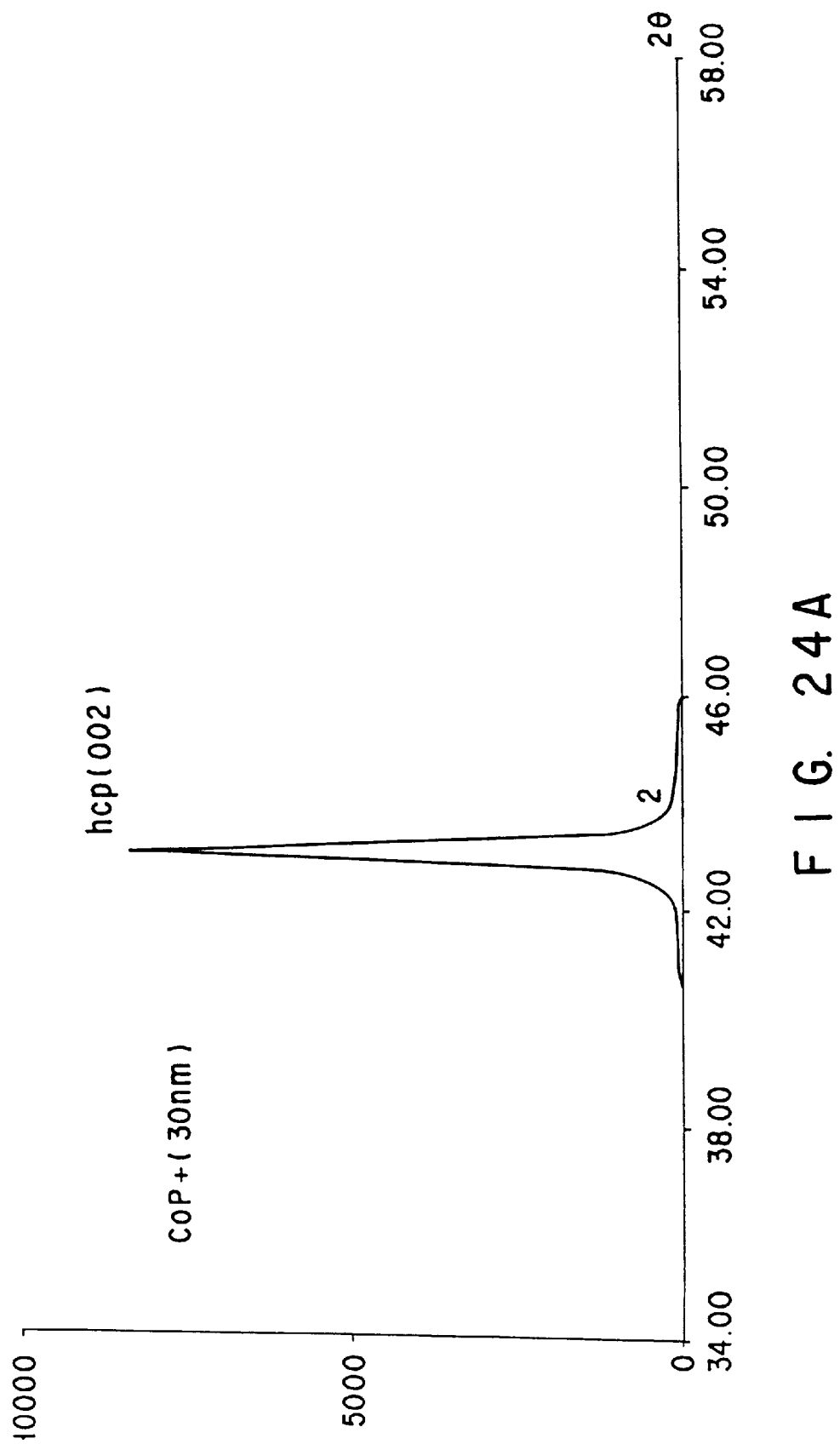
FIGS. 24A and 24B are graphs showing X-ray diffraction result of the embodiment of the second invention of the present invention.
Figure 24B:
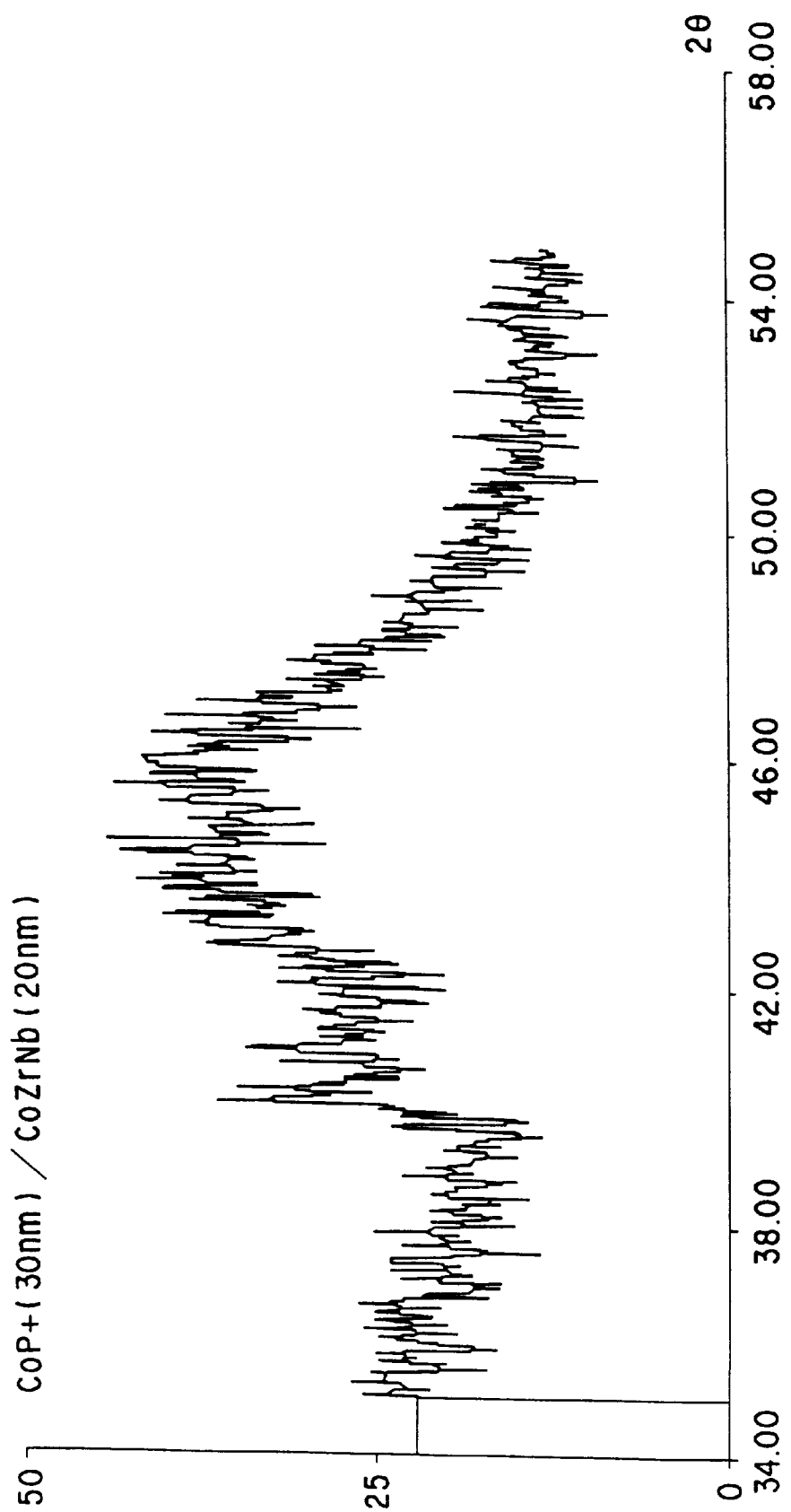

To solve this problem, a CoZrNb film was used as an undercoating film of the high-coercive-force film in this embodiment for the purpose of suppressing the hcp(002) orientation. The results of X-ray diffraction indicating the crystallinity of this arrangement are shown in FIGS. 24A and 24B. More specifically, FIG. 24A shows the result when a 30-nm thick CoPt high-coercive-force film was formed, and FIG. 24B shows the result when a 20-nm thick CoZrNb film was formed as an undercoating film and then a 30-nm thick CoPt high-coercive-force film was formed on it. As is apparent from FIGS. 24A and 24B, when the amorphous film was used as an undercoating film, the hcp(002) orientation of the CoPt high-coercive-force film was discouraged. In addition, the squareness ratio of CoZrNb/CoPt exhibited a high value of 0.85, while that of CoPt alone was 0.6. This demonstrates that magnetization tends to point in the direction of the film surface more easily when an amorphous undercoating film is formed. As described above, it is found that the use of an amorphous undercoating film is effective when a high-coercive-force film is used as a magnetization locking film.

In the structures shown in FIGS. 21 and 23, therefore, forming an amorphous undercoating film below the high-coercive-force film further enhances the noise reducing effect and improves permeability because degradation of soft magnetic characteristics is prevented. This makes it possible to obtain a magnetoresistance effect element with a higher sensitivity.

Note that the same effect as described above could be obtained even when this amorphous undercoating film was formed by oblique incident sputtering. Note also that the effect of this amorphous undercoating film can be applied to a magnetoresistance effect element constituted by a normal single-layered film as well as the spin valve type magnetoresistance effect element.

As described above, by arranging the high-coercive-force film 30 on both sides of the lower magnetic film 21, it is possible to reduce Barkhausen noise caused by the multi-domain nature of the magnetic film for sensing signals. In addition, since the antiferromagnetic film 11 is present inside the head, a highly reliable magnetic head can be manufactured.

Furthermore, as shown in FIG. 21, the magnetizations of the lower magnetic film 21 and the upper magnetic film 23 can be made perpendicular to each other in an initial state with no external magnetic field by setting the magnetization of the high-coercive-force film 30 in the direction of the track width and the magnetization of the antiferromagnetic film 21 in the direction of depth. This makes it possible to obtain a magnetic head with a higher sensitivity than that of an element in which magnetizations in an initial state are antiparallel to each other.

Embodiment B8

In Embodiments B8 to B13 below, high-coercive-force fine particles are deposited on a magnetoresistance effect element film such that their axes of easy magnetization are aligned. Since the high-coercive-force fine particles are arranged in direct contact with the magnetoresistance effect element film, an exchange bias is applied to the magnetoresistance effect element film. In addition, since interactions between the fine particles are weak, a decrease in coercive force is small even if they are coupled directly to a soft magnetic film. Furthermore, the size of the fine particles is much smaller than a magnetization locked region (passive region). Therefore, an change bias is applied evenly on the entire surface of the passive region. Since the fine particles are deposited with their axes of easy magnetization aligned in a direction along which a bias magnetic field is to be applied, a bias magnetic field with a small dispersion is applied in one direction in the film surface. Also, uniaxial magnetic anisotropy is present in the fine particles. Therefore, even if a strong signal magnetic field exceeding the coercive force is applied, the fine particles can be returned to the original magnetization state.

It is therefore possible to provide a high-reliability, high-quality magnetoresistance effect head by depositing the high-coercive-force fine particles on the magnetoresistance effect element film and applying a bias magnetic field.

Figure 56:
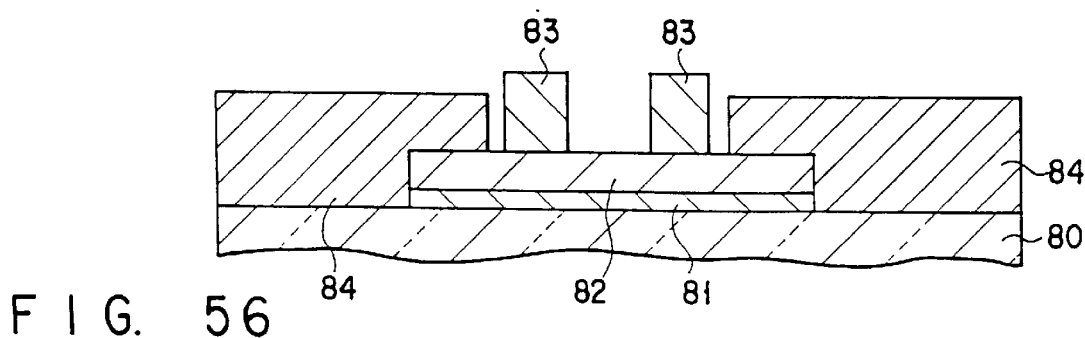
FIG. 56 is a sectional view showing one modification of the second invention of the present invention.

FIG. 56 is a sectional view showing this embodiment. Referring to FIG. 56, a shunt bias film 81 consisting of Cu and a magnetoresistance effect film 82 consisting of $Ni_{80}Fe_{20}$ are stacked on a substrate 80. The shunt bias film 81 and the magnetoresistance effect film 82 are so patterned to have rectangular sectional shapes. In addition, leads 83 are formed on the magnetoresistance effect film 82 to allow a sense current to flow. An FeCo-based high-coercive-force fine-particle layer 84 is also formed on the substrate 80 so as to cover both end portions of the magnetoresistance effect film 82. Each high-coercive-force fine particle is a needle crystal whose major axis direction is the axis of easy magnetization. The axes of easy magnetization of these fine particles are oriented along the longitudinal direction of the section.

The relationship between the resistance and the magnetic field of the magnetoresistance effect element with the above arrangement was examined by applying an external magnetic field to this magnetoresistance effect element in a direction perpendicular to the flowing direction of a sense current. As a result, no discontinuous point derived from Barkhausen noise was observed on the resistance-magnetic field curve.

This magnetoresistance effect element is manufactured as follows. First, a 5-nm thick Cu film and a 20-nm thick $Ni_{80}Fe_{20}$ film are formed in sequence on the substrate 80 by sputtering. Subsequently, these two films are patterned into a rectangular shape of 5 μm×50 μm. In addition, a Cu film is formed on the $Ni_{80}Fe_{20}$ by sputtering and patterned to form leads. At this point, a track width (active region) is defined by the distance between the leads.

Subsequently, a paint prepared by mixing FeCo alloy fine particles into an organic binder is coated on the entire surface of the magnetoresistance effect element while applying a magnetic field along the longitudinal direction of the pattern of the element. After a resist is coated on the paint, exposure and development are carried out such that the high-coercive-force layer 84 is left behind with dimensions of 10 μm×100 μm on each end portion of the element. The result is the magnetoresistance effect element shown in FIG. 56.

The volume density (i.e., the packing density) of the high-coercive-force fine particles in the paint is approximately 40%. The residual magnetic charge in the direction (of the axis of easy magnetization) along which the major axes of the high-coercive-force fine particles are arranged is approximately 90% the saturation magnetic charge. Note that the dimensions of each magnetic fine particle are about 200 to 300 nm, in the major axis direction, and about 40 nm, in the minor axis direction.

Embodiment B9

In Embodiment B9 described above, the high-coercive-force fine-particle layers 84 are formed on only the two end portions of the magnetoresistance effect film 82. However, as shown in FIG. 57, a nonmagnetic magnetically insulating film 85 may be formed on an active region, and a high-coercive-force fine-particle layer 84 may be formed on the entire surface of a magnetoresistance effect film 82. Since FIG. 57 is a sectional view, the high-coercive-force fine-particle layer 84 appears to be formed on top of leads 83. Actually, however, only a portion near the magnetoresistance effect film 82 is covered with the high-coercive-force layer 84, and the leads 83 are exposed. Therefore, a sense current can be supplied.

Dispersion of magnetization in the high-coercive-force fine-particle layer 84 is smaller than that in a single-layered high-coercive-force film generally formed by a thin film formation process. Therefore, when the high-coercive-force fine-particle layer 84 and the magnetoresistance effect film 82 are spaced apart from each other by the nonmagnetic magnetically insulating film 85 in the active region as described above, it is possible to reduce degradation of soft magnetism caused by an inflowing magnetic flux to the active region, which is produced from a dispersed magnetization component of the high-coercive-force film generated during thin film formation. This makes it possible to obtain a better soft magnetism in the active region.

An identical effect can be obtained in a structure in which a high-coercive-force fine-particle layer 84 is formed below the magnetoresistance effect element. Note that the surface undulations of the high-coercive-force fine-particle layer 84 are affected by the surface flatness of the magnetically insulating film.

Embodiment B10

The high-coercive-force fine particles described in Embodiments B8 and B9 were made from an FeCo alloy, and the packing density of the fine particles in the paint was set to about 40%. A bias magnetic field can be varied by changing the packing density or the material of the high-coercive-force fine particles. As an example, it was confirmed that a bias magnetic field decreased to approximately ⅓ when γ-iron oxide was used as the material of the high-coercive-force fine particles. It was also found that the bias magnetic field increased when the packing density in the paint was raised. The same effect was obtained when γ-iron oxide added with Co, chromium oxide, and iron were used as the material of the high-coercive-force fine particles.

Embodiment B11

In the magnetoresistance effect elements described in Embodiments B8 to B10, the high-coercive-force fine-particle layer 84 functions as a longitudinal bias film. An operating bias, on the other hand, is given by a shunt current flowing through the shunt bias film 81 formed below the magnetoresistance effect film 82.

FIG. 58 is a sectional view showing still another embodiment of this invention. Referring to FIG. 58, square holes are formed in a passive region of a silicon substrate 86, and high-coercive-force fine-particle layers 84 are formed in these holes to flatten the surface. A magnetoresistance effect film 82 and leads 83 are formed on the resultant structure.

FIG. 59 is a plan view showing the magnetoresistance effect element illustrated in FIG. 58. In forming the high-coercive-force fine-particle layers 84 inside the holes, i.e., in filling a paint containing high-coercive-force fine particles into the holes and heating the paint, a magnetic field was applied in a direction (with an angle of about 45° with respect to the longitudinal direction of the magnetoresistance effect film) indicated by broken arrows in FIG. 59, thereby locking magnetization. When the relationship between the resistance and the magnetic field of this magnetoresistance effect element was checked, it was found that Barkhausen noise was reduced and a good operating point bias was applied.

This magnetoresistance effect element is manufactured as follows. First, the silicon substrate 86 is masked and subjected to chemical etching, forming holes about 5 μm in depth with an interval of 6 μm. Subsequently, FeCo alloy fine particles are mixed in an organic binder to prepare a paint, and the paint is coated on the entire surface of the silicon substrate 86. While a magnetic field is applied in a direction indicated by a broken arrow in FIG. 61, the resultant structure is heated to remove the organic binder, thereby forming the high-coercive-force fine-particle layers 84. Polishing is performed for the resultant structure to remove the high-coercive-force fine-particle layers 84 formed on portions except for the holes, thereby flattening the silicon substrate 86.

Subsequently, the magnetoresistance effect film 82 is formed by sputtering to have a thickness of approximately 20 nm on the silicon substrate 86 and patterned into a stripe of 30 μm×2 μm. Thereafter, a Cu layer about 200 nm thick was formed and patterned to form the leads 83.

The positional relationship between the leads 83 and the high-coercive-force fine-particle layers 84 can be chosen appropriately. For example, when the interval between the high-coercive-force fine-particle layers 84 is smaller than the interval between the leads, a track width can be defined by the interval between the high-coercive-force fine-particle layers 84.

Embodiment B12

Figure 60:
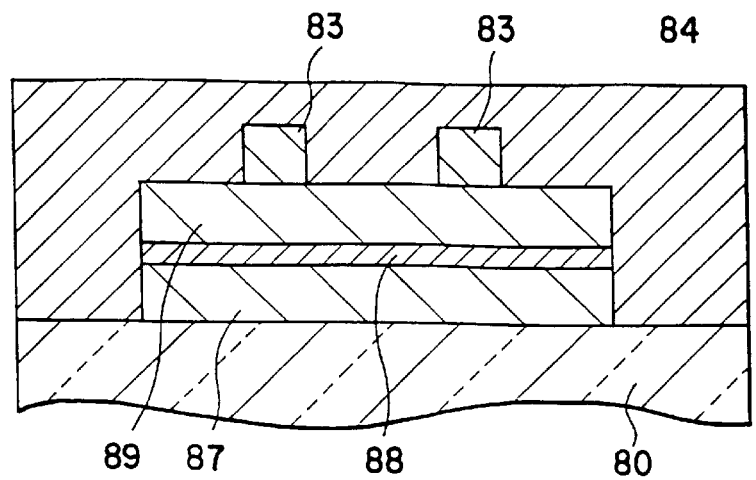
FIG. 60 is a sectional view showing still another modification of the second invention of the present invention.

In Embodiments B8 to B11, the structures using the anisotropic magnetoresistance effect of the magnetoresistance effect film 82 have been described. In this embodiment, a structure making use of a magnetoresistance effect obtained by spin-dependent scattering will be described. FIG. 60 is a sectional view showing a magnetoresistance effect element using the magnetoresistance effect obtained by spin-dependent scattering. This magnetoresistance effect element is manufactured as follows.

First, an 8-nm thick $Co_{90}Fe_{10}$ lower magnetic film 87, a 3-nm thick Cu nonmagnetic film 88, and an 8-nm thick $Co_{90}Fe_{10}$ upper magnetic film 89 are formed on a glass substrate 80 by sputtering. The resultant stacked film is patterned into a stripe, and leads 83 are formed on top of the upper magnetic film 89. Subsequently, a high-coercive-force fine-particle layer 84 is formed by using FeCo alloy fine particles such that the axes of easy magnetization of the high-coercive-force fine particles are aligned in the longitudinal direction of the stripe.

In the magnetoresistance effect element with this arrangement, magnetization of the upper magnetic film 89 in direct contact with the high-coercive-force fine-particle layer 84 is locked in the longitudinal direction of the stripe. On the other hand, magnetization of the lower magnetic film 87 is rotatable according to the external magnetic field. As a consequence, an angular difference is produced between the magnetization directions of the upper and lower magnetic films 89 and 87 sandwiching the nonmagnetic film 88. This gives rise to a resistance change resulting from spin-dependent scattering. The high-coercive-force fine-particle layer 84 need only be formed in a region corresponding to the track width. In addition, the magnetization direction is not limited to the longitudinal direction of the stripe but may be its widthwise direction.

Embodiment B13

In the structures explained in Embodiments B8 to B12 above, the high-coercive-force fine-particle layer 84 is in direct contact with the magnetoresistance effect film 82. This direct contact allows the high-coercive-force fine-particle layer 84 and the magnetoresistance effect film 82 to be exchanged-coupled to each other. Note that even if the high-coercive-force fine-particle layer 84 is in contact with the magnetoresistance effect film 82 with a nonmagnetic substance sandwiched between them, a bias magnetic filed can be applied when the two are magnetostatically coupled.

Figure 61:
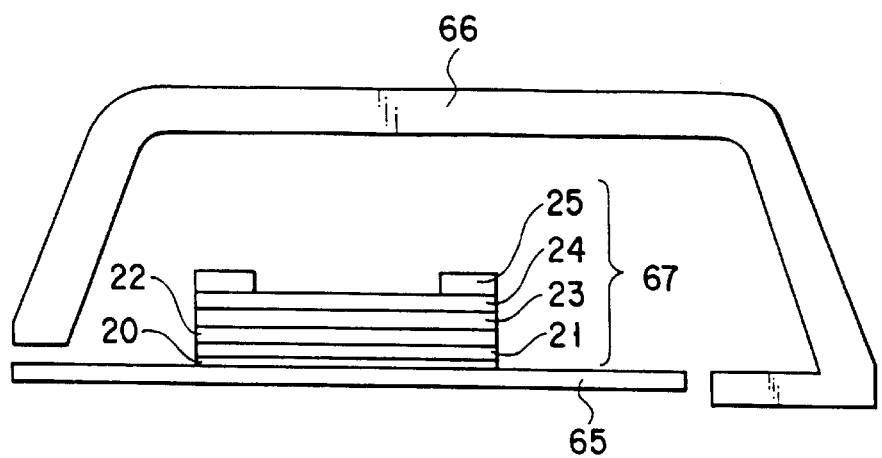
FIG. 61 is a view showing one embodiment of a thin film head using the magnetoresistance effect element of the present invention.

FIG. 61 shows an embodiment in which the spin valve unit of the second invention of the present invention is applied to a yoke type reproducing head. In this structure, a magnetic flux is guided to an element unit 67 by using a magnetic gap formed between a soft magnetic body 65 and a soft magnetic yoke 66.

Figure 62:
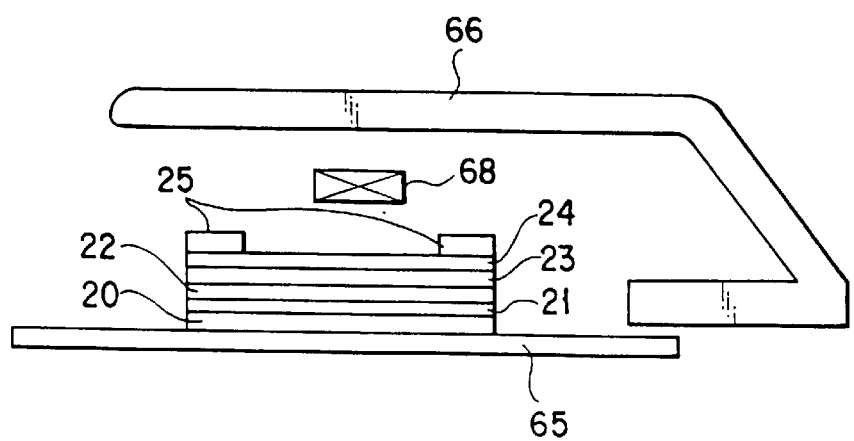
FIG. 62 is a view showing another embodiment of the thin film head using the magnetoresistance effect element of the second invention.

FIG. 62 shows an embodiment in which the spin valve unit of the present invention is applied to a perpendicular recording type head. In this structure, a soft magnetic body 65 also serves as a primary magnetic pole piece for recording. In some cases, leads may be extended in a direction pointing out from the paper so as to be used as a recording coil 68.

In either structure, the soft magnetic body 65 is extended backward in order to decrease a demagnetizing field to thereby improve reproducing sensitivity.

The embodiments in which an interlayer is not exposed to the head sliding surface will be described below.

Embodiment B14

Figure 25:
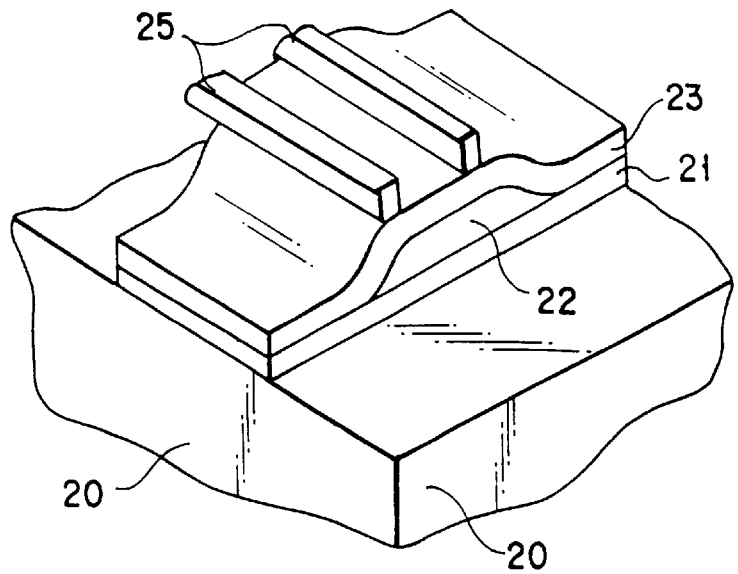
FIG. 25 is a perspective view showing still another embodiment of the second invention of the present invention.

FIG. 25 is a perspective view showing still another embodiment of the spin valve type magnetoresistance effect element according to the second invention of the present invention. The magnetoresistance effect element shown in FIG. 25 is manufactured as illustrated in FIGS. 26A to 26C.

Figure 26A:
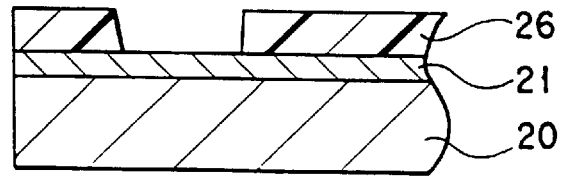
FIGS. 26A to 26C are sectional views showing steps of manufacturing a magnetoresistance effect element shown in FIG. 25.
Figure 26B:
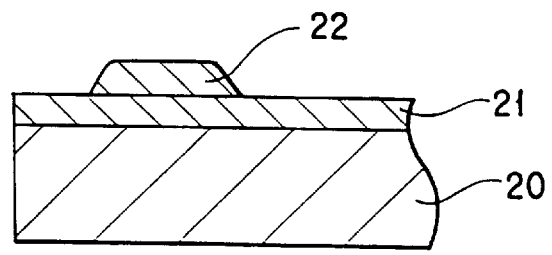
Figure 26C:
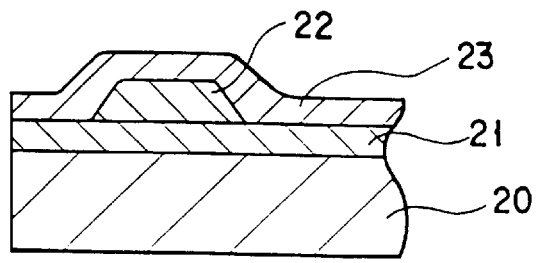

As shown in FIG. 26A, a lower magnetic film 21 consisting of, e.g., NiFe is formed to have a thickness of approximately 8 nm on a substrate 20, and a resist layer 26 is formed on the lower magnetic film 21 and patterned. Subsequently, as shown in FIG. 26B, a nonmagnetic film 22 consisting of, e.g., Cu is formed to have a thickness of approximately 3 nm by a lift-off process, and the resist layer 26 is removed. Thereafter, as shown in FIG. 26C, an upper magnetic film 23 composed of, e.g., NiFe and having a thickness of about 8 nm is formed. In this case, it is desirable to perform sputter etching for the purpose of cleaning the surface of the lower magnetic film 21.

Subsequently, as shown in FIG. 25, the upper and lower magnetic films 23 and 21 and the nonmagnetic film 22 are simultaneously patterned into a desired shape by using a conventional semiconductor process, and leads 25 are formed by the lift-off process. At this point, it is desirable that the leads 25 be formed inside the step portions of the upper magnetic film 23.

In this structure, in an initial state with no external magnetic field, magnetizations of the upper and lower magnetic films 23 and 21 are antiparallel to each other in the direction of the track width, in a portion where the upper and lower magnetic films 23 and 21 are separated by the nonmagnetic film 22, due to a sense current or the film shape, and are parallel to each other in a portion where the upper and lower magnetic films 23 and 21 are coupled. When a signal magnetic field is externally applied, the magnetizations in the portion where the upper and lower magnetic films 23 and 21 are separated by the nonmagnetic film 22, which are antiparallel to each other in the initial state, become parallel to each other, changing the resistance of that portion. Consequently, this structure serves as a magnetic head. In addition, this structure has no problem of corrosion since the nonmagnetic film 22 is not exposed to a surface opposing a medium.

FIG. 27A shows the spin valve unit according to the second invention of the present invention. Referring to FIG. 27A, the dimension in the direction of the track width of a lower magnetic film 21 or a soft magnetic film 35 coupled to the lower magnetic film 21 is larger in a portion away from the surface opposing a medium than in an exposed portion. This makes it possible to facilitate aiming the magnetization of the magnetic film in the track width direction. In this case, a single magnetic domain can be readily obtained by arranging hard magnetic films 36 adjacent to the both edges of the magnetic film, as shown in FIG. 27A, or by applying a bias by, e.g., stacking hard magnetic films or antiferromagnetic films on the both edges, as shown in FIG. 27B. In addition, as mentioned earlier, the soft magnetic film 35 is preferably an amorphous film for the reasons that a shunt current can be prevented and the influence of orientation on the hard magnetic film or the antiferromagnetic film can be suppressed. An example of the material of this amorphous film is CoZrNb. In this case, the corner of the wide portion is preferably a rounded corner rather than a right-angle corner in respect of realization of a single magnetic domain.

Especially when the hard magnetic films are to be stacked on both the edges of the soft magnetic film 35, it is desirable that these hard magnetic films be stacked only on the soft magnetic film 35 as shown in FIG. 28 in order to prevent a leakage magnetic field from the hard magnetic films. This magnetoresistance effect element shown in FIG. 28 is manufactured as illustrated in FIGS. 29A to 29D.

Figure 29A:
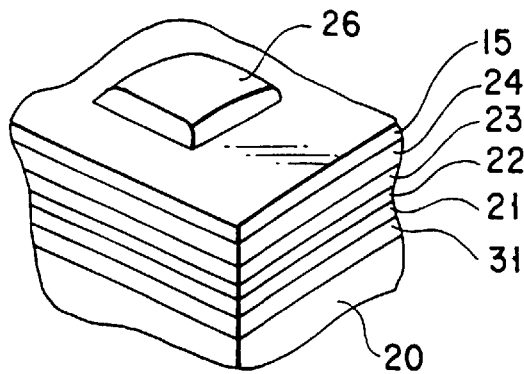
FIGS. 29A to 29C are perspective views showing steps of manufacturing a magnetoresistance effect element shown in FIG. 28.

As shown in FIG. 29A, an amorphous film 31 consisting of, e.g., CoZrNb and having a thickness of about 15 nm, a lower magnetic film 21 consisting of, e.g., CoFe or Co and having a thickness of about 4 nm, a nonmagnetic film 22 consisting of, e.g., Cu and having a thickness of about 3 nm, an upper magnetic film 23 consisting of, e.g., CoFe or Co and having a thickness of about 4 nm, and an antiferromagnetic film 24 consisting of, e.g., FeMn and having a thickness of about 14 nm are formed in this order on a substrate 20. In addition, a resist layer 26 is formed and patterned on the antiferromagnetic film 24 in a portion constituting a back spin valve layer. In this case, a protective film 15 approximately 10 nm in thickness is preferably formed between the antiferromagnetic film 24 and the resist layer 26. This protective film 15 is required to have a high resistance in order to prevent a shunt current and required to allow etching to be performed stably later. For this reason, a noble metal, such as Pd or Pt, which hardly forms an oxide layer is suitable as the protective film 15. The protective film particularly preferably has a multilayered structure formed by stacking a film composed of, e.g., Pd on a protective film composed of, e.g., Ti.

Figure 29B:
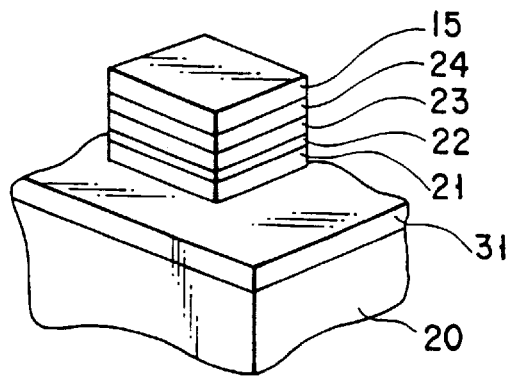
Figure 29C:
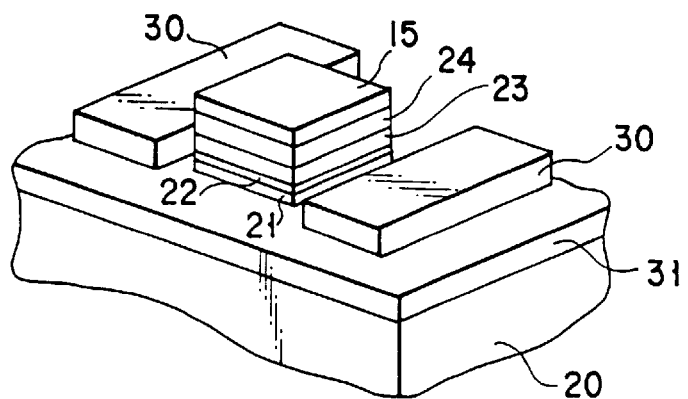
Figure 29D:
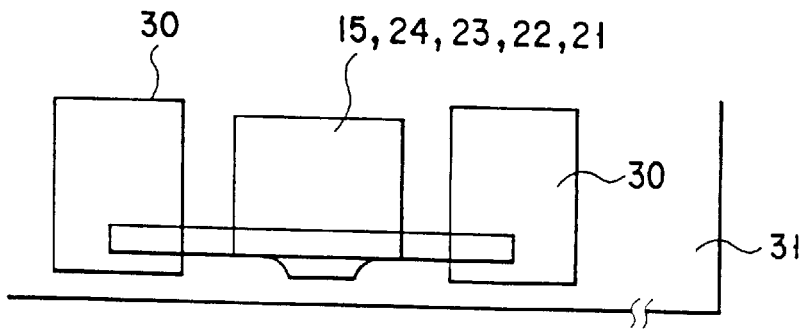
FIG. 29D is a plan view showing the manufacturing step of the magnetoresistance effect element shown in FIG. 28.

Subsequently, as shown in FIG. 29B, the films from the lower protective film 21 to the protective film 15 are etched by using ion beam etching or the like. Thereafter, as shown in FIG. 29C, hard magnetic films 30 are formed by a lift-off process. A resist layer 26 having a shape as shown in FIG. 29D is then formed on the amorphous film 31, the spin valve unit constituted by the films 15 and 21 to 24, and the hard magnetic films 30. Thereafter, the resultant structure is etched by, e.g., ion beam etching, and leads are formed by the lift-off process in the same fashion as described above, thereby completing the magnetoresistance effect element with the structure shown in FIG. 28.

Figure 30:
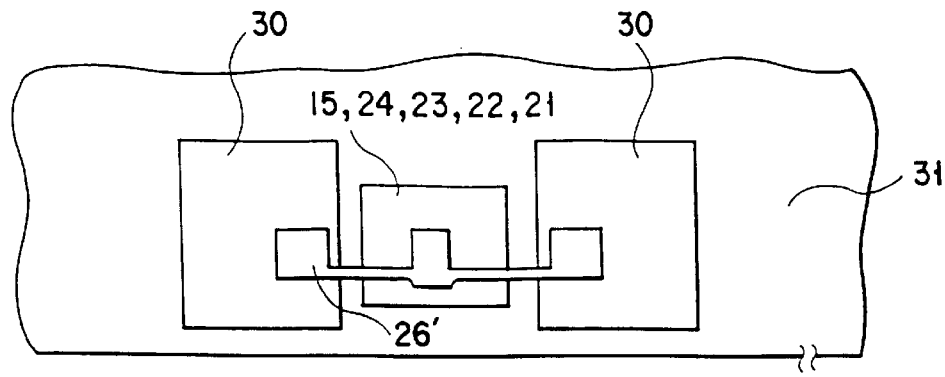
FIG. 30 is a plan view showing still another embodiment of the second invention of the present invention.
Figure 31A:
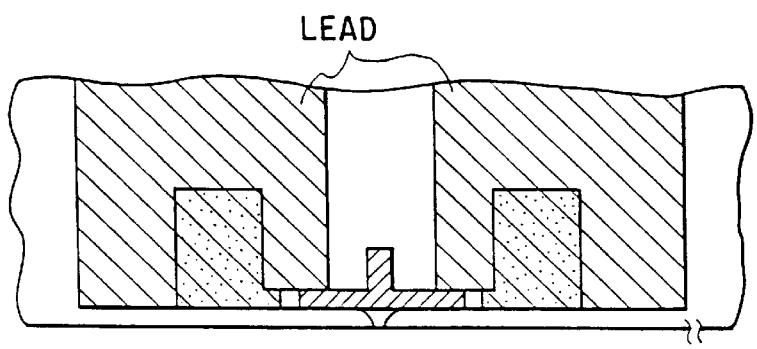
FIGS. 31A and 31B are plan views showing thin film heads using a magnetoresistance effect element shown in FIG. 30.
Figure 31B:
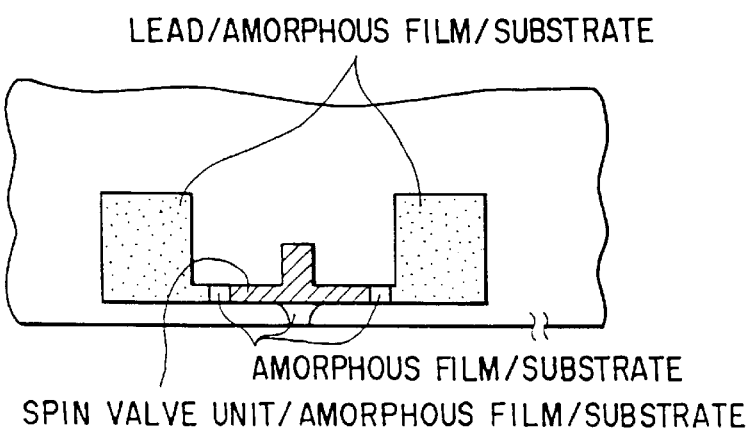

In the above structure, when the intake of a magnetic flux is taken into consideration, a magnetic head with a higher sensitivity can be obtained by forming a resist layer 26' having a pattern as shown in FIG. 30. That is, in FIG. 30, a spin valve stacked film/a yoke film extend to the side opposite to the surface opposing a medium, so generation of a domain wall in that portion is expected. Therefore, a high-coercive-force film is also extended to the side opposite to the surface opposing a medium. By etching the structure through ion beam etching or the like by using the resist layer 26' and forming leads by the lift-off process, magnetoresistance effect elements with structures as shown in FIGS. 31A and 31B can be obtained.

Figure 32:
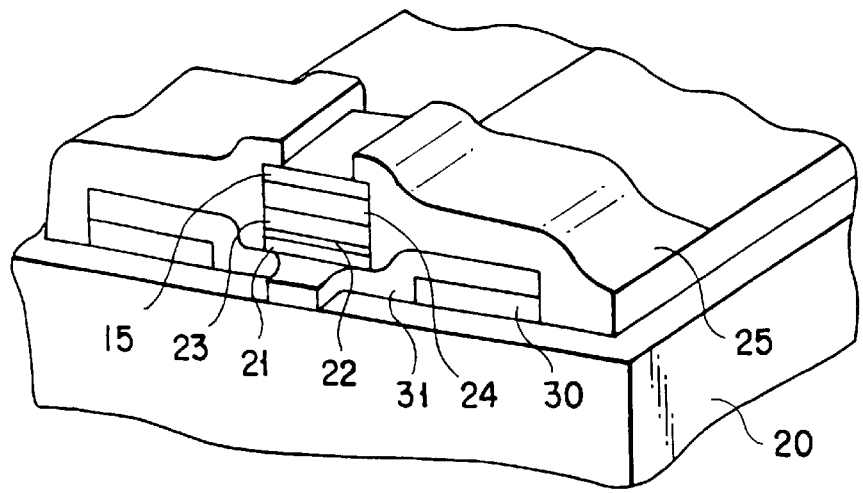
FIG. 32 is a perspective view showing still another embodiment of the second invention of the present invention.

As described above, the magnetoresistance effect elements shown in FIGS. 28 and 30 have the structure in which the hard magnetic films are stacked on top of the amorphous film. As shown in FIG. 32, however, the hard magnetic films can also be stacked below the amorphous film. With this structure, it is possible to use an undercoating film which controls the orientation of the hard magnetic films. When the hard magnetic films consist of CoNi or CoCr, use of Cr as the undercoating film is preferred.

Figure 33A:
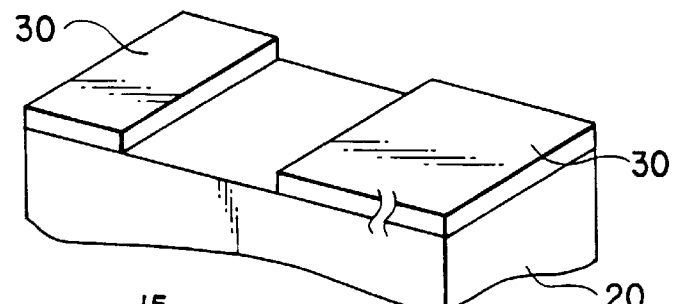
FIGS. 33A to 33C are perspective views showing steps of manufacturing a magnetoresistance effect element shown in FIG. 32.
Figure 33B:
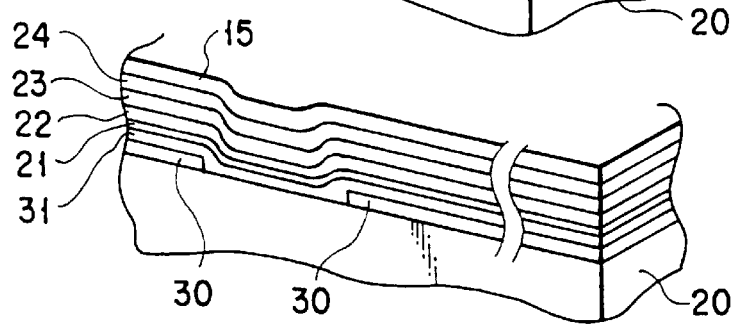
Figure 33C:
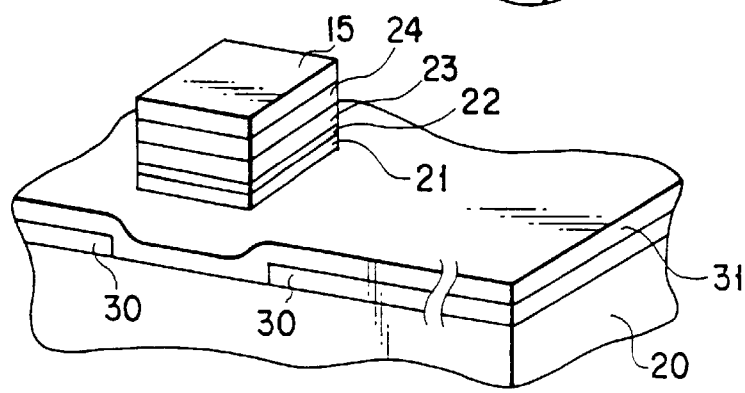

The magnetoresistance effect element shown in FIG. 32 is manufactured as illustrated in FIGS. 33A to 33C. First, as shown in FIG. 33A, hard magnetic films 30 are formed on a substrate 20 and patterned into a desired shape. Subsequently, as shown in FIG. 33B, an amorphous film 31, films 21 to 24 constituting a spin valve unit, and a protective film 15 are formed in sequence. The spin valve unit constituted by the films 21 to 24 and the protective film 15 are then patterned into a desired shape as shown in FIG. 33C. Thereafter, as shown in FIG. 29D or FIG. 30, the hard magnetic films 30, the amorphous film 31, the films 21 to 24 constituting the spin valve unit, and the protective film 15 are patterned simultaneously, completing the magnetoresistance effect element with the structure shown in FIG. 32.

Embodiment B15

Figure 34:
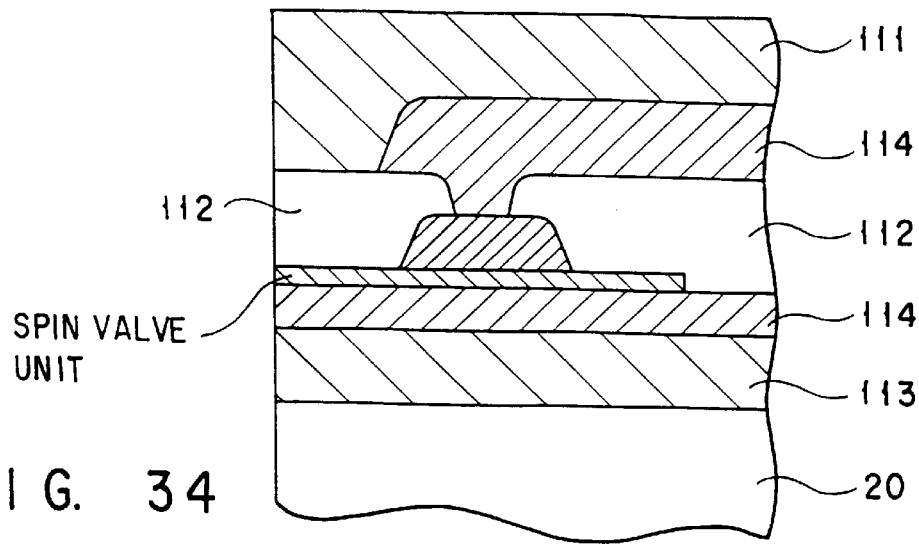
FIG. 34 is a sectional view showing still another embodiment of the second invention of the present invention.

FIG. 34 is a sectional view showing an embodiment in which shield layers are combined with the spin valve type magnetoresistance effect element of the present invention. A spin valve type magnetoresistance effect element with a structure, such as shown in FIG. 17, in which power was supplied in the direction of depth was manufactured, and shield layers were formed in this structure as shown in FIG. 34. In this structure, an upper shield layer 111 and a lead 112 on the side of a surface opposing a medium are brought into contact with each other, and the potential in that portion was used as the ground, while the other lead was set at a high potential. With this structure, it is possible to obtain a highly reliable thin film head in which the potential is not disturbed even when the head is brought into slidable contact with a medium. This thin film head is manufactured by forming an insulating layer 114 composed of, e.g., $SiO_2$ on a lower shield layer 113, forming a spin valve unit in the same manner as in FIG. 17, forming and pattering another insulating layer 114, and then forming the upper shield layer 111.

Embodiment B16

Figure 35A:
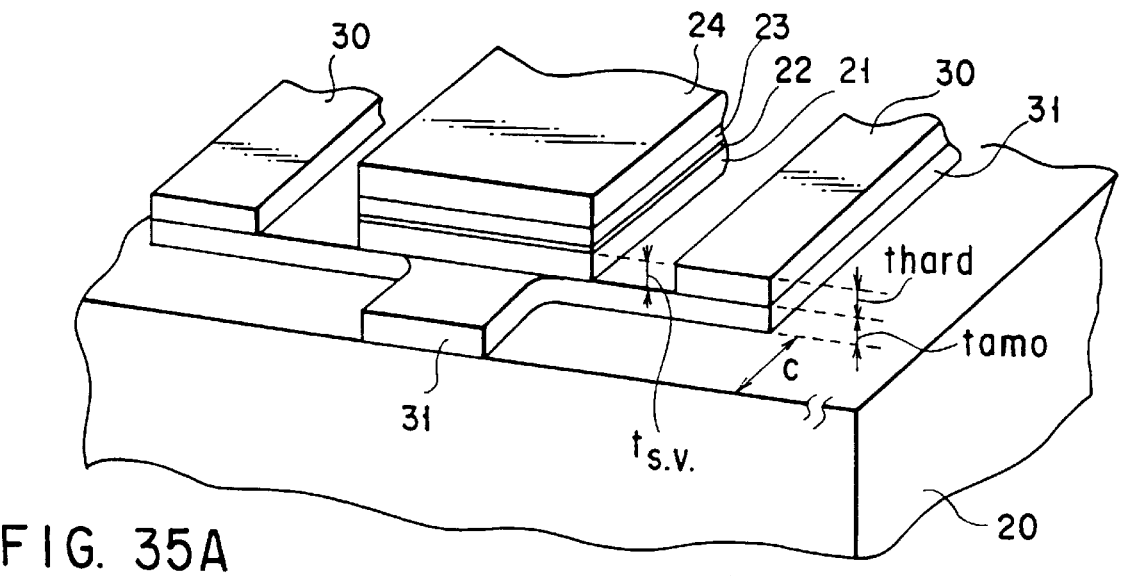
FIGS. 35A and 35B are views for explaining the dimensions of an element in the second invention of the present invention.
Figure 35B:
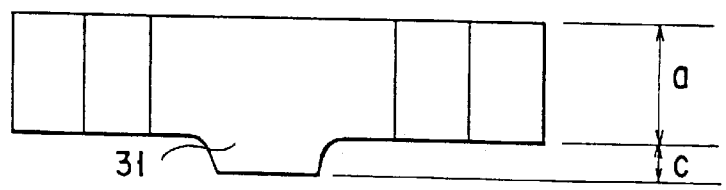

The dimensions of the structure of the spin valve type magnetoresistance effect element according to the present invention will be described below with reference to FIGS. 35A and 35B.

In this structure, magnetization of an amorphous film must be locked by a hard magnetic film. Therefore, assuming the film thickness and the magnetic charge of the hard magnetic film are $t_{hard}$ and $Ms_{hard}$, respectively, and the film thickness and the magnetic charge of the amorphous film are $t_{amo}$ and $Ms_{amo}$, respectively, it is preferable to properly select the materials and the thicknesses of the films so that $t_{hard} \times Ms_{hard}$ is equal to or larger than $t_{amo} \times Ms_{amo}$.

When the magnetoresistance effect element of the present invention is to be used as a magnetoresistance effect head, the amorphous film is preferably thick so that the tip of the head is not saturated by a signal magnetic field from a medium. In addition, the magnetization response of the amorphous film must be transmitted to a signal magnetic field response layer (a film whose magnetization is not locked) of a spin valve unit. Consequently, supposing that the film thickness and the magnetic charge of the signal magnetic field response layer of the spin valve unit are $t_{s.v.}$ and $Ms_{s.v.}$, respectively, it is preferable to appropriately choose the materials and the thicknesses of the films so that $t_{amo} \times Ms_{amo}$ is equal to or larger than $t_{s.v.} \times Ms_{s.v.}$.

A recess distance c will be described below. It is conventionally considered that, when an NiFe single-layered film is used as a magnetoresistance effect portion, the depth is preferably equivalent to the characteristic length. In the magnetoresistance effect head of the present invention, however, the recess distance c may be several times as large as the characteristic length, since a film having a very large magnetoresistance effect, such as a spin valve film, can be used, and this increases the resistance change rate.

When, on the other hand, discouragement of occurrence of a domain wall in a projecting portion is taken into account, the projecting portion is preferably small; that is, a smaller recess distance c is better. Therefore, the dimensions are preferably, properly set such that the distance c is equal to or smaller than a distance a in FIG. 35B. If, however, the film thickness of the amorphous film is decreased, a domain wall of the amorphous film readily changes to a Néel wall. In this case, the recess distance c can be increased because the Néel wall has a large wall width.

Embodiment B17

Figure 63A:
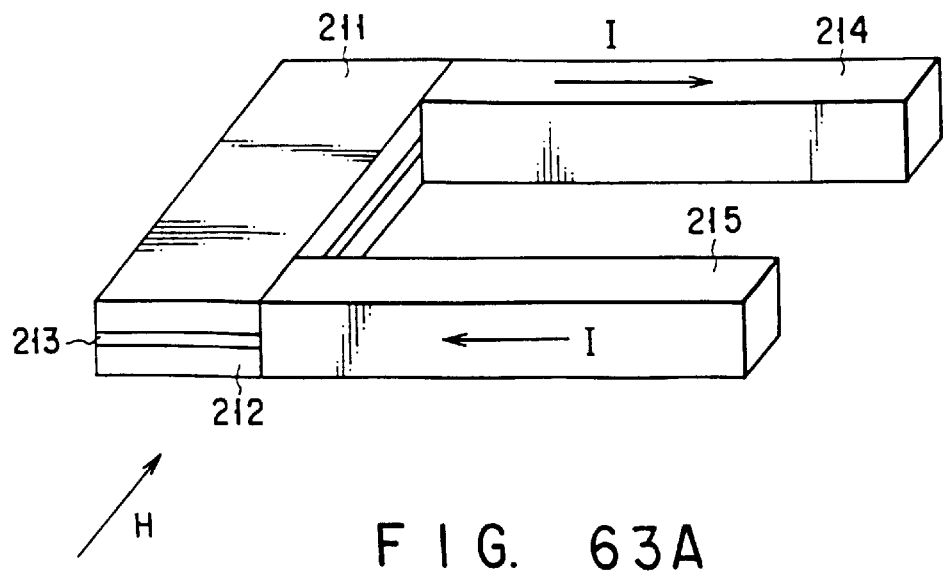
FIG. 63A is a perspective view showing an embodiment of a thin film head according to the second invention of the present invention.

FIG. 63A is a perspective view showing an embodiment of a thin film head according to the second invention of the present invention, in which the axis of easy magnetization is parallel to the surface of a medium, i.e., perpendicular to the direction of a sense current. Referring to FIG. 63A, reference numerals 211 and 212 denote 5 nm thick magnetic films consisting of CoFe. A conductive film 213 consisting of copper and having a thickness of a few nm is sandwiched between the magnetic films 211 and 212, constituting a magnetoresistance effect element. Leads 214 and 215 are connected to one side surface of this stacked film to make it possible to flow a DC current.

In such an arrangement, magnetization of neither of the magnetic film 211 nor 212 is locked by exchange coupling. In addition, magnetic anisotropy is imparted to the two magnetic films 211 and 212 so that their axes of easy magnetization are parallel to each other and perpendicular to the direction of a current.

Figure 63B:
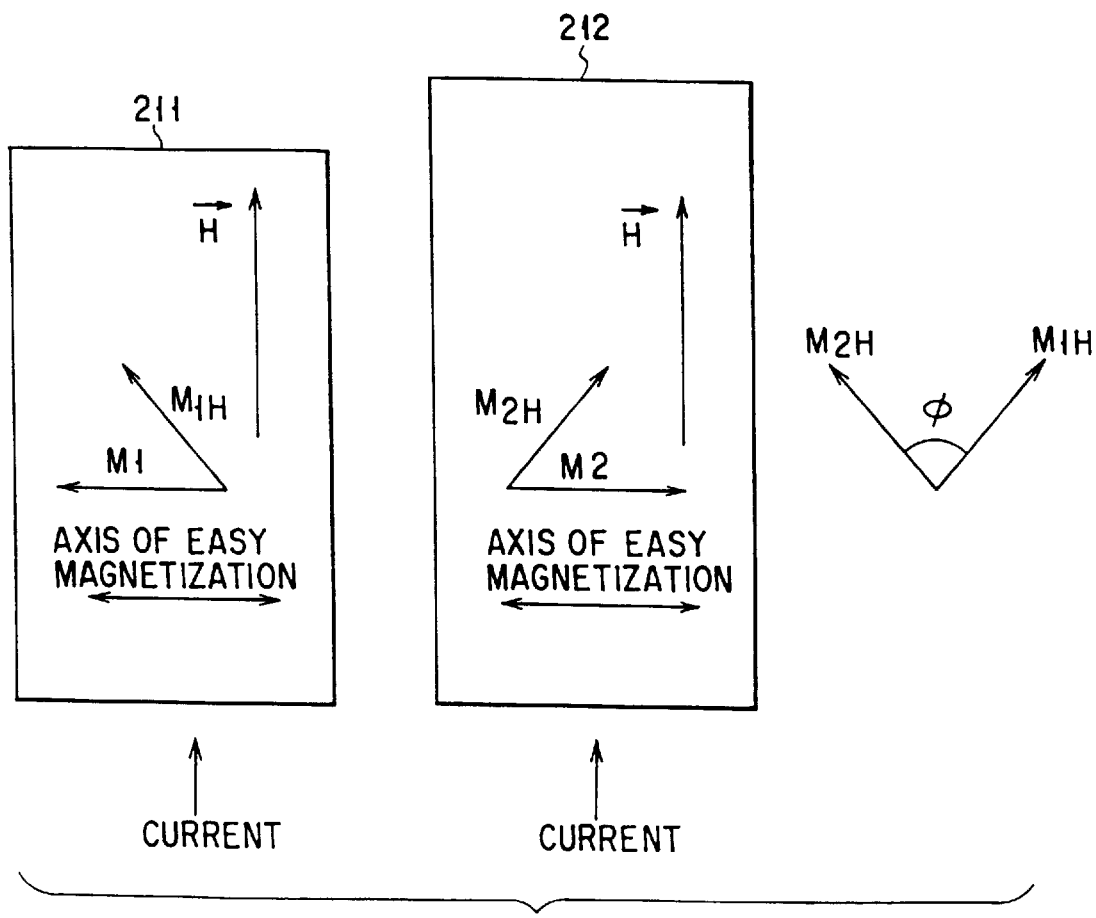
FIG. 63B is a view for explaining movement of magnetization in the thin film head shown in FIG. 63A.

When no magnetic field H of a medium is applied, magnetizations $M_1$ and $M_2$ Of the two magnetic films point in opposite directions parallel to the axis of easy magnetization as indicated by $M_1$ and $M_2$ in FIG. 1B due to a magnetic field formed by a sense current I. The electric resistance at this point is a maximum. When the magnetic field H from a medium acts in a direction indicated by an arrow in FIG. 63A, $M_1$ and $M_2$ rotate in opposite directions as indicated by $M_{1H}$ and $M_{2H}$ in FIG. 63B. That is, the angle defined between $M_1$ and $M_2$ changes from 180 degrees to φ degrees shown in FIG. 1B. If the magnetic field is strong, this angle φ approaches 0 degree, and the electrical resistance decreases to a minimum at 0 degree.

$M_1$ and $M_2$, therefore, can be changed from an antiparallel state to a parallel state by using an external magnetic field, and so all electrical resistance changes of 10% or more which are possible by spin-dependent scattering can be used. In addition, since the electrical resistance change caused by an anisotropic magnetoresistance effect of a CoFe-based film is 2% or less, this magnetic head can extract a large electrical resistance change with respect to the magnetic field of a medium.

Note that in order to stabilize the magnetizations of the two magnetic films, the quantities of magnetizations appearing at the edges of the magnetic films are desirably equal to each other. For this purpose, it is desirable that the product of a saturation flux density Ms and a film thickness t of one magnetic film be substantially equal to that of the other ($Ms_1 \cdot t_1 = Ms_2 \cdot t_2$). It is therefore preferable to determine the material and dimensions of the magnetic films to meet $Ms_1 \cdot t_1 = Ms_2 \cdot t_2$.

FIG. 64A is a perspective view showing another embodiment of the thin film head according to the first invention of the present invention, in which the axis of easy magnetization is parallel to the surface of a medium, i.e., perpendicular to the direction of a sense current. This thin film head is identical with that shown in FIG. 63A except that a flux guide 216 consisting of a magnetic film is attached to one end face of a magnetoresistance effect element. In this arrangement, a magnetic field from a medium is guided to the magnetoresistance effect element through the flux guide 216. Any material can be used as the flux guide 216 as long as the material has soft magnetic characteristics, and the structure may be either a single-layered structure or a multilayered structure. Referring to FIGS. 64A and 64B, the flux guide 216 and the magnetoresistance effect element are juxtaposed with each other across the same width. However, the widths of the two members can be different, and portions of the two members may overlap each other. Also, the flux guide 216 may be arranged on the other end face of the magnetoresistance effect element away from a medium or may be arranged on both the end faces on the side of and away from a medium. In FIGS. 63A and 64A, the leads 214 and 215 are juxtaposed with the magnetoresistance effect element across the same thickness. Like in the case of the flux guide 216, however, the thicknesses of the two members may be different, and portions of the two members may overlap each other.

FIG. 65 also shows still another embodiment of the thin film head according to the second invention of the present invention. This thin film head is the same as that shown in FIG. 63A except that a magnetoresistance effect element is formed on a nonmagnetic conductive film 217. This nonmagnetic conductive film 217 is formed for the reason explained below.

In a device consisting of thin magnetic films such as in the present invention, the structure of the magnetic films is sensitive to the type or crystal structure of an undercoating film. For example, it is known that although the crystallinity of an NiFe film formed on an alumina-sputter film is poor, the crystallinity tends to be oriented in the fcc direction easily if a thin undercoating film consisting of Cu, Ta, or Ti is formed. A magnetic film with a poor crystallinity has a high inherent electrical resistance resulting from the irregularity of the lattice. In such a magnetic film, the proportion of an electrical resistance caused by spin-dependent scattering with respect to a total electrical resistance is small, and as result the rate of electrical resistance change in parallel and antiparallel states of spin decreases.

If the electrical resistance of this nonmagnetic conductive film 217 is low, a sense current may be shunted to lead to a decrease in an output. However, since a current in a direction perpendicular to a film surface also takes part in spin-dependent scattering, a large electrical resistance change may sometimes be obtained as a whole even if the electrical resistance of the nonmagnetic conductive film is low. A magnetic field generated by the shunt current serves to magnetize the two magnetic films to be parallel to each other rather than to be antiparallel to each other. Therefore, the two magnetic films become difficult to magnetize to be antiparallel to each other upon application of only the magnetic field generated by the sense current. If, however, the magnetizations of the two magnetic films are set to be antiparallel to each other upon application of a demagnetizing field or the like, the electrical resistance change with respect to the external magnetic field can be increased.

FIG. 66A is a perspective view showing still another embodiment of the magnetoresistance effect element according to the first invention of the present invention, in which the axis of easy magnetization is parallel to the direction of a sense current. The arrangement of a magnetoresistance effect element and leads are identical with that shown in FIG. 63A.

Figure 66B:
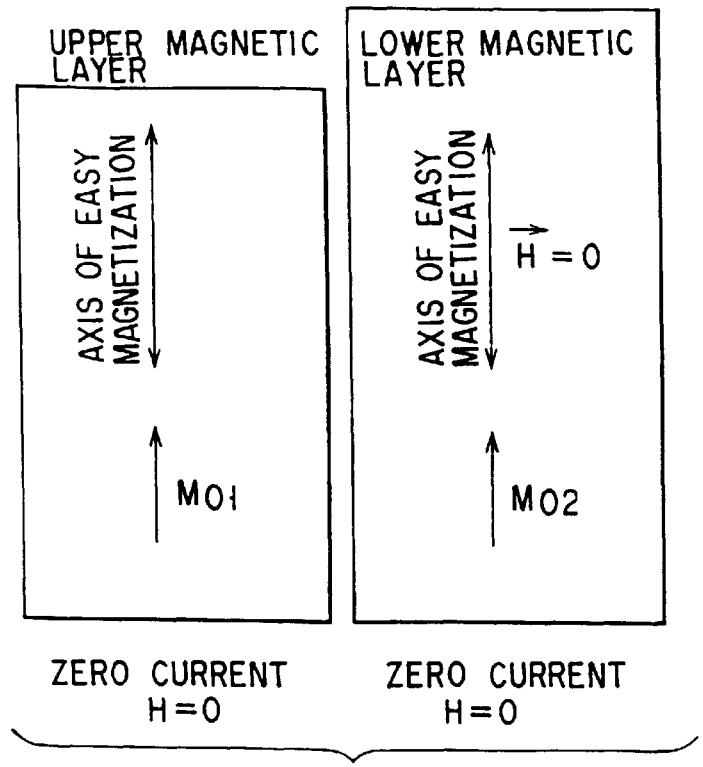
FIGS. 66B and 66C are views for explaining movement of magnetization in the thin film head shown in FIG. 66A.
Figure 66C:
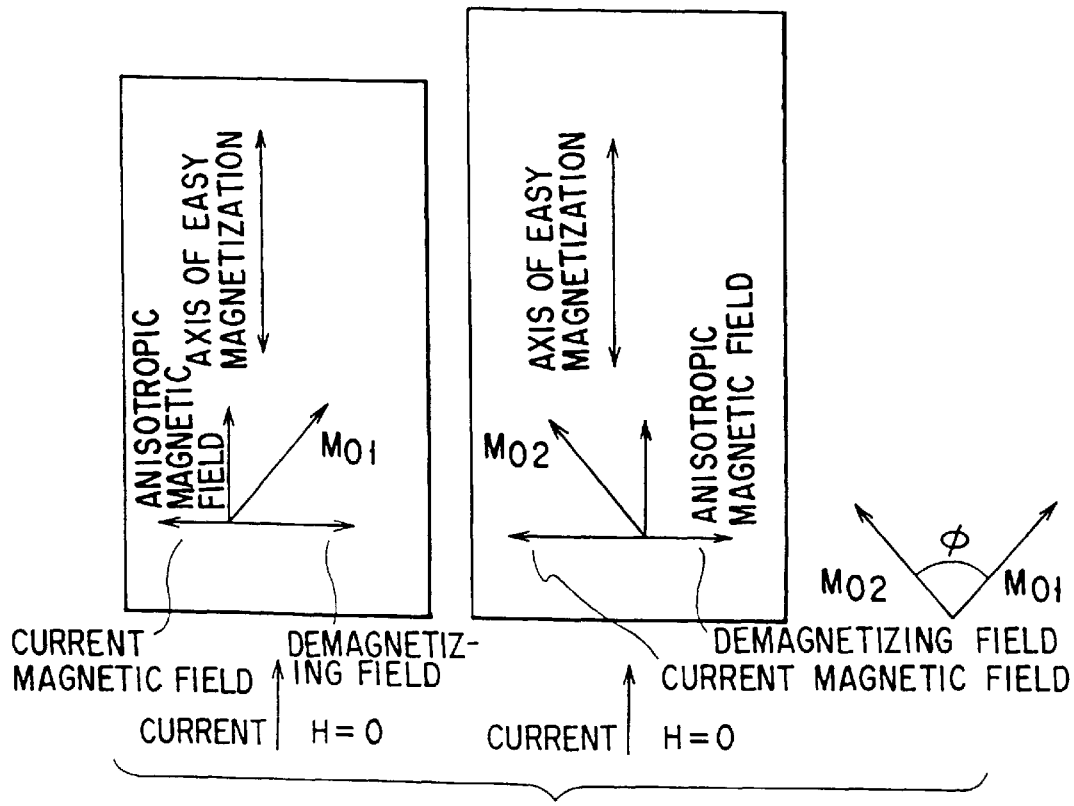

When neither a magnetic field from a medium nor a sense current exists, as shown in FIG. 66B, magnetizations of two magnetic films 211 and 212 are parallel to each other and point in the direction of the axis of easy magnetization due to exchange coupling between the two magnetic films via a conductive film 213. When a sense current is flowed, as shown in FIG. 66C, magnetization which rotates the magnetizations of the two magnetic films in opposite directions takes place, and the magnetizations are stabilized when the angle defined between them becomes a certain angle ψ due to a balance between, e.g., an anisotropic magnetic field of the magnetic films and a demagnetizing field. Assuming that ψ is around 90°, the electrical resistance change is linear with respect to a weak external magnetic field, and this decreases a wave distortion to facilitate signal processing.

FIGS. 67 to 70 are views for explaining a method of applying a bias magnetic field for changing the operating point of a magnetoresistance effect element in the thin film head according to the first invention of the present invention, in which the axis of easy magnetization is parallel to the surface of a medium, i.e., perpendicular to the direction of a sense current.

Referring to FIG. 67, a magnetoresistance effect element consisting of two magnetic films 211 and 212 and a conductive film 213 is identical with that shown in FIG. 63A, but leads for flowing a sense current are formed to cross the magnetoresistance effect element. These magnetoresistance effect element and leads are sandwiched between insulating films 218. In this arrangement, a sense current is supplied from a terminal 219 into the magnetoresistance effect element and extracted from a terminal 220 across the magnetoresistance effect element, thereby generating a bias magnetic field. In this case, the magnetic field formed by the current acts in the direction of the axis of hard magnetization of the magnetoresistance effect element in a portion 221 at which the magnetoresistance effect element and the lead cross each other. Therefore, magnetizations of the two magnetic films 211 and 212 are not antiparallel but rotated slightly in the direction of this bias magnetic field.

Figure 68:
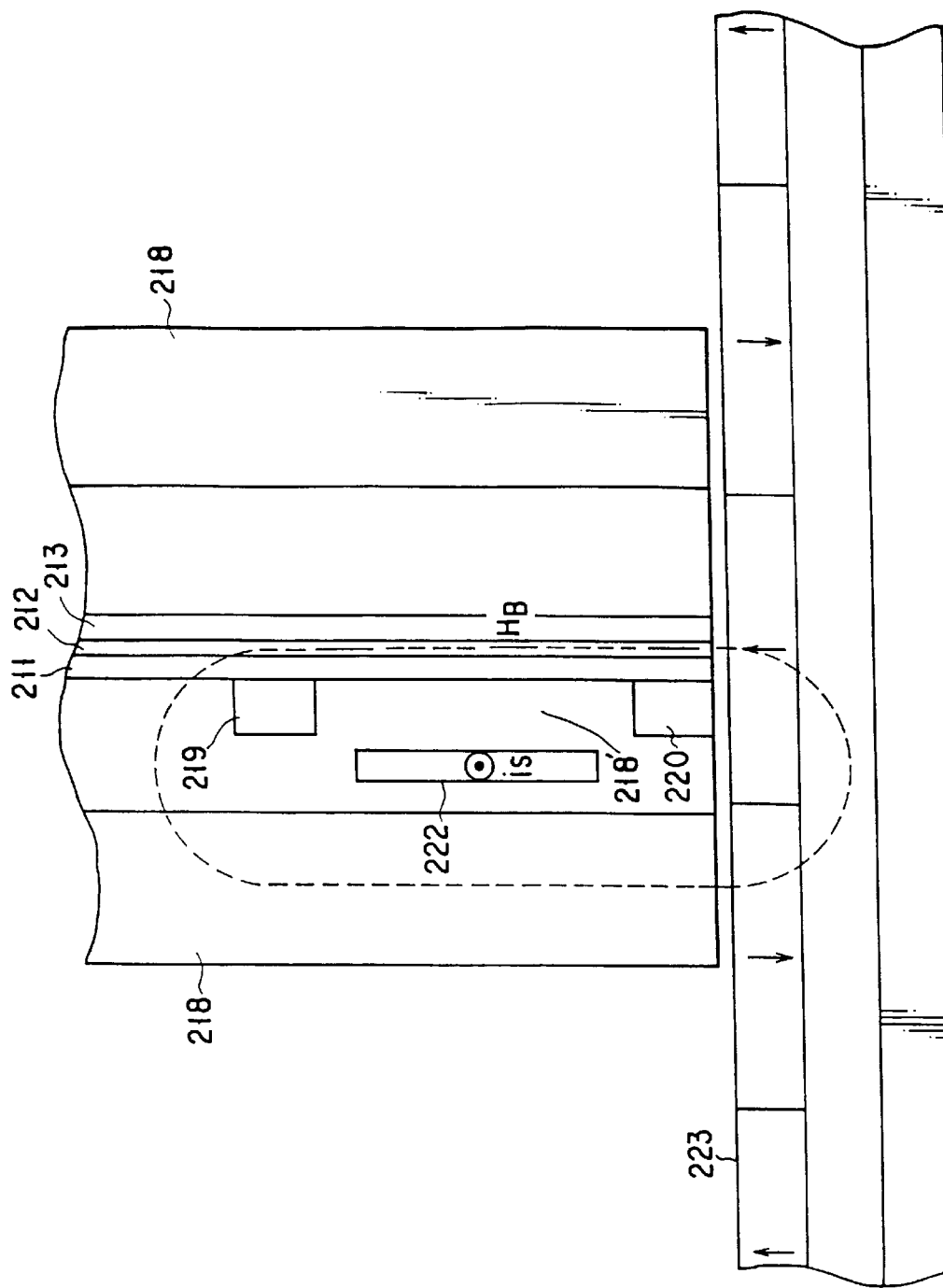
FIG. 68 is a view for explaining the principle of generation of a bias magnetic field in the thin film head shown in FIG. 67.

FIG. 68 is a sectional view for explaining the principle of generation of this bias magnetic field. Referring to FIG. 68, the width of the terminals 219 and 220 is smaller than the length in the longitudinal direction (current direction) of the magnetoresistance effect element, and the shield layers 218, the magnetic films 211 and 212, and a lead 222 constitute a closed magnetic circuit. This improves the efficiency of magnetic field generation. Note that reference numeral 223 in FIG. 68 denotes a medium.

A sense current that can be flowed through the magnetoresistance effect element can be increased by changing the material of a magnetic gap layer 218', which is sandwiched between the shield layers 218 and in which the magnetoresistance effect element is buried, from a normal material, such as $Al_2O_3$ or $SiO_2$, to a material having a high thermal conductivity and suitable for a thin film formation process, such as SiC, $Si_3N_4$, or diamond. This increases the reproduction output and also improves the reliability of the thin film head and the yield in manufacture.

As is apparent from Table 1 below, SiC and diamond (or diamond-like carbon) are materials having thermal conductivities by far higher than those of $Al_2O_3$ and $SiO_2$. That is, a temperature rise in the magnetoresistance effect element caused when the sense current is flowed through the magnetoresistance effect element can be suppressed. This means that it is possible to increase a maximum sense current which can be flowed through the magnetoresistance effect element. This consequently improves the reproduction output that is proportional to the magnitude of the sense current and the reproduction S/N ratio.

In addition, since SiC or $Si_3N_4$ can form a film denser than that formed by $Al_2O_3$ or $SiO_2$, a film which is excellent in insulating properties and flatness can be obtained easily. Furthermore, SiC, $Si_3N_4$, and diamond make a high-precision thin film process possible since they can be etched more easily than $Al_2O_3$ and $SiO_2$. This consequently improves the reliability of the thin film head and the yield in manufacture.

TABLE 1

| Material | Thermal conductivity (W/m · deg) at room temperature |
| --- | --- |
| $SiO_2$ | 1.4 |
| $Al_2O_3$ | 21 to 26 |
| SiC | 58.6 to 117 |
| Diamond | 660 |

Embodiment C1

In Embodiments C1 to C6 described below, a demagnetizing field in the widthwise direction of a magnetic film having a larger width than those of the other magnetic films is small, and a bias magnetic field is applied in the widthwise direction by a hard magnetic film or the like. Therefore, magnetization of this magnetic film can be aimed in the widthwise direction.

In addition, a leakage magnetic field can be generated from a portion at which the thickness of this magnetic film varies, and this magnetic field is applied to the edges of the other magnetic films. This makes it possible to remove edge curling walls from the other magnetic films.

Consequently, even if the track width decreases to decrease the width of the element, edge curling walls can be eliminated to prevent a decrease in a reproduction output.

FIG. 36 is a perspective view showing a magnetoresistance effect element according to a third invention of the present invention. In FIG. 36, reference numeral 40 denotes a substrate, and an undercoating film 41 made from, e.g., CoZrNb is formed on the substrate 40. On top of the undercoating film 41, a lower magnetic film 42 consisting of, e.g., NiFe, a nonmagnetic film 43 consisting of, e.g., Cu or $Al_2O_3$, and an upper magnetic film 44 consisting of, e.g., NiFe are formed in this order. The lower magnetic film 42, the nonmagnetic film 43, and the upper magnetic film 44 are so patterned by etching as to have a width smaller than that of the undercoating film 41.

Leads 45a and 45b composed of Cu/Cr or the like are also formed on the upper magnetic film 44. In addition, hard magnetic films 46 consisting of, e.g., CoPt are formed on both sides of the undercoating film 41 on top of the substrate 40.

In the magnetoresistance effect element with the above arrangement, a sense current enters from the lead 45b and flows out from the lead 45a. A current magnetic field in an x direction is applied to the undercoating film 41 and the lower magnetic film 42, and a current magnetic field in a −x direction is applied to the upper magnetic film 44. The hard magnetic films 46 are magnetized in the x direction, and the axes of easy magnetization of the undercoating film 41, the lower magnetic film 42, and the upper magnetic film 44 are set in a direction parallel to the x axis.

Figure 39:
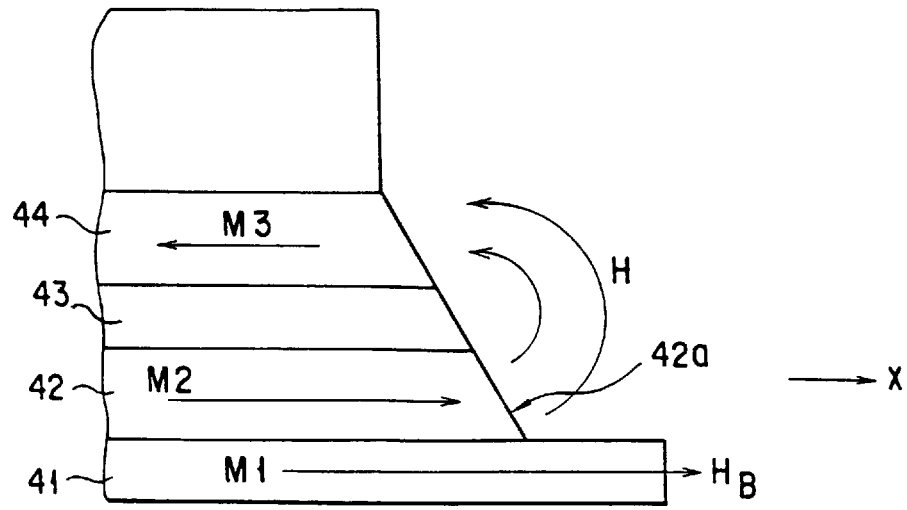
FIG. 39 is a view for explaining the function of the third invention of the present invention.

In this magnetoresistance effect element, as shown in FIG. 39, a strong bias magnetic field $H_B$ in the x direction is applied to the undercoating film 41, so its magnetization $M_1$ points in the x direction. The magnetization $M_2$ of the lower magnetic film 42 is not only applied with the magnetic field from the sense current but exchange-coupled to the magnetization $M_1$ of the undercoating film 41 and therefore similarly points in the x direction. As a result, a leakage magnetic field H is generated in an edge 42a of the lower magnetic film 42 and applied to the upper magnetic film 44. The magnitude of this magnetic field is nearly the same as that of a demagnetizing field of the lower magnetic film 42 at the center in the widthwise direction of the upper magnetic film 44, and is given by $H_d$ to $4\pi M_s {}^* t/w$ where $M_s$ is the saturation magnetization of the lower magnetic film, t is the thickness of that film, and w is the width in a direction parallel to the x axis. For example, when $4\pi M_s=10,000$ gauss, t=100 Å, and w=1 $\mu$m, a magnitude of $H_d$ to 100 Oe results. The magnetic field is of course larger at the edge of the upper magnetic film 44. Therefore, the magnetization $M_3$ of the upper magnetic film 44 points in the -x direction due to the current magnetic field and the magnetic field H from the lower magnetic film 42. Consequently, an edge curling wall is decreased, and the magnetization in the central portion becomes parallel to the x axis.

Note that the undercoating film 41 and the lower magnetic film 42 may be made from the same material as shown in FIG. 37, and the hard magnetic films 46 may be formed directly on the undercoating film 41 as shown in FIG. 38.

Embodiment C2

In Embodiments C2 to C6 described below, the shapes of first and second magnetic films sandwiching a nonmagnetic film are different. The directions of the minimum demagnetizing fields of the first and second layers are set to be perpendicular to each other. For this reason, even if no bias magnetic field is applied to one or both of the magnetic films by, e.g., an antiferromagnetic film or a high-coercive-force film, magnetizations of these films stably point in directions perpendicular to each other. Therefore, even if heat is generated by a sense current or friction with a recording medium, this relationship of perpendicular directions is not disturbed because the magnetizations point in the respective stable directions.

In addition, a resistance change caused by spin-dependent scattering occurs only in a region in which these magnetic films are stacked. Therefore, by selecting a material with a small anisotropic magnetoresistance effect like in the case of a Co or $Co_{90}Fe_{10}$ film, a track width can be defined by the width of the stacked film regardless of the arrangement of leads.

As shown in FIG. 51, an 8-nm thick first magnetic film 71 consisting of $Co_{90}Fe_{10}$ is formed on a substrate 70 and patterned into a rectangular shape with dimensions of 2 $\mu$m×20 $\mu$m. A groove with a width of 2 $\mu$m is formed on the first magnetic film 71. An 8-nm thick $Co_{90}Fe_{10}$ third magnetic film 76 is formed on the substrate 70 and on a central portion of the first magnetic film 71. A 3-nm thick Cu nonmagnetic film 72 is then formed on the third magnetic film 76. Subsequently, an 8-nm thick $Co_{90}Fe_{10}$ second magnetic film 73 is formed. The nonmagnetic film 72, the second magnetic film 73 and the third magnetic film 76 are patterned into a rectangular shape with dimensions of 2 $\mu$m×20 $\mu$m such that the longitudinal direction of this rectangular shape is perpendicular to the longitudinal direction of the first magnetic film. Subsequently, a 200-nm thick Cu film is formed on the first magnetic film and patterned to form leads 74, thereby manufacturing a magnetoresistance effect element. In this structure, the directions of the axes of easy magnetization of the first and second magnetic films 71 and 73 are perpendicular to each other as indicated by arrows in FIG. 51.

FIG. 52 shows the external magnetic field dependency of the resistance change rate of this magnetoresistance effect element. The resistance change rate was calculated by Equation (3) below. In addition, the external magnetic field was applied in a direction perpendicular to the flowing direction of a sense current, i.e., in a direction perpendicular to the longitudinal direction of the first magnetic film 71.

resistance change rate=(maximum resistance−saturation resistance)/saturation resistance (3)

As can be seen from FIG. 52, an operating point bias is applied well when the external magnetic field is 0. As for the behavior of the resistance change rate, the resistance change rate decreases as the external magnetic field increases when the direction of the external magnetic field coincides with the direction of magnetization of the second magnetic film 73. When the magnetization direction of the second magnetic film 73 is reversed, on the other hand, the resistance change rate increases as the external magnetic field increases. As an example, when the external magnetic field is approximately 6 kA/m, reversal of the magnetization of the second magnetic film 73 takes place, and the resistance change rate decreases to almost 0. The magnetoresistance effect element shown in FIG. 51 has a T-shaped structure in which one end face of the second magnetic film 73 is in the same plane as the side surface of the first magnetic film 71. However, the same effect can be achieved in a cross-shaped structure in which the first and second magnetic films 71 and 73 cross each other perpendicularly.

Embodiment C3

As shown in FIG. 53, an 8-nm thick first magnetic film 71 composed of $Co_{90}Fe_{10}$ was formed on a substrate 70 and patterned into a rectangular shape with dimensions of 2 $\mu$m×20 $\mu$m. A groove with a width of 2 $\mu$m is formed on the first magnetic film 71. An 8-nm thick $Co_{90}Fe_{10}$ third magnetic film 76 is formed on the first magnetic film 71. Subsequently, a static magnetic field of 4 kA/m was generated by a Helmholtz coil installed in a film formation apparatus in the same direction as the direction of the short sides of the first magnetic film 71 patterned. A 3-nm thick Cu nonmagnetic film 72 was then formed on the first magnetic film 71 and on a portion of the substrate 70 on which the first magnetic film 71 was not formed. Subsequently, an 8-nm thick $Co_{90}Fe_{10}$ second magnetic film 73 and a 15-nm thick antiferromagnetic film 75 consisting of FeMn were formed in this order. The nonmagnetic film 72, the second magnetic film 73, the third magnetic film 76, and the antiferromagnetic film 75 were patterned into a rectangular shape with dimensions of 2 $\mu$m×20 $\mu$m such that the longitudinal direction of this rectangular shape was perpendicular to the longitudinal direction of the first magnetic film. Subsequently, a 200-nm thick Cu film was formed on the first magnetic film and patterned to form leads 74, thereby manufacturing a magnetoresistance effect element. In this structure, the directions of the axes of easy magnetization of the first and second magnetic films 71 and 73 are perpendicular to each other as indicated by arrows in FIG. 53.

Figure 54:
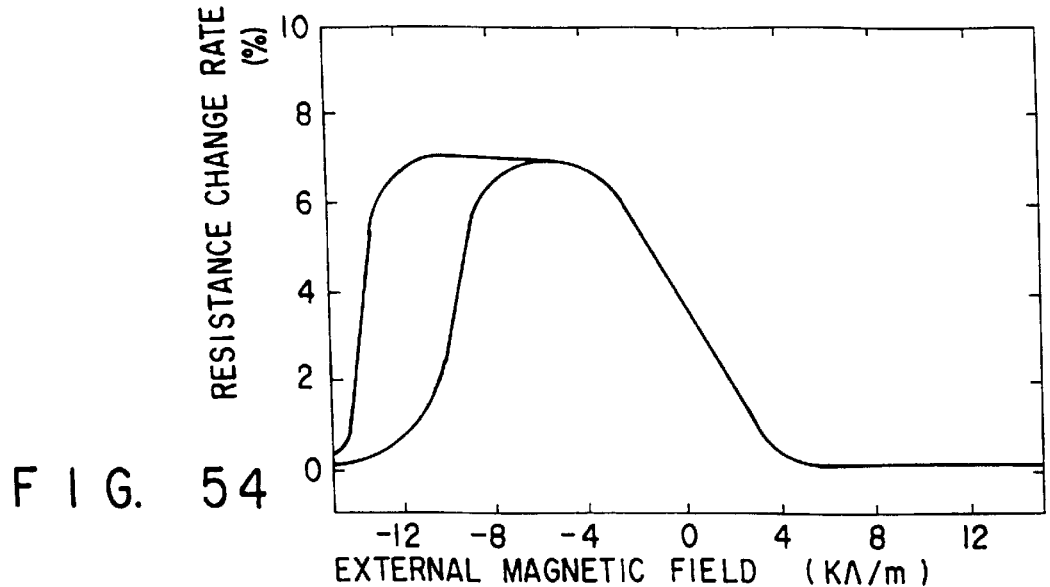
FIG. 54 is a graph showing the external magnetic field dependency of the resistance change rate of a magnetoresistance effect element shown in FIG. 53.

FIG. 54 illustrates the external magnetic field dependency of the resistance change rate of this magnetoresistance effect element. As shown in FIG. 54, when the external magnetic field is 0, an operating point bias in which magnetizations of the magnetic films are perpendicular to each other is applied. When the external magnetic field is increased in the negative direction, the antiferromagnetic film 75 applies an exchange bias to the second magnetic film 73 to prevent reversal of magnetization up to approximately 12 kA/m, so the first and second magnetic films 71 and 73 hold the antiparallel state. When the external magnetic field is increased in the positive direction, on the other hand, the resistance change rate decreases because the magnetizations of the magnetic films become parallel to each other.

Note that when a high-coercive-force film made from CoPt or the like is to be used in place of the antiferromagnetic film 75, an identical effect can be obtained by magnetizing this high-coercive-force film along the longitudinal direction of the second magnetic film 73.

Embodiment C4

Figure 55:
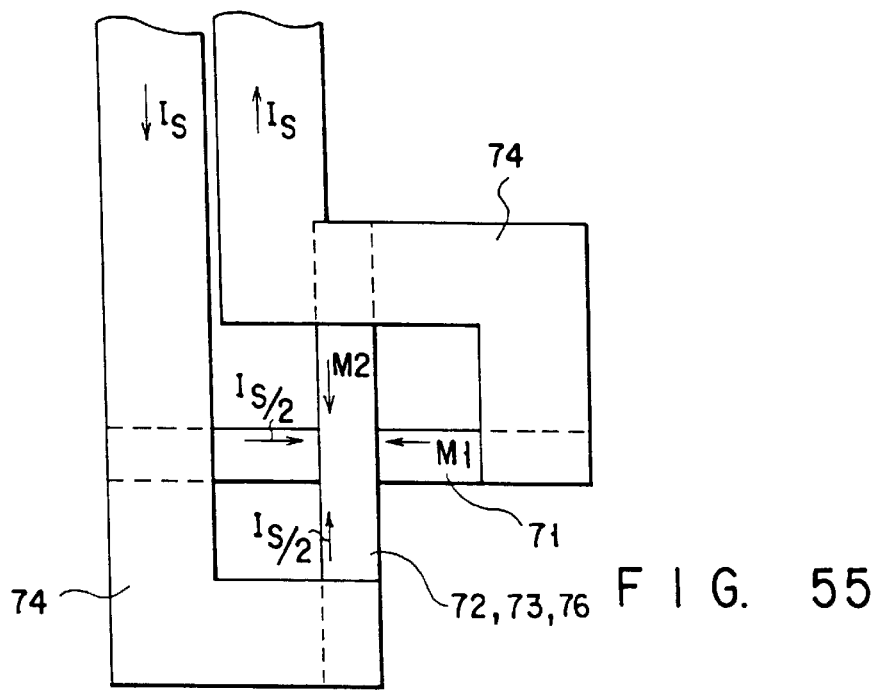
FIG. 55 is a plan view showing still another modification of the third invention of the present invention.

In Embodiment C3 described above, an antiferromagnetic film or a high-coercive-force film is used to lock magnetization. It is, however, also possible to make use of a current magnetic field generated by a lead arrangement as shown in FIG. 55. That is, a first magnetic film 71 and a stacked film of a second magnetic film 73, a nonmagnetic film 72, and a third magnetic film 76 are stacked in such a manner that the first and second magnetic films 71 and 73 sandwich the nonmagnetic film 72 and the third magnetic film 76 between them and are perpendicular to each other. Subsequently, leads 74 are formed on both the end portions of the first and second magnetic films 71 and 73 as shown in FIG. 55, so that half portions ($I_S/2$) of a sense current $I_S$ flow through the first and second magnetic films 71 and 73.

In a magnetoresistance effect element having this arrangement, the second magnetic film 73 is magnetized in a direction indicated by $M_2$ in FIG. 55 by the sense current flowing through the first magnetic film 71. On the other hand, the first magnetic film 71 is magnetized in a direction indicated by $M_1$ by the current flowing through the second magnetic film 73. That is, magnetizations of these magnetic films are readily aimed in directions perpendicular to each other by the respective currents. Therefore, a current magnetic field induced by shunting the sense current to flow in the directions perpendicular to each other further stabilizes an operating point bias generated when the magnetizations are set to be perpendicular to each other.

Embodiment C5

The same effect as in Embodiment C2 mentioned earlier could be obtained when a stacked film constituted by magnetic films and a nonmagnetic film rather than a single-layered film was used as the magnetic film used in Embodiment C2. For example, an identical effect was obtained when 8 nm $Co_{90}Fe_{10}$/3 nm Cu/ML1 or ML1/3 nm Cu/ML1 was used in place of 8 nm $Co_{90}Fe_{10}$ of the stacked film of 8 nm $Co_{90}Fe_{10}$/3 nm Cu/8 nm $Co_{90}Fe_{10}$ used in Embodiment C2. Note that ML1 means a multilayered film of 1 nm $Co_{90}Fe_{10}$/(0.6 nm Cu/1 nm $Co_{90}Fe_{10}$)×n (n=6). Note also that the identical effect could be obtained even when the thickness of $Co_{90}Fe_{10}$ of ML1 was increased to about 5 nm and n=1.

Embodiment C6

The same effect as in Embodiment C3 mentioned earlier could be obtained when a stacked film constituted by magnetic films and a nonmagnetic film rather than a single-layered film was used as the magnetic film used in Embodiment C3. For example, an identical effect was obtained when 15 nm FeMn/8 nm $Co_{90}Fe_{10}$/3 nm Cu/ML1 was used in place of the stacked film of 15 nm FeMn/8 nm $Co_{90}Fe_{10}$/3 nm Cu/8 nm $Co_{90}Fe_{10}$ used in Embodiment E2. Note that ML1 has the same meaning as in Embodiment C5. Note also that the identical effect could be obtained even when the thickness of $Co_{90}Fe_{10}$ of ML1 was increased to about 5 nm and n=1.

Embodiment C7

FIG. 75 is a view for explaining a thin film head according to the third invention of the present invention, in which reference numeral 254 denotes a substrate. A lower magnetic film 255 is formed on the substrate 254, a nonmagnetic film 256 is formed on the lower magnetic film 255, and an upper magnetic film 257 is formed on the nonmagnetic film 256. Side magnetic films 258 are formed on the opposing side surfaces of a stacked film constituted by the lower magnetic film 255, the nonmagnetic film 256, and the upper magnetic film 257. Leads 259 and 260 are formed along the upper magnetic film 257 and one of the side magnetic films 258. In this arrangement, a current is flowed from the lead 259 to the lead 260. In the thin film head with this arrangement, the side magnetic films 258 prevent generation of magnetic poles, thereby inhibiting occurrence of edge curling walls. Above effect is exhibited in the case of using a hard magnetic film as the side magnetic films 258.

The thin film head having the above arrangement is manufactured as follows.

Figure 76A:
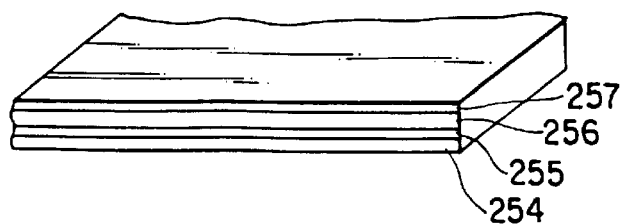
FIGS. 76A to 76E are perspective views showing an example of manufacturing steps of the thin film head according to the third invention of the present invention.
Figure 76B:
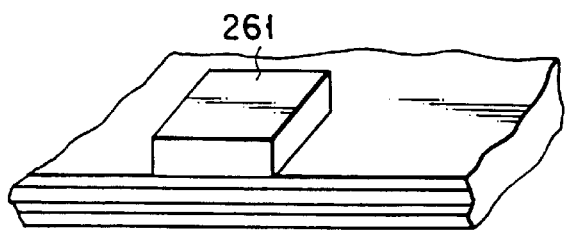
Figure 76C:
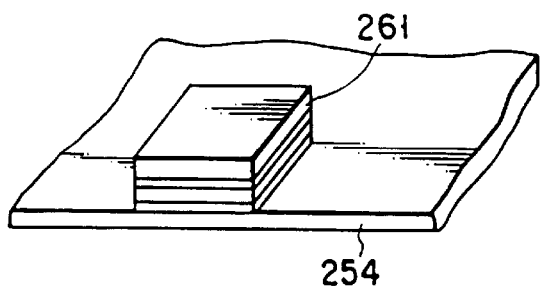
Figure 76D:
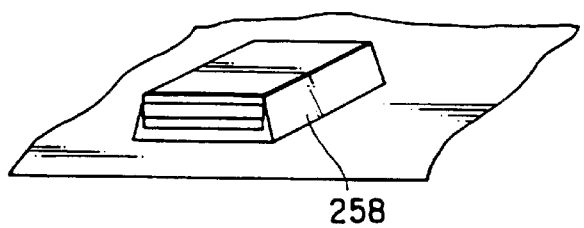
Figure 76E:
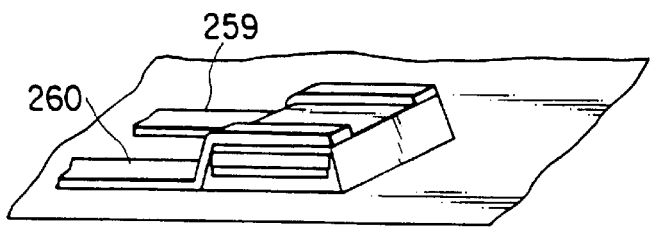

First, as shown in FIG. 76A, the lower magnetic film 255 consisting of, e.g., permalloy, the nonmagnetic film 256 consisting of, e.g., Cu, and the upper magnetic film 257 consisting of, e.g., permalloy are formed in sequence on the substrate 254. Subsequently, as shown in FIG. 76B, a resist is coated on top of the upper magnetic film 257 to form a mask 261 having the shape of a magnetoresistance effect element. Thereafter, as shown in FIG. 76C, the upper magnetic film 257, the nonmagnetic film 256, and the lower magnetic film 255 are etched in this order by means of, e.g., ion milling or RIE. After the mask 261 is removed, as shown in FIG. 76D, the side magnetic films 258 can be formed by performing milling of the upper magnetic film 257 and the nonmagnetic film 256 under conditions by which no redeposition is caused, and performing milling of the lower magnetic film under conditions by which redeposition is caused. The side magnetic films can be magnetically hardened by using an etching gas containing on $O_2$ gas in an etching process. Thereafter, as shown in FIG. 76E, the leads 259 and 260 consisting of, e.g., Cu are formed by means of lift-off or the like.

The method of milling of the magnetoresistance effect element is not limited to the above method. As an example, all of the upper magnetic film 257, the nonmagnetic film 256, and the lower magnetic film 255 are milled once under the conditions by which no redeposition is caused. Subsequently, a magnetic film is formed on all the surfaces of the magnetoresistance effect element without removing a mask member under conditions by which the magnetic film is readily deposited only on the side surfaces of the magnetoresistance effect element, thereby magnetically connecting the edges of the upper and lower magnetic films. Thereafter, dry etching is again performed to remove portions of the magnetic film formed on all the surfaces of the magnetoresistance effect element except for the connection portions.

Figure 77A:
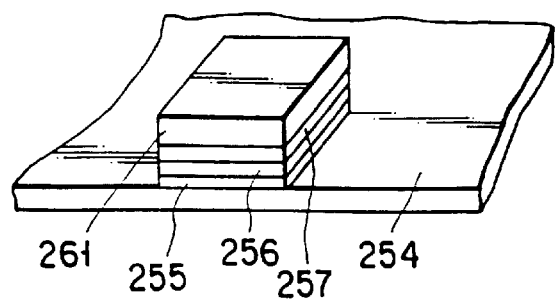
FIGS. 77A to 77C another perspective views showing another example of the manufacturing steps of the thin film head according to the third invention of the present invention.
Figure 77B:
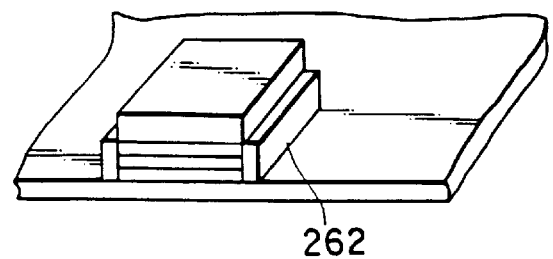
Figure 77C:
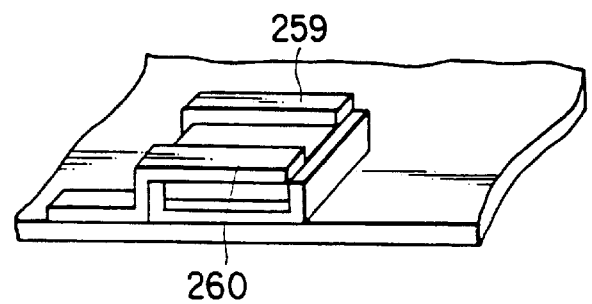

Alternatively, as shown in FIG. 77A, after a magnetoresistance effect element is formed into a rectangular shape, side magnetic films 262 are formed by selectively growing a material consisting of $Fe(CO)_5$, $Co(CO)_5$, $Ni(CO)_4$, $Fe(C_5H_5)_2$, $Co(C_5H_5)_2$, or $Ni(C_5H_5)_2$ by a chemical vapor deposition process only on metal exposed portions of the edges of the magnetoresistance effect element without removing a mask member, thereby magnetically connecting the edges of the upper and lower magnetic films. Lastly, as shown in FIG. 77C, the leads 259 and 260 are formed.

Figure 78:
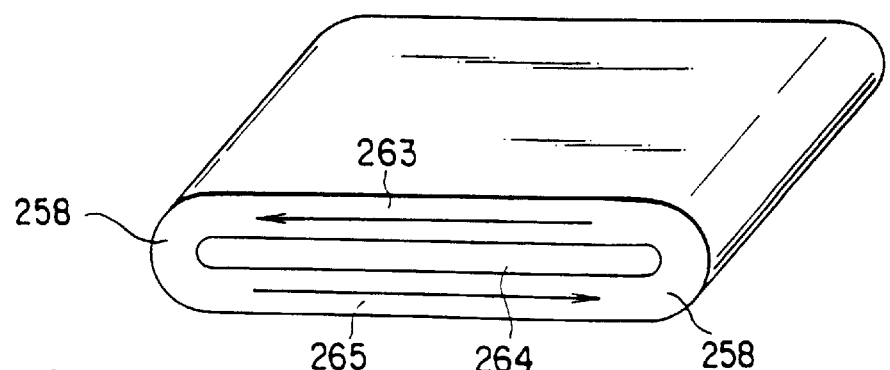
FIG. 78 is a perspective view showing an embodiment of a magnetoresistance effect element of the thin film head according to the third invention of the present invention.

FIG. 78 shows a state of magnetic moment when upper and lower magnetic films 263 and 265 sandwiching a nonmagnetic film 264 are ideally magnetically connected. Referring to FIG. 78, no edge curling walls are produced because no magnetic poles are generated at the edges of a magnetoresistance effect element, so the entire magnetoresistance effect element can be used as an active region.

Figure 79A:
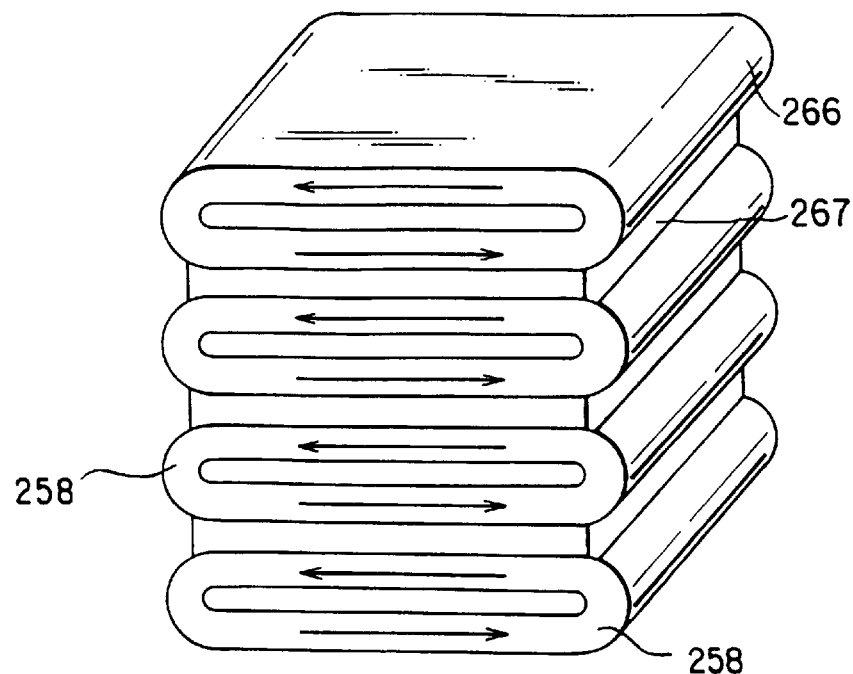
FIGS. 79A, 79B, 80 and 81 are perspective views showing other embodiments of the magnetoresistance effect element of the thin film head according to the third invention of the present invention.
Figure 79B:
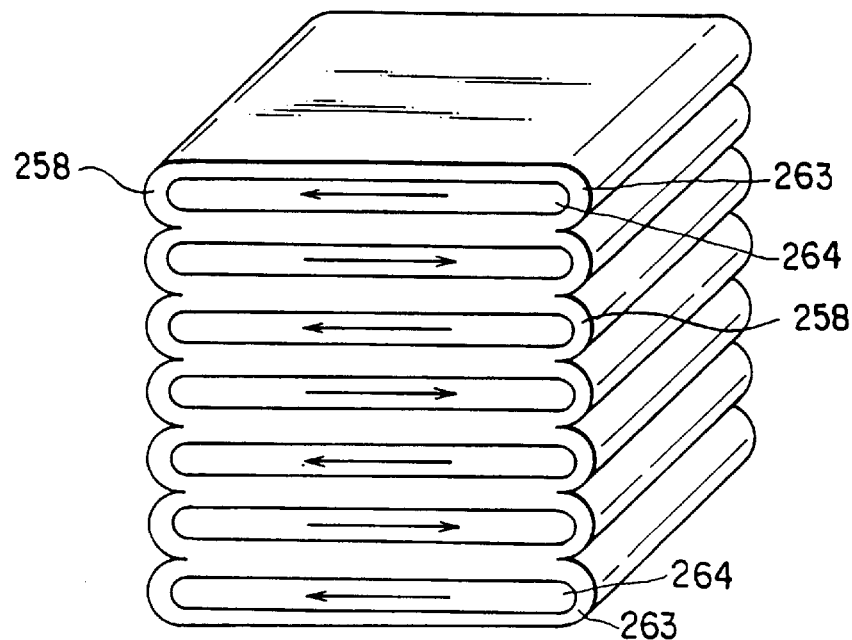

FIGS. 79A and 79B show other embodiments of the thin film head according to the third invention of the present invention. A magnetoresistance effect element shown in FIG. 79A is formed by stacking a plurality of magnetoresistance effect elements 266 shown in FIG. 78 via nonmagnetic films 267. A magnetoresistance effect element shown in FIG. 79B is formed by stacking magnetic films 263 and nonmagnetic films 264 alternately and magnetically connecting the edges of the magnetic films 263.

In the magnetoresistance effect element with either of the above arrangements, no edge curling walls are formed because no magnetic poles are generated at the edges of the element. Therefore, the whole magnetoresistance effect element can be used as an active region. Above effect is exhibited in the case of using a hard magnetic film as the side magnetic films.

Figure 80:
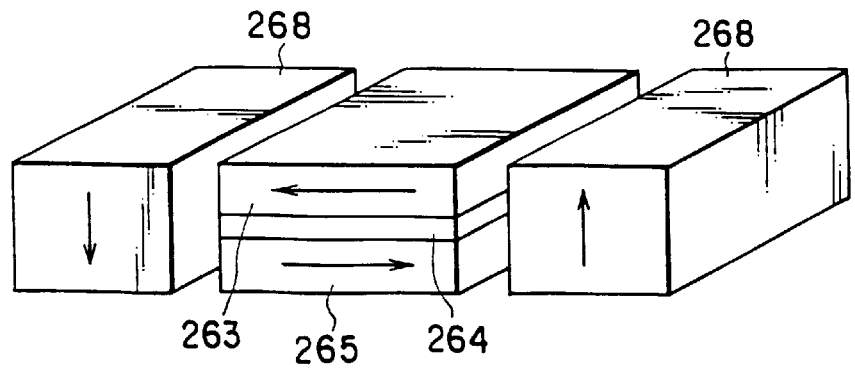
Figure 81:
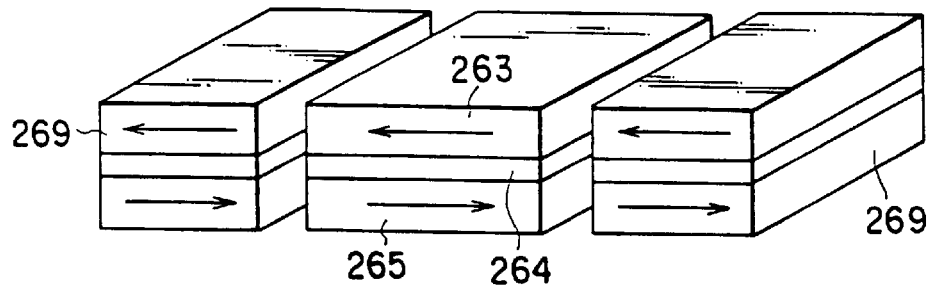

In addition, as shown in FIG. 80 or 81, edge curling walls can be prevented by arranging hard magnetic films 268 or 269 on both sides of a magnetoresistance effect element consisting of upper and lower magnetic films 263 and 265 and a nonmagnetic film 264. The hard magnetic films 268 shown in FIG. 80 are perpendicular magnetic films, and the hard magnetic films 269 shown in FIG. 81 are longitudinal magnetic films.

Embodiment D1

Figure 46:
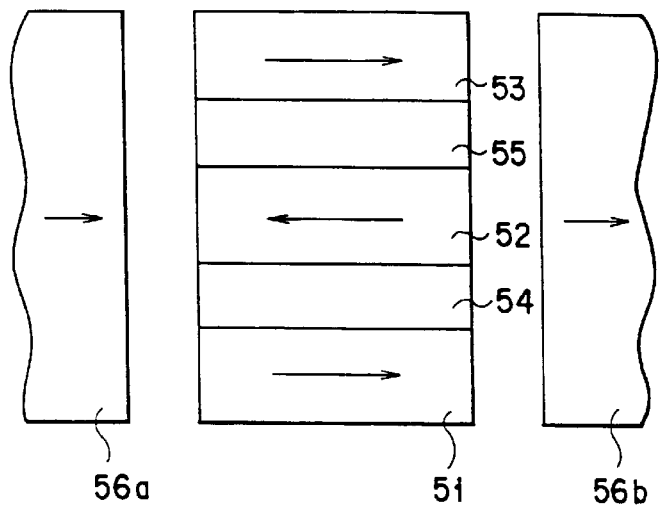
FIG. 46 is a sectional view showing one embodiment of the fourth invention of the present invention.

FIG. 46 is a schematic view showing an embodiment according to the fourth invention of the present invention. In this magnetoresistance effect element, three magnetic films 51, 52, and 53 are stacked via nonmagnetic films 54 and 55 on a substrate 50. When the external magnetic field is zero, the direction of magnetizations of the magnetic films 51 and 53 is antiparallel to the direction of magnetization of the magnetic film 52 due to an RKKY-like interaction.

Permanent magnets 56a and 56b are arranged adjacent to both the sides of this stacked film and magnetized in the same direction as the magnetic films 51 and 53. Therefore, the permanent magnets 56a and 56b apply magnetic fields $H_{ext}$ in the same direction to the magnetic films 51, 52, and 53. In addition, since the magnetic films 51, 52, and 53 are made from a ferromagnetic substance, they apply static magnetic fields to the other magnetic films.

Figures 47A, 47B, 47C:
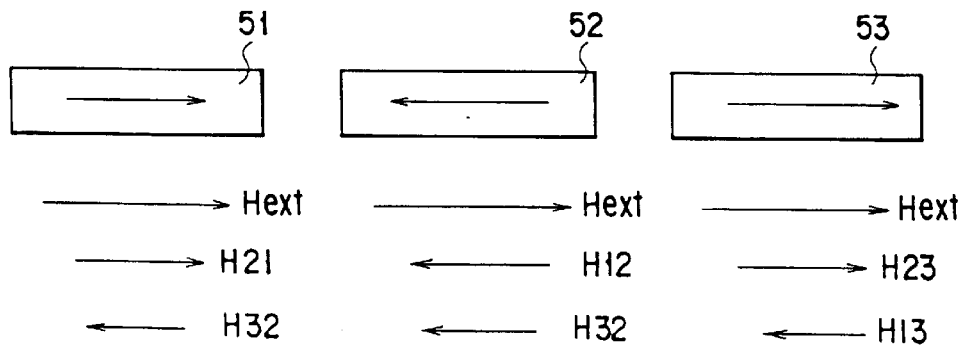
FIGS. 47A to 47C are schematic views each showing a magnetic field applied to each individual magnetic film in the magnetoresistance effect element according to the fourth invention of the present invention.

FIGS. 47A, 47B, and 47C schematically illustrate the directions and strengths of magnetic fields applied to the magnetic films 51, 52, and 53, respectively. The magnetic films 51 and 53 are applied with the magnetic field $H_{ext}$ from the permanent magnets and static magnetic fields $H_{21}$ and $H_{23}$ from the magnetic film 52 in the same direction as the magnetization direction. In addition, static magnetic fields $H_{31}$ and $H_{13}$ from the magnetic films 51 and 53 are applied in opposite directions. However, since $H_{21}>H_{31}$ and $H_{23}>H_{13}$, a bias magnetic field is applied to the magnetic films 51 and 53 in the same direction as the magnetization direction.

In contrast, since the magnetization direction of the magnetic film 52 is opposite to that of the magnetic films 51 and 53, the magnetic film 52 is applied with the magnetic field $H_{ext}$ in a direction opposite to the magnetization direction. However, static magnetic fields $H_{12}$ and $H_{32}$ from the magnetic films 51 and 53 are applied in a direction opposite to that of the magnetic field $H_{ext}$. Therefore, the magnetic film 52 can also be applied with a bias magnetic field in the same direction as the magnetization direction by adjusting the strength of the magnetic field generated by the permanent magnets and the distance between each permanent magnet and the stacked film to thereby meet ($H_{ext}<H_{12}+H_{32}$).

Note that if the number of magnetic films is an odd number, it is preferable to flow a sense current parallel to the magnetization direction in order to stabilize the antiparallel state of the magnetizations when the magnetic field is zero.

Embodiment D2

Figure 48:
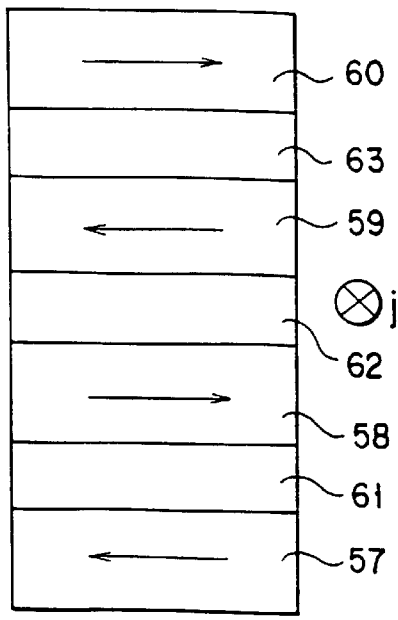
FIG. 48 is a sectional view showing one embodiment of the fourth invention of the present invention.
Figure 49A:
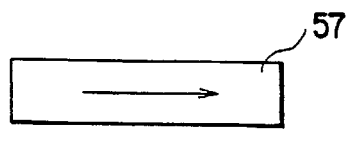
FIGS. 49A to 49D are schematic views each showing a magnetic field applied to each individual magnetic film in the magnetoresistance effect element according to the fourth invention of the present invention.
Figure 49B:
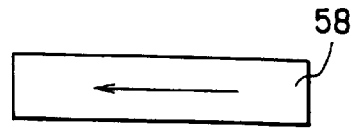
Figure 49C:
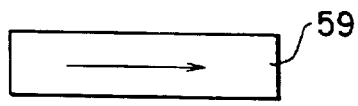
Figure 49D:

FIG. 48 is a schematic view showing an embodiment according to the fourth invention of the present invention. In this magnetoresistance effect element, four magnetic films 57, 58, 59, and 60 are stacked via nonmagnetic films 61, 62, and 63 on a substrate 50. The magnetic films 57 and 59 and the magnetic films 58 and 60 are antiparallel to each other, respectively, when the magnetic field is zero. If the direction of a sense current to be flowed through this stacked film is perpendicular to the magnetization direction, a current magnetic field is applied either parallel or antiparallel to the magnetization direction.

FIGS. 49A, 49B, 49C, and 49D schematically illustrate the directions and strengths of magnetic fields applied to the magnetic films 57, 58, 59, and 60, respectively. The magnetic film 57 is applied with a magnetic field $H_{j6}$, which is generated by currents flowing through the magnetic films 58 to 60 and the nonmagnetic films 61 to 63, in the same direction as the magnetization direction. As static magnetic fields, magnetic fields $H_{21}$ and $H_{41}$ from the magnetic films 58 and 60 are applied in the same direction as the magnetization direction, and a magnetic field $H_{31}$ from the magnetic film 59 is applied in the opposite direction. Since $H_{21}>H_{31}>H_{41}$, the net magnetic field applied to the magnetic film 57 is in the same direction as the magnetization direction. The magnetic film 58 is applied with a magnetic field $H_{j2}$, which is generated by currents flowing through the magnetic film 57 and the nonmagnetic film 61, in the same direction as the magnetization direction, and a magnetic field $H_{j4}$, which is generated by currents flowing through the nonmagnetic films 62 and 63, in a direction opposite to the magnetization direction ($H_{j2}<H_{j4}$). As static magnetic fields, $H_{12}$ and $H_{32}$ are applied in the same direction as the magnetization direction, and $H_{42}$ is applied in the opposite direction ($H_{12}, H_{32}>H_{42}$). Therefore, by adjusting the magnitude of the sense current or the dimensions of the stacked film to meet $H_{j2}+H_{12}+H_{32}>H_{j4}+H_{42}$, the net magnetic field applied to the magnetic film 58 can also be set in the same direction as the magnetization direction. At this point, a magnetic field of the same magnitude as that of the magnetic field applied to the magnetic film 58 but in the opposite direction is applied to the magnetic film 59, and a magnetic field of the same magnitude as that of the magnetic field applied to the magnetic film 57 but in the opposite direction is applied to the magnetic film 60, both by the effect of symmetry. Since the magnetization directions of the magnetic films 59 and 60 are also opposite to each other, a bias magnetic field can be applied in the same direction as the magnetization direction.

Note that if the number of magnetic films is an even number, it is desirable to arrange perpendicular magnetic films 64a and 64b adjacent to the stacked films as shown in FIG. 50 such that bias magnetic fields are applied in the same directions as the magnetization directions of the uppermost and lowermost magnetic films, in order to further stabilize the antiparallel state of magnetizations of the stacked films.

A method of using the magnetoresistance effect element according to the sixth invention of the present invention will be described below. The magnetoresistance effect element of the sixth invention is used at a high current density of approximately $10^6$ to $10^7$ A/cm$^2$. As discussed earlier, the strength of this sense current is of the order of about 10 Oe. Since the Néel temperature or the blocking temperature of the antiferromagnetic substance used is about 150 to 300° C., its unidirectional nature is disturbed by heat generated by the sense current, and this makes magnetization locking impossible. When the element was actually operated at a temperature of about 60 to 90° C. for a long period of time, characteristics were degraded.

Figure 6:
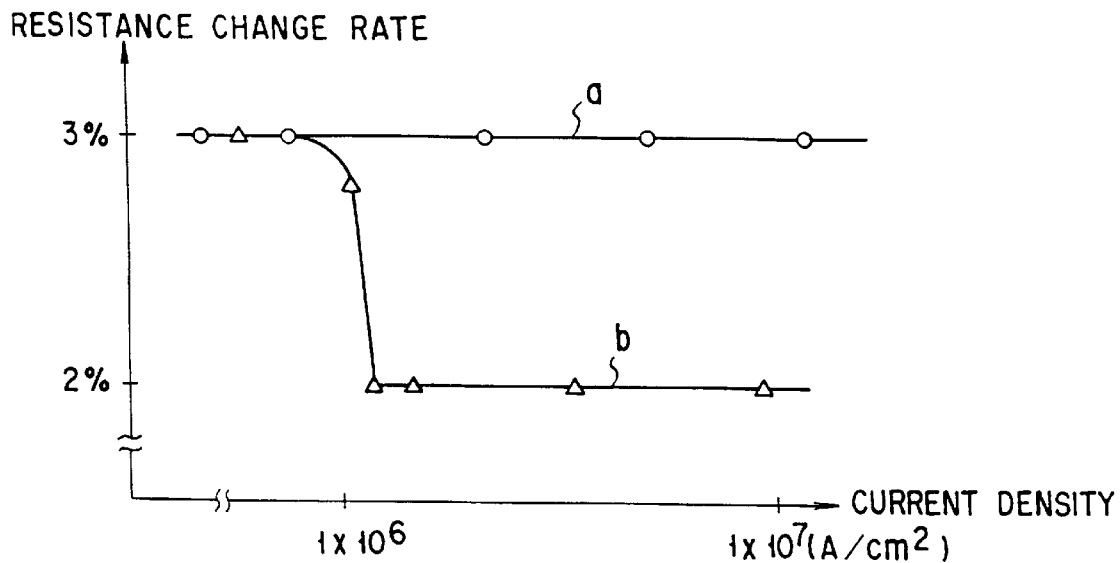
FIG. 6 is a graph showing the relationship between the magnitude of a sense current and the resistance change rate.

FIG. 6 is a graph showing the relationship between the magnitude of a sense current and the resistance change rate. As can be seen from FIG. 6, the resistance change rate is maintained constant even at a high current density when a current magnetic field acts in the same direction as the unidirectional nature of the antiferromagnetic substance (a). In contrast, if the current magnetic field acts in the opposite direction, the resistance change rate decreases even at $10^6$ A/cm$^2$. This demonstrates that the direction of the sense current must be so selected as to generate a magnetic field in substantially the same direction as the unidirectional nature of the antiferromagnetic substance (b).

Embodiment E1

FIG. 41 is a perspective view showing a fifth invention of the present invention. In FIG. 41, a stacked film of $Co_{90}Fe_{10}$/Cu/$Co_{90}Fe_{10}$ is patterned into a rectangular shape, and the short sides of this stacked film correspond to the track width.

A sense current (indicated by $I_S$ in FIG. 41) flows in the longitudinal direction of the stacked film. The resulting current magnetic field magnetizes upper and lower magnetic films 44 and 42 in an antiparallel state. The sense current flows from a lead 45a formed at the center of the stacked film and is divided into two directions. These two shunt currents flow out from leads 45b and 45c formed at the end portions. Since, therefore, the directions of currents flowing through the magnetoresistance effect element are opposite to each other on the two sides of the central lead 45a, the directions of magnetizations of the upper and lower magnetic films 44 and 42 are also opposite to each other on the two sides of the central lead 45a. Magnetizations $M_1$ and $M_2$, and $M_3$ and $M_4$, indicated by broken arrows in FIG. 41, form pairs in the upper and lower magnetic films, but $M_1$ and $M_3$, and $M_2$ and $M_4$ are magnetized in opposite directions, respectively, in the same magnetic films. This produces domains in the same magnetic films to decrease the magnetostatic energy. As a result, a sense current required to magnetize the upper and lower magnetic films to be antiparallel to each other decreases.

A signal magnetic field flows in the direction of a short side. For this reason, the higher the aspect ratio of the magnetoresistance effect film, the smaller the resulting demagnetizing field. This reduces the saturation magnetic field to improve sensitivity with respect to the external magnetic field. Therefore, the sensitivity can be improved by extending the magnetoresistance effect film from the surface of a medium in the opposite direction. The magnetizations of the upper and lower magnetic films 44 and 42 can be stabilized by flowing a current.

In addition, as shown in FIG. 42, it is also possible to extend the current inflow lead 45a to shunt the current from the magnetoresistance effect film, thereby applying an operating point bias by using the current magnetic field of the shunt current. Referring to FIG. 42, currents $I_{S1}$ and $I_{S3}$ of an inflow current Is are flowed through the magnetoresistance effect film, and a current $I_{S2}$ is shunted to generate the operating point bias from the inflow current $I_S$.

The structure of Embodiment E1 is naturally applicable to a magnetoresistance effect element of a type in which a magnetic flux is guided by using yokes.

Another method of using the magnetoresistance effect head of this embodiment will be described below.

In this method, three current leads are used such that their potentials are sequentially decreased or increased from the one closest to the surface opposing a medium. Assume, for example, that the total length of a magnetoresistance effect element is 10 μm, a lead closest to the surface opposing the medium has a lead width of 0.5 μm and the ground potential, the second closest lead has a distance of 2 to 3 μm from the surface opposing the medium, a lead width of 1 μm, and a potential of 50 mV, and the farthest lead has a distance of 10 μm from the surface opposing the medium, a lead width of 1 μm, and a potential of 60 mV. In this case, it is preferred to extract an output from between the lead closest to the surface opposing the medium and the second closest lead.

With this arrangement, a demagnetizing field in the longitudinal direction is small since the total length of the magnetoresistance effect element is 10 μm, and this makes it possible to keep a specific permeability of about 1,000. In addition, extracting an output from between the lead closest to the surface opposing the medium and the second closest lead allows a magnetic flux from the medium to enter sufficiently, yielding a high output. Furthermore, since the current flows to as far as the position of the farthest lead, Barkhausen noise in that portion can be removed. For these reasons, it is possible to obtain a high-output, noise-free thin film head.

Embodiment E2

Figure 40:
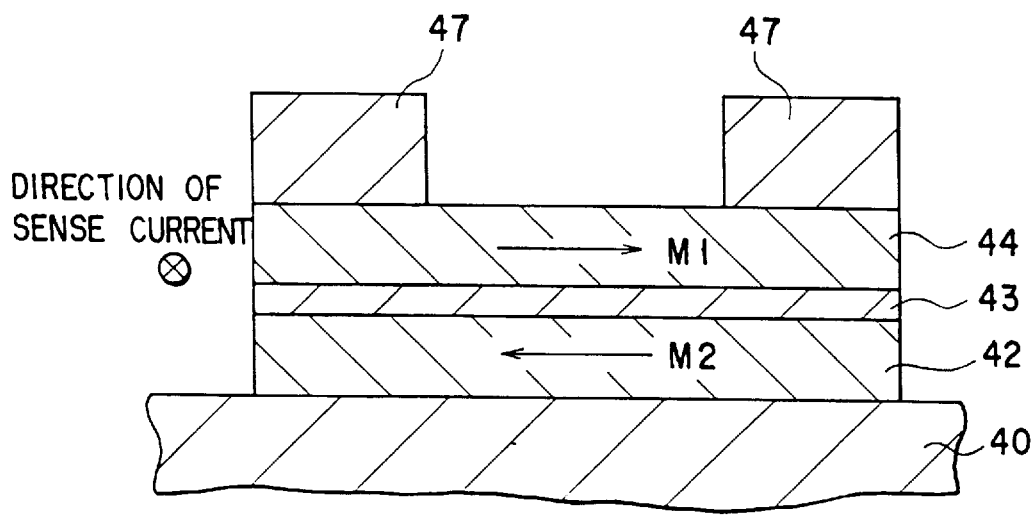
FIG. 40 is a sectional view showing still one embodiment of the fifth invention of the present invention.

FIG. 40 is a sectional view showing a magnetoresistance effect element according to the fifth invention in which, in order to suppress edge curling walls, antiferromagnetic films 47 consisting of FeMn are formed in the vicinities of the edges of a magnetoresistance effect film in which a magnetic charge appears. That is, this magnetoresistance effect element has a structure in which the antiferromagnetic films 47 are arranged in the vicinities of the end faces of a stacked film of $Co_{90}Fe_{10}$/Cu/$Co_{90}Fe_{10}$. The film thicknesses of the individual stacked films are 8 nm $Co_{90}Fe_{10}$/3 nm Cu/8 nm $Co_{90}Fe_{10}$. This stacked film forms a spin valve structure, and a resistance change caused by spin-dependent scattering takes place in this structure. Each antiferromagnetic film 47 is formed to have a thickness of 15 nm. Note that a sense current flows in a direction pointing into the paper.

Magnetizations of upper and lower magnetic films 44 and 42 are antiparallel to each other as indicated by allows $M_1$ and $M_2$ in FIG. 40 due to a current magnetic field. As a consequence, a magnetic charge is generated in the end faces of the magnetic films, and the resulting demagnetizing field generates edge curling walls. In this case, magnetization in the vicinity of the edge of the upper magnetic film 44 is locked by exchange coupling with the antiferromagnetic film 47 arranged near the edge. This produces magnetostatic coupling with the lower magnetic film 42, and so the magnetization near the edge of the lower magnetic film 42 not in direct contact with the antiferromagnetic film 47 readily points in the direction of the end face. Consequently, occurrence of edge curling walls is discouraged, and this prevents a decrease in the sensitivity of the magnetoresistance effect element.

Embodiment E3

In Embodiment E3 to E5, described is magnetization-antiparallel type magnetoresistance effect element according to the fifth invention.

Figure 43A:
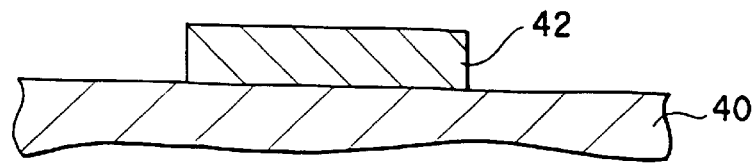
FIGS. 43A to 43C are sectional views showing steps of manufacturing a stacked film according to the fifth invention of the present invention.
Figure 43B:
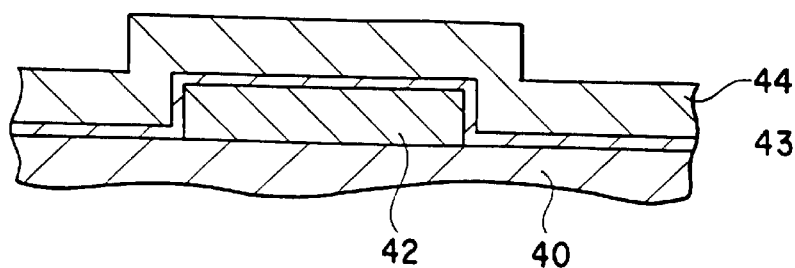
Figure 43C:
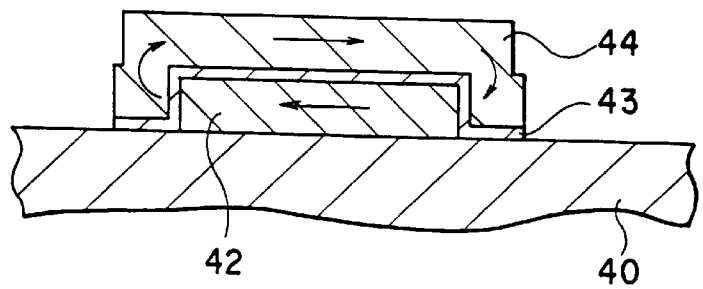

In this embodiment, deterioration of the characteristics of lower and upper magnetic films 42 and 44 caused by edge curling walls can be reduced by refluxing the magnetic fluxes of these magnetic films. As shown in FIGS. 43A to 43C, reflux of magnetic fluxes is readily caused by manufacturing a magnetic stacked film having a shape in which the end faces of the lower magnetic film 42 are covered. FIGS. 43A to 43C are sectional views viewed from a short side of the stacked film. This stacked film extends in a direction pointing into the paper, and a sense current also flows in the direction pointing into the paper.

In manufacturing this structure, as shown in FIG. 43A, a $Co_{90}Fe_{10}$ film as the lower magnetic film 42 is first formed on a substrate 40 and patterned. Subsequently, as shown in FIG. 43B, a Cu film as a nonmagnetic film 43 and a $Co_{90}Fe_{10}$ film as the upper magnetic film 44 are formed in sequence on the entire surface. Lastly, as shown in FIG. 43C, the resultant structure is again patterned to form a magnetoresistance effect element having a structure in which the end faces of the lower magnetic film 42 are covered.

As indicated by arrows in FIG. 43C, the upper and lower magnetic films 44 and 42 are magnetized to the right and left, respectively, by the sense current, and a magnetic flux is refluxed through the upper and lower magnetic films 44 and 42 by the magnetic film which covers the end faces of the lower magnetic film 42. This structure is useful in both an arrangement using spin-dependent scattering and an arrangement using an anisotropic magnetoresistance effect.

Embodiment E4

In Embodiment E3 described above, the lower magnetic film 42 is patterned, and then the nonmagnetic film 43 and the upper magnetic film 44 are patterned to form the magnetoresistance effect element having a structure in which the end faces of the lower magnetic film 42 are covered. In this Embodiment E4, a method of manufacturing a magnetoresistance effect element through one-time patterning will be described.

Figure 44:
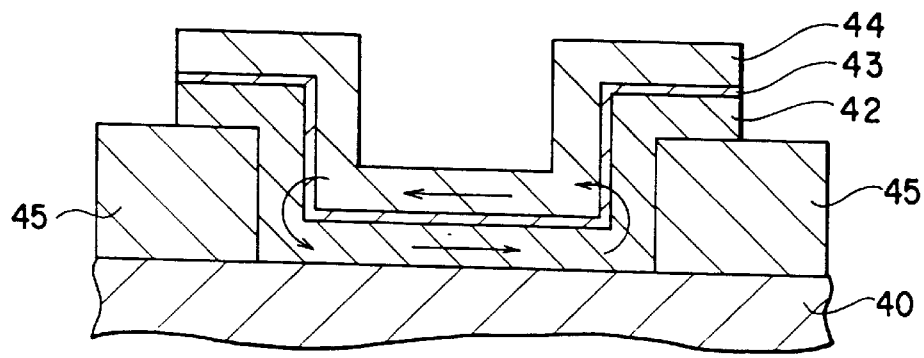
FIG. 44 is a sectional view showing still another embodiment of the fifth invention of the present invention.

FIG. 44 is a sectional view showing a magnetoresistance effect element manufactured by one-time patterning. First, leads 45 are formed on a substrate 40, and a track width is defined between the leads. On top of this structure, a lower magnetic film, a nonmagnetic film, and an upper magnetic film are formed in this order. In this embodiment, the composition of this stacked film is $Co_{90}Fe_{10}/Cu/Co_{90}Fe_{10}$. Lastly, the resultant stacked film is patterned.

The stacked film on the track portion is bent at portions in contact with the leads 45. In each bent portion, magnetization generates a magnetic charge to raise the magnetostatic energy. As a consequence, magnetostatic coupling for refluxing a magnetic flux between the upper and lower magnetic films 44 and 42 is obtained, and this forms an antiparallel state.

Embodiment E5

Figure 45:
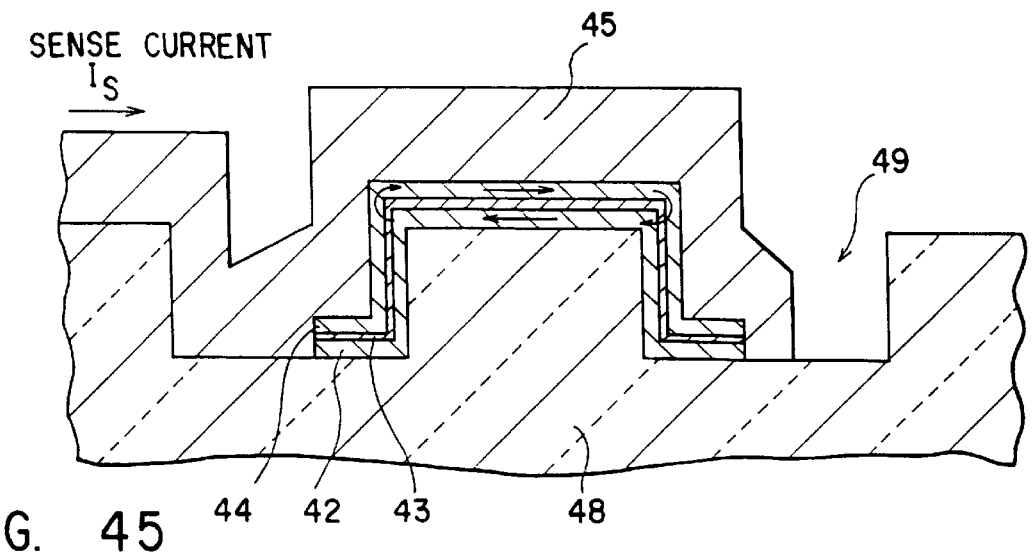
FIG. 45 is a sectional view showing still another embodiment of the fifth invention of the present invention.

Embodiment E4 exemplifies the structure in which the antiparallel state of the stacked magnetic films is produced by using steps or undulations. In this Embodiment E5, a method of forming an antiparallel state in a magnetoresistance effect element of a type in which a sense current is flowed in the flowing direction of a signal magnetic field will be described. Referring to FIG. 45, trenches 49 are formed in a glass substrate 48 in a direction parallel to the flowing direction of a sense current of a magnetoresistance effect element. A $Co_{90}Fe_{10}/Cu/Co_{90}Fe_{10}$ stacked film is an element for generating a magnetoresistance effect.

This magnetoresistance effect element extends in a direction pointing into the paper, and a signal magnetic field enters and leaves in a direction perpendicular to the paper. A sense current $I_S$ is supplied from the left side of FIG. 45 through a lead 45. The sense current Is thus supplied flows through the $Co_{90}Fe_{10}/Cu/Co_{90}Fe_{10}$ stacked film in the direction pointing into the paper. Lower and upper magnetic films 42 and 44 are magnetized by the current magnetic field as indicated by arrows shown in FIG. 45. The magnetizations of the upper and lower magnetic films reflux a magnetic flux at the step portions formed by the trenches 49, thereby generating magnetostatic coupling. Therefore, since no magnetic charge appears as compared with a structure in which end faces are exposed, it is possible to reduce degradation of the characteristics of a magnetoresistance effect caused by edge curling walls.

Embodiment F1

FIG. 71 is a view for explaining still an embodiment of the thin film head according to the seventh invention of the present invention. In this thin film head, an NiFe stacked film 231 is arranged only on the end face of a magnetoresistance effect element which opposes a medium, and the other portion of the magnetoresistance effect element consists of a Co-based two-layered film 232. NiFe has a high corrosion resistance and is therefore used as a core of a thin film head. In addition, NiFe has an anisotropic magnetoresistance effect of about 3%. For this reason, the electrical resistance in a portion of the Co-based two-layered film 232 which is adjacent to the NiFe stacked film 231 changes in accordance with the external magnetic field. The sign of this electrical resistance change caused by the anisotropic magnetoresistance effect is opposite to that of an electrical resistance change caused by spin-dependent scattering. In the embodiment shown in FIG. 71, however, the NiFe stacked film does not actually contribute to the electrical resistance, since the NiFe stacked film is electrically parallel with leads 233.

The NiFe stacked film 231 functions as a flux guide for guiding a magnetic field from a medium to this Co-based two-layered film 232. In this embodiment, NiFe is used as the material of the stacked film arranged on the end face of the magnetoresistance effect element. However, the material of the stacked film is not limited to NiFe but may be any material provided that the material is a soft magnetic material with a high corrosion resistance.

Embodiment F2

FIG. 91 is a view for explaining another embodiment of a thin film head according to the seventh invention of the present invention. FIG. 92 is a sectional view showing the magnetoresistance effect head shown in FIG. 91.

Referring to FIGS. 91 and 92, reference numeral 281 denotes a substrate. An insulating layer 282 is formed on the substrate 281. A pair of magnetic yokes 283 consisting of a soft magnetic material, such as NiFe, are arranged on the insulating layer 282, and a nonmagnetic layer 284 consisting of a conductor, such as Cr, W, Ta, or Ti, or an insulator, such as $Al_2O_3$, is sandwiched between the magnetic yokes 283. An magnetoresistance effect element 285 is also sandwiched between the edges of the pair of magnetic yokes 283. Note that this magnetoresistance effect element 285 is formed by sequentially stacking a lower magnetic film, a nonmagnetic film, and an upper magnetic film. Examples of the arrangement of the magnetoresistance effect element are CoFe/Cu/CoFe, NiFe/Cu/NiFe, and NiFe/$Al_2O_3$/NiFe. First leads 286 are connected to the pair of magnetic yokes 283. Second leads 287 are formed outside the magnetoresistance effect element 285 so as to sandwich the magnetoresistance effect element between them. In addition, an insulating layer 288 is formed as the uppermost layer.

Referring to FIG. 92, currents $I_{MR}/2$ are supplied from the first leads 286 into the magnetic yokes 283 and flowed out from the second leads 287 through the magnetoresistance effect element 285. The current flowing through the upper magnetic yoke forms a magnetic field pointing into the paper in the lower magnetic yoke, and the current flowing through the lower magnetic yoke forms a magnetic field pointing out of the paper in the upper magnetic yoke. Therefore, the magnetic moments of the two magnetic yokes magnetostatically couple to form a single magnetic domain in each magnetic yoke. In addition, the magnetic moments of the two magnetic yokes are antiparallel to each other because the magnetic yokes are arranged on both sides of the magnetoresistance effect element 285. Therefore, the upper and lower magnetic films constituting the magnetic yokes ferromagnetically couple with the two magnetic films constituting a magnetism-sensitive portion of the magnetoresistance effect element, i.e., do not interfere with an antiparallel state of the two magnetic films.

Figure 93:
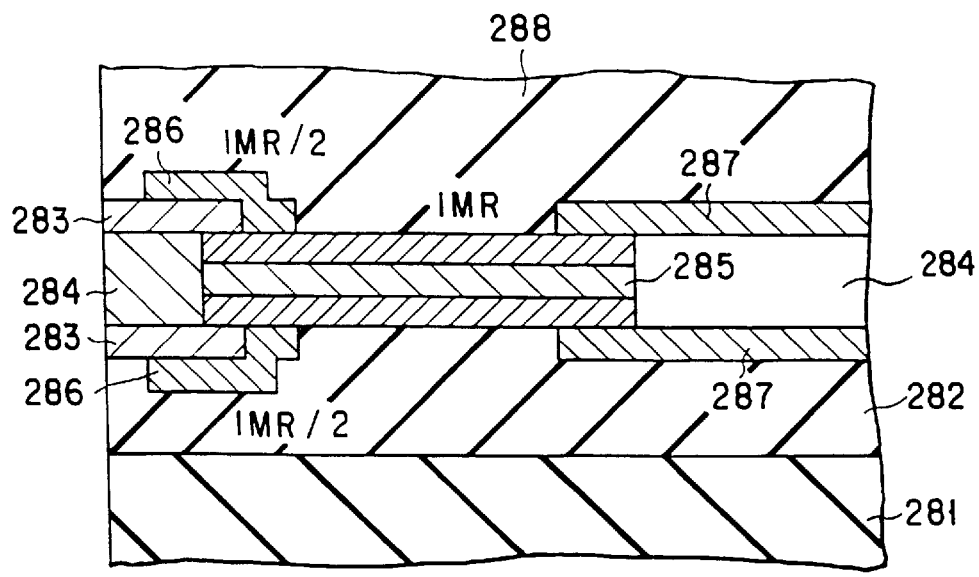
FIG. 93 is a sectional view showing another embodiment of the thin film head according to the seventh invention of the present invention.

FIG. 93 is a sectional view showing another embodiment of the thin film head according to the seventh invention of the present invention.

Figure 94:
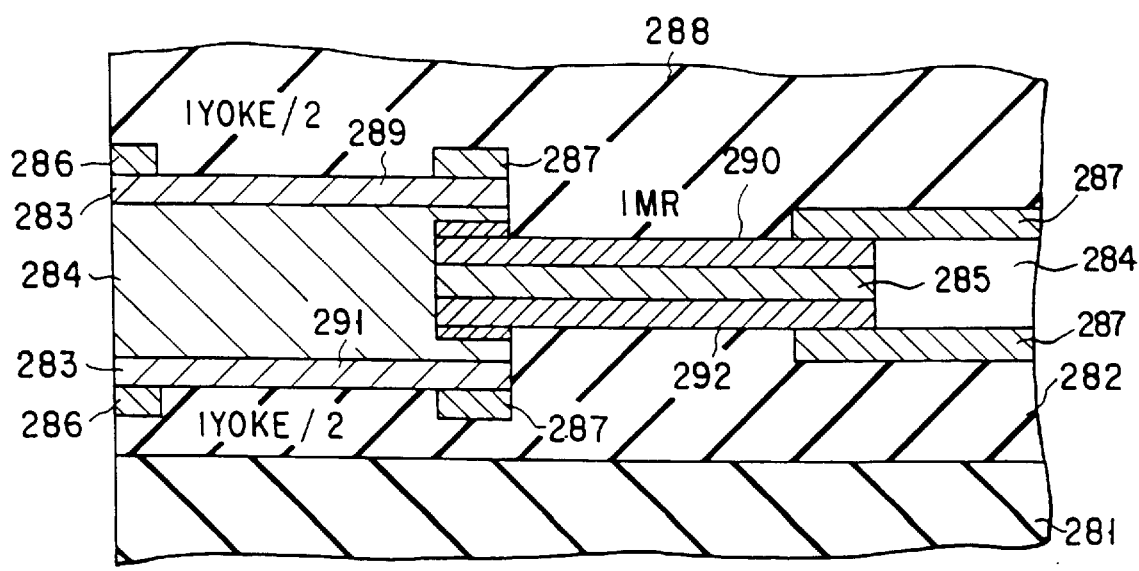
FIG. 94 is a sectional view showing still another embodiment of the thin film head according to the seventh invention of the present invention.

Referring to FIG. 94, first leads 286 are electrically connected with both of magnetic yokes 283 and a magnetism-sensitive portion of a magnetoresistance effect element 285. This makes it possible to sense changes in electrical resistance in only the magnetism-sensitive portion of the magnetoresistance effect element 285. In FIG. 94, the first leads 286 are recessed from the end face of the head in order to prevent corrosion. If, however, a material with a high corrosion resistance is used, the first leads 286 may be exposed to the end face of the head.

FIG. 95 is a sectional view showing still another embodiment of the thin film head according to the seventh invention of the present invention.

Referring to FIG. 95, two different leads are connected to both of magnetic yokes 283 and a magnetism-sensitive portion of a magnetoresistance effect element 285, making it possible to select the directions and magnitudes of individual currents independently of each other. In FIG. 95, since the current flowing through the magnetic yokes 283 and the current flowing through the magnetism-sensitive portion of the magnetoresistance effect element 285 point in opposite directions, the magnetic moment of an upper magnetic layer 289 of the magnetic yokes 283 and the magnetic moment of an upper magnetic film 290 of the magnetism-sensitive portion of the magnetoresistance effect element also point in opposite directions. This highly stabilizes the single domain structure of each layer also in respect of magnetostatic energy. The magnetic moment of a lower magnetic layer 291 of the magnetic yokes 283 and the magnetic moment of a lower magnetic film 292 of the magnetism-sensitive portion of the magnetoresistance effect element 285 also have an identical relation. Consequently, the single domain structures of these layers become stable enough to sufficiently prevent Barkhausen noise.

Embodiment G1

FIG. 69 is a view for explaining an embodiment for applying this bias magnetic field, in which the thin film head according to the eighth invention of the present invention is used as a recording/reproducing head. An arrangement shown in FIG. 69 is the same as that shown in FIG. 67 except that the number of terminals is three. A terminal 224 can be used, for example, as follows. That is, when a large current is supplied to a terminal 220 and the terminal 224 by using a terminal 219 as an open terminal, a strong magnetic field is generated in a direction (of the axis of hard magnetization of a magnetoresistance effect element) perpendicular to a lead in a region 221 at which the magnetoresistance effect element and the lead cross each other. That is, the magnetoresistance effect element is used as a single-pole-piece recording head. Reproduction is performed by using the terminal 224 as an open terminal.

FIG. 70 is a view for explaining another embodiment in which the thin film head according to the eighth invention of the present invention is used as a recording/reproducing head. Referring to FIG. 70, a thick magnetic film 226 is stacked on a magnetoresistance effect element 225, and terminals 227 and 228 are connected to the magnetoresistance effect element 225. In addition, the axis of easy magnetization is set in a direction perpendicular to the direction of a sense current. A coil 229 is wound around the thick magnetic film 226 via an insulating film (not shown).

When a recording current is flowed through the coil 229 by using the terminals 227 and 228 as open terminals in this recording/reproducing head, a magnetic flux is generated in the direction of the axis of hard magnetization of the thick magnetic film 226. The magnetoresistance effect element 225 converges this magnetic flux to produce a strong magnetic field from its end face, thereby magnetizing a medium 223. At this time, the linearity of response of the magnetoresistance effect element with respect to a magnetic field from the medium can be improved by applying a bias magnetic field for adjusting the operating point of the magnetoresistance effect element 225 by flowing a DC current through the coil 229.

Embodiment G2

When a pair of shield layers each consisting of a single-layered magnetic film are to be arranged on both sides of a magnetoresistance effect element with a multilayered structure, these shield layers bring about irregular domain wall movement inside the layers under the influence of, e.g., a magnetic field from a medium. As a result, a magnetic flux is generated in the magnetoresistance effect element to output noise (Barkhausen noise caused by shield layers).

This problem can be solved by application of the thin film head according to the eighth invention of the present invention. That is, as shown in FIG. 72, this thin film head comprises a pair of shield layers 241 each of which is a stacked film constituted by two magnetic films 242 and a conductive or insulating nonmagnetic film 243 sandwiched between the magnetic films 242. A shield layer constant current source 244 is connected to both the shield layers 241, and a magnetoresistance effect element constant current source 245 is connected to a magnetoresistance effect element 247.

In this arrangement, currents $I_1$ and $I_2$ are flowed in the same direction perpendicular to the surface of a magnetic medium 246 from the shield layer constant current source 244 to the shield layers 241, and a sense current is flowed from the magnetoresistance effect element constant current source 245 to the magnetoresistance effect element 247. At this point, the two magnetic films 242 constituting each shield layer are imparted anisotropy in the direction of the track width of the magnetic medium 246 and applied with current magnetic fields in opposite directions parallel to the track width direction. Therefore, the two magnetic films 242 form a single magnetic domain, and this prevents occurrence of Barkhausen noise derived from discontinuous movement of a domain wall caused by a magnetic field from a medium or the like. In this case, since the directions of the currents $I_1$ and $I_2$ are identical, an unnecessary magnetic field in the track width direction which is based on the currents $I_1$ and $I_2$ can be prevented from being applied to the magnetoresistance effect element 247 by using stacked films consisting of the same material and having the same dimensions as the shield layers 241. Note that since the currents $I_1$ and $I_2$ are flowed independently of the sense current, a single magnetic domain can be easily formed in each shield layer 241.

In addition, as shown in FIG. 73, the number of current terminals can be decreased (to half that of FIG. 72) by arranging nonmagnetic conductors 248 between two shield layers 241 and a magnetoresistance effect element 247 to thereby connect the shield layers 241 in series with the magnetoresistance effect element 247, and flowing currents $I_1$ and $I_2$ and a sense current from a single constant current source 249.

By forming two magnetic films constituting a magnetoresistance effect element such that the product of saturation magnetization Ms and a film thickness t of one film differs from that of the other (that is, $Ms_1.t_1$ and $Ms_2.t_2$ are not equal), an operating point bias magnetic field is applied to the magnetoresistance effect element by only a sense current magnetic field flowed through the magnetoresistance effect element. This makes high-sensitivity, high-linearity signal reproduction possible. Since, therefore, no means for applying an operating point bias is necessary, the structure of the thin film head is simplified to facilitate manufacture of the head.

When $Ms_1.t_1$ and $Ms_2.t_2$ are equal, a sense current magnetic field rotates magnetizations of the two magnetic films in opposite directions by the same amount toward the direction of the track width. When there is no signal magnetic field from a magnetic medium, therefore, the angled defined between these magnetizations is 180°. In a magnetoresistance effect effect based on a spin-dependent scattering phenomenon, the resistance of a magnetoresistance effect element reaches a maximum at this angle of 180°. However, the magnetoresistance effect response sensitivity with respect to the signal magnetic field flowing into the magnetoresistance effect element is a minimum. Generally, a magnetoresistance effect element responds at the highest sensitivity while maintaining its linearity when the angle defined between the magnetizations is almost 90°. For this reason, a current is flowed through the bias conductive layer, and the generated bias magnetic field is applied to the two magnetic films, thereby setting the angle between the magnetizations to almost 90°.

When $Ms_1.t_1$ and $Ms_2.t_2$ are unequal, a difference is produced in magnetization movement between the two magnetic films due to a sense current magnetic field as a result of balance between various magnetic energies. Therefore, the angle defined between the magnetizations can be set to almost 90° by properly selecting the relationship between the values of $Ms_1.t_1$ and $Ms_2.t_2$ and the magnitude of the sense current. In this manner, high-sensitivity, high-linearity signal reproduction can be realized without providing any operating point biasing means.

As shown in FIG. 74, it is possible to improve resolving power while preventing a short circuit in a thin film head having shield layers 251 by forming ABS surface exposed portions 252, which determine the resolving power, between a magnetoresistance effect element 253 and the shield layers 251, so that the distance between the magnetoresistance effect element 253 and the shield layer 251 is short at the ABS surface exposed portions 252 and long in a portion far from the ABS surface exposed portions 252.

Embodiment H

Figure 82:
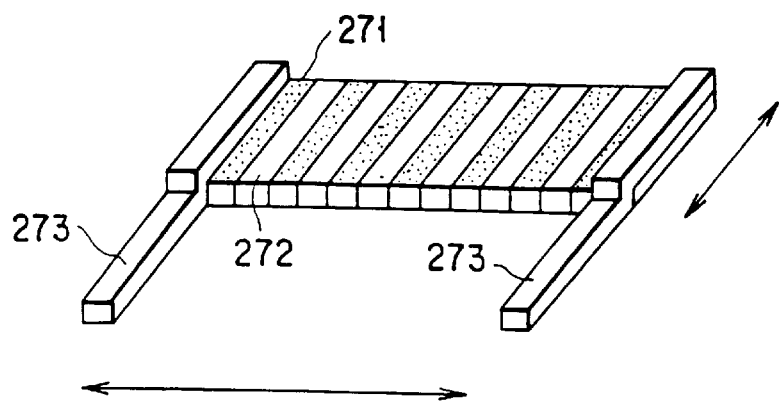

FIG. 82 is a view for explaining an embodiment of a thin film head according to the ninth invention of the present invention. Referring to FIG. 82, reference numeral 271 denotes magnetic bodies consisting of, e.g., $Ni_{80}Fe_{20}$; and 272, nonmagnetic bodies consisting of, e.g., Cu. The rectangular magnetic bodies 271 and nonmagnetic bodies 272 are arranged alternately such that their longitudinal directions are aligned. Leads 273 consisting of, e.g., Cu are formed on both sides of the magnetic bodies 271 thus arranged. In the thin film head with this arrangement, a current is flowed in a direction extending through the interfacial boundaries between the magnetic bodies 271 and the nonmagnetic bodies 272 (i.e., in a direction perpendicular to the interfacial boundaries).

FIGS. 83A to 83E are views for explaining a process of manufacturing a magnetoresistance effect element of the thin film head according to the ninth invention of the present invention. Referring to FIGS. 83A to 83E, reference numeral 274 denotes a substrate consisting of, e.g., Si; and 275, an undercoating layer consisting of Cu. Note that the structure shown in FIGS. 83A to 83E is expressed by using Cu atoms 275, atoms 276 of a magnetic body consisting of $Ni_{80}Fe_{20}$, and atoms 277 of a nonmagnetic conductor consisting of, e.g., Cu.

First, a single-crystal material is cut out such that an angle θ defined between the surface of the substrate and the horizontal plane meets θ≦10°. In this case, the substrate is cut out such that the angle θ between the substrate surface and the horizontal plane is 10° or less for the reason explained below. That is, since 1/(tan10°)=5.7, a step of one atomic height is formed on the substrate surface for each terrace of about six atoms or more. This makes it possible to obtain a practical value of six atoms or more as the repeating pitch of the magnetic bodies and the nonmagnetic bodies.

Figure 83:
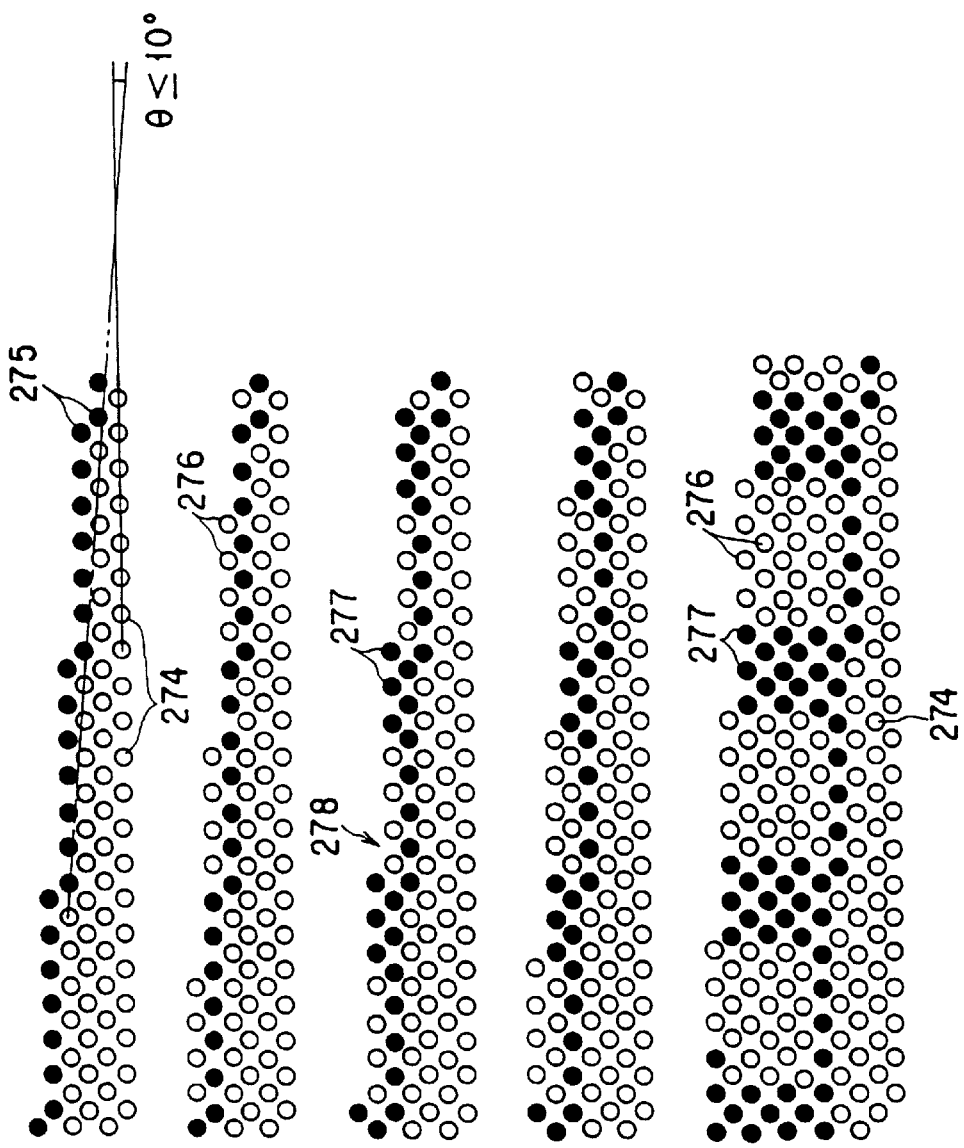

Subsequently, the surface of the substrate is cleaned by any of pickling, reverse sputtering, and vacuum heating, and, as shown in FIG. 83A, Cu is coated to form an undercoating layer. In this case, the undercoating layer is formed while appropriately controlling the substrate temperature.

Subsequently, as shown in FIG. 83B, a magnetic material such as $Ni_{80}Fe_{20}$ is vapor-deposited on the undercoating layer. The magnetic body atoms 276 that have reached the surface of the substrate 274 move around on the substrate 274 and then reach a step portion 278. In the step portion 278, the chemical potential of an atom increases. Therefore, by properly controlling the energy of the magnetic body atoms 276 to be vapor-deposited and the substrate temperature, the vapor-deposited magnetic body atoms 276 can no longer leave the step portion 278 and are coated on the step portion 278. When vapor deposition is continued in this state, the magnetic body atoms 276 form a layer on the step portion 278. As a result, the magnetic layer is formed.

Subsequently, as shown in FIG. 83C, a nonmagnetic conductor material such as Cu is vapor-deposited in the same manner as described above before the layer of the magnetic body atoms 276 covers the whole undercoating layer. The nonmagnetic conductor atoms 277 form a layer in the same way as described above. Subsequently, as shown in FIG. 83D. before the layer of the nonmagnetic conductor atoms 277 covers the magnetic layer, the magnetic material is again vapor-deposited to allow the magnetic body atoms 276 to form a layer. In this manner, vapor deposition of the magnetic material and vapor deposition of the nonmagnetic conductor material are repeatedly performed alternately, thereby forming the layers of the magnetic bodies and the nonmagnetic bodies as shown in FIG. 83E.

Lastly, the magnetic bodies and the nonmagnetic bodies are patterned into the shape of a magnetoresistance effect element, and leads consisting of, e.g., Cu are formed, thereby completing the thin film head shown in FIG. 82.

FIG. 84 is a view for explaining another embodiment of the thin film head according to the ninth invention of the present invention. In the thin film head with this arrangement, the direction of a current extends through the interfacial boundaries between magnetic bodies 271 and nonmagnetic bodies 272 but is not perpendicular to the interfacial boundaries.

In this thin film head, if a magnetoresistance effect element is arranged such that a magnetic field is applied in a direction perpendicular to the longitudinal direction of the magnetoresistance effect element, the response of magnetization of the magnetic bodies has a rotating mode. For this reason, an RF response improves.

In addition, in order to decrease Hs of the thin film head according to the third invention of the present invention, magnetic layers 279 may be formed above and/or below the arrangement of the magnetic bodies 271 and the nonmagnetic bodies 272, as shown in FIGS. 85 to 287.

Figure 88:
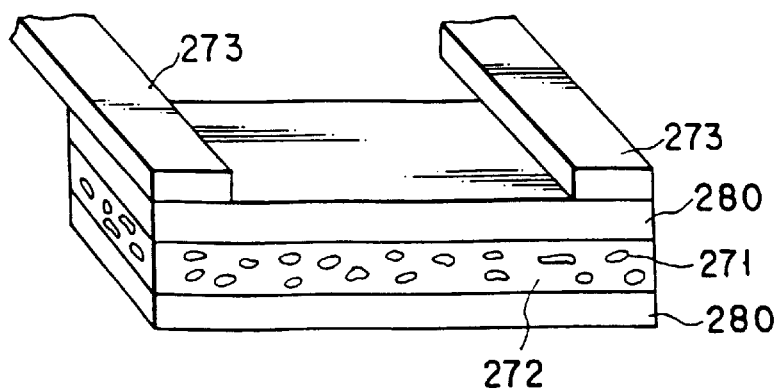

Furthermore, as shown in FIG. 88, two magnetic films 280 may be formed respectively on the surfaces of the nonmagnetic film 272 containing magnetic bodies 271 dispersed in the surface portions. Due to the magnetic bodies 271 thus dispersed, bias magnetic fields can be applied to both surface portions of the film 280. The bodies 271 are anti-ferromagnetic, ferromagnetic, or ferrimagnetic.

Figure 89:
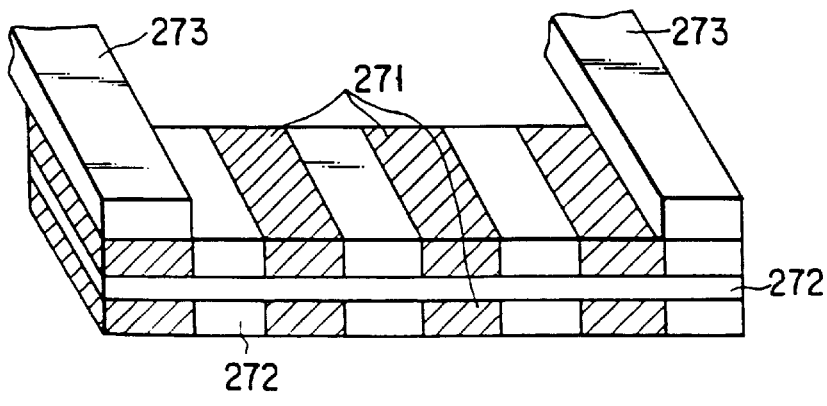
Figure 90:
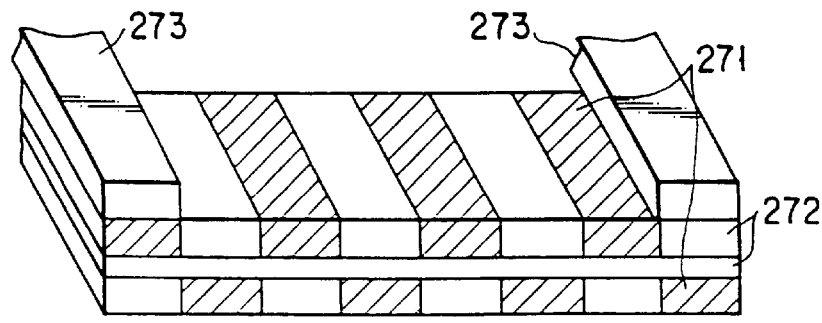

Also, as shown in FIGS. 88 and 89, strip-shaped magnetic strips 271 may be formed in the upper and lower surface portions of the nonmagnetic film 271. The strips 271 are spaced apart from one another and extend parallel to one another. The pattern in which the strips 271 are arranged in the on the upper surface portion of the film 272 may either identical to (FIG. 89) or different from the pattern in which the strips 271 are arranged in the on the lower surface portion of the film 272 (FIG. 90).

Embodiment I

As shown in FIG. 95, the thin film head comprises a substrate 310, a first bias film 311 formed on the substrate 310, a granular magnetic film 312 formed on the fist bias film 311, a second bias film 313 formed on the granular magnetic film 312, and a pair of electrodes 314. Both bias films 311 and 313 have a thickness of 1 to 200 nm each. The granular magnetic film 312 has a thickness of 0.5 to 50 nm and made of a phase-separated alloy. The phase-separated alloy is made of, for example, a ferromagnetic phase such as Co, Ni, Fe or the like and a nonmagnetic phase such as Ag, Au, Cu or the like. The granular magnetic film 312 comprises magnetic regions 312a isolated from one another and nonmagnetic regions 312b connected together.

If necessary, an undercoating film may be interposed between the substrate 10 and the first bias film 311, in order to control the characteristic of the first bias film and the like. Also, a protective film may be formed on the second bias film 313.

To apply stable bias magnetic fields to the granular magnetic film 312, both bias film 311 and 313 should better be thicker than the granular magnetic film 312. Otherwise, the magnetization direction of either bias film would change due to the reaction of the granular magnetic alloy film, and either bias film should fail to apply a stable bias magnetic field to the film 312.

Both bias films 311 and 313 are made of material having higher resistivity than the alloy forming the granular magnetic film 312. More specifically, they are made of an anti-ferromagnetic material such as FeMn, NiO, CrAl, PdMn, NiMn or the like; a soft ferromagnetic material such as amorphous material such as CoZrNb, CoFeSiO and the like, NiFeX (X: a transient metal such as Nb, Ta, Zr, Hf, Mo, w or the like, or a precious metal accounting for 310 to 20 at % at most), or fine-crystal material such as CoZrNbN, FeTaN or the like, containing N or C; or hard magnetic material such as CoCrNi, CoPt, $Fe_2O_3$, or the like. If the bias films 311 and 313 had lower resistance than the granular magnetic film 312, a sense current would readily flow into the bias films 311 and 313, inevitably lowering the resistance changing rate (i.e., sensitivity) of the magnetoresistance effect element. In brief, each bias film must have a resistance higher than the granular magnetic film 312—more preferably, as much higher as possible than the film 312.

The bias film 311 cooperates with the magnetic film 312, generating a first exchange magnetic field. The bias film 313 cooperated with the film 313, generating a second exchange bias magnetic field. The bias films 311 and 313 are formed such that the exchange bias magnetic field have different intensities and is applied in different directions. The intensities of the fields can be independently adjusted by various methods. They may be adjusted by selecting the materials for the bias films 311 and 313. Alternatively, the intensities may be adjusted by altering the grain distribution in the surface portions of the granular magnetic film 312. Still alternatively, the intensities may be adjusted by controlling the interface between the bias film 311 and the magnetic film 312 and the interface between the magnetic film 312 and the bias film 313 (for example, by interposing a thin film having a thickness of one to 10 atoms between the film 312 and each bias film). The directions of the fields can be independently changed by selecting the direction in which a magnetic field is applied during the deposition of either bias film or during the heat treatment after the deposition.

The directions and intensities of the exchange bias fields may assume one of two alternative relationships in the first embodiment (FIG. 95). The first direction-intensity relationship will be described in detail.

The exchange bias fields extend at right angles to each other when a signal magnetic field is zero. The bias film 313 applies the bias magnetic field to that surface portion (hereinafter called "magnetization-locking portion") of the granular magnetic film 312 which contacts the bias film 313, to thereby prevent the magnetization direction of the magnetization-locking portion from rotating substantially when a signal magnetic field is applied to the sensor. On the other hand, the bias film 311 applies the bias magnetic field to that surface portion (hereinafter called "magnetic field-detecting portion") of the film 312 which contacts the bias film 311, to thereby rotate easily the magnetization axis of the magnetization-locking portion when a signal magnetic field is applied to the magnetoresistance effect element. It should be noted that those surface portions of the granular magnetic film 312 which contact the bias films 313 and 311 may function as magnetic field-detecting portion and magnetization-locking portion, respectively.

The bias film 313, which applies the exchange bias magnetic field to the magnetization-locking portion of the film 312, must be made of anti-ferromagnetic material or hard ferromagnetic material, so that the field may prevent the magnetization axis of the magnetization-locking portion from rotating substantially when a signal magnetic field is applied to the magnetoresistance effect element. For the purpose of applying stable bias magnetic fields to the film 312, it is preferable that a film of NiFe or the like, having a very small thickness (0.2 to 3 nm), be interposed between the granular magnetic film 312 and the bias film 313. On the other hand, the bias film 311, which applies the exchange bias magnetic field to the magnetic field-detecting portion of the film 312, must be made of soft ferromagnetic material, so that the signal magnetic field may rotate easily the magnetization direction of the magnetic field-detecting portion when a signal magnetic field is applied to the element.

It is recommendable that a bias magnetic field be applied onto the bias film 311 to keep the bias film 311 single domain state in order to remove Barkhausen noise. This bias magnetic field should have an intensity of the minimum value required for the monopolar magnetization. Should it be excessively intense, it would suppress the rotation of the magnetization of the magnetic field-detecting portion of the film 312 at the time a signal magnetic field is applied, inevitably decreasing the sensitivity of the magnetoresistance effect element.

The bias magnetic field can be applied to the bias film 11 from various bias films, which will be explained with reference to FIGS. 96A to 96C. A first alternative bias film 215, which is shown in FIG. 96A, is made of hard magnetic material or anti-ferromagnetic material, and is formed on the edge portion of a bias film 311 which is broader than the films 312 and 313. A second alternative bias film 315, which is shown in FIG. 96B, is made of hard magnetic material or anti-ferromagnetic material, too, and is located beneath the edge portion of a bias film 311 which is broader than the films 312 and 313. A third alternative bias film 317, which is shown in FIG. 96C, is made of high-Hk or high-Hc ferromagnetic material or anti-ferromagnetic material, and is interposed between the substrate 310 and the bias film 311. The film 317 may be one contacting all or part of the lower surface of the bias film 311.

Furthermore, the bias magnetic field to be applied to the bias film 311 can be generated in a variety of methods. For example, as shown in FIG. 96D, it may be generated by supplying a sense current in the direction of an arrow y, i.e., a direction substantially identical to the direction of the signal magnetic field. Alternatively, as shown in FIG. 96E, it may be an electrostatic bias magnetic field which is generated by providing a hard magnetic film 318 near the magnetoresistance effect element constituted by the films 311, 312 and 313.

The directions in which the bias films 311 and 313 apply the exchange bias magnetic fields can be set in various methods. Tow of these methods will be described, with reference to FIG. 95.

In the first method, a magnetic field is applied in the direction of an arrow x while the bias film 311 is being formed on the substrate 310, and also during the first part of the period during which the granular magnetic film 312 is being formed on the bias film 311. Next, a magnetic field is applied in the direction of the arrow y during the remaining part of the period during which the granular magnetic film 312 is formed on the bias film 311, and also while the bias film 313 is being formed on the granular magnetic film 312. As a result, the bias film 311 applies the exchange bias magnetic field in the direction of the arrow x, whereas the bias film 313 applies the exchange bias magnetic field in the direction of the arrow y. That is, the exchange bias magnetic fields are applied at right angles to each other when a signal magnetic field is zero.

In the second method of setting the directions of applying the exchange bias magnetic fields, the direction of applying a magnetic field is changed by 90° while heat treatments are being performed after all films 311, 312 and 313 have been formed. More precisely stated, either a static magnetic field or a combination of an rotating magnetic field and a static magnetic field is applied in the direction of the arrow x while the films 311, 312 and 313 are being heated, to thereby aligning the easy magnetization axis of the magnetically anisotropic bias film 11 with the direction of the arrow x. Next, while the films 311, 312 and 313 are being cooled (or while these films remain at temperatures slightly higher than a blocking temperature if the bias film 313 is an anti-ferromagnetic one), a static magnetic field is applied in a direction different by 90° from the initial field-applying direction. As a result of this, the bias film 311 applies the exchange bias magnetic field in the direction of the arrow x, whereas the bias film 313 applies the exchange bias magnetic field in the direction of the arrow y. That is, the exchange bias magnetic fields are applied at right angles to each other.

It is desirable that the magnetic grains be closely dispersed in both surface portions of the granular magnetic film 312. Preferably, the distance between any two adjacent grains should be 2 nm or less. This is because, if the magnetic grains are so closely distributed, exchange coupling is achieved among the grains to completely apply the exchange bias magnetic fields at the interface between the bias film 311 and the film 312 and the interface between the film 312 and the bias film 313.

The magnetic grains, particularly those in the magnetic field-detecting portion of the film 312, which contacts the bias film 311, should be preferably tabular and be positioned, each with surfaces extending parallel to the bias film 311. So shaped and positioned, the magnetic grains in the magnetic field-detecting portion can facilitate the rotation of the magnetization direction of the magnetic field-detecting portion which is performed by a signal magnetic field applied to the magnetoresistance effect sensor.

The magnetic grains in the intermediate portion of the granular magnetic film 312, which is located between the magnetization-locking portion and the magnetic field-detecting portion, should preferably be sparsely distributed for two purposes. The first object is to promote spin-dependent scattering, to thereby raise the resistance changing rate by greatly changing the angle between the magnetization axes of the bias films 311 and 313 in accordance with the intensity of the signal magnetic field applied to the magnetoresistance effect element.

In other words, it is desirable that the density of the magnetic grains gradually decrease from the surfaces of the granular magnetic film 312 toward the intermediate portion thereof.

In the magnetoresistance effect element described above in detail, the magnetization is locked in the bias direction at the magnetization-locking portion of the granular magnetic film 312 (i.e., the surface portion contacting the bias film 313), as is best illustrated in FIGS. 97A, 97B and 97C. In contrast, magnetization takes place in the magnetic field-detecting portion of the film 312 (i.e., the surface portion contacting the bias film 313), rotating the magnetization axis of the magnetic field-detecting portion at the same time the magnetization axis of the bias film 311 is rotated by the signal magnetic field applied to the element. More specifically, when the signal magnetic field is a neutral one, the bias films 311 and 313 apply exchange bias magnetic fields which extend at right angles to each other as shown in FIG. 97B. When the signal magnetic field is a positive one, applied in the direction of the arrow y, the bias films 311 and 313 apply exchange bias magnetic fields which extend in the same directions, i.e., the direction of the arrow y, as is illustrated in FIG. 97C. In this case, the spin-dependent scattering diminishes, thereby lowering the resistance of the granular magnetic film 312. When the signal magnetic field is a negative one, applied in the direction opposite to the arrow y, the bias films 311 and 313 apply exchange bias magnetic fields which are anti-parallel to each other as indicated in FIG. 97A. In this case, the spin-dependent scattering is promoted, thereby increasing the resistance of the granular magnetic film 312.

Figure 98:
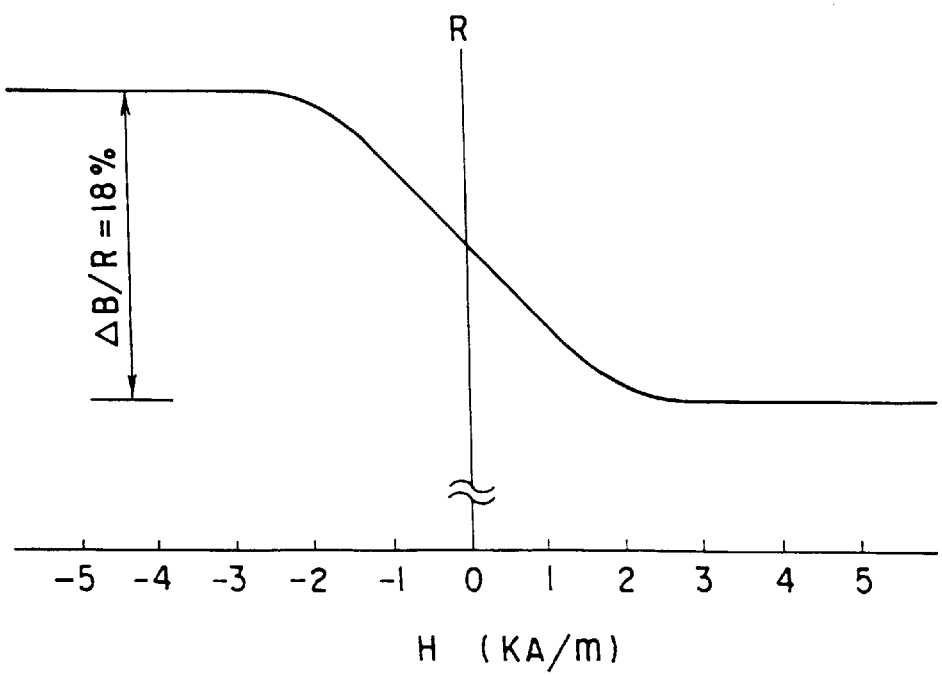
FIGS. 98 and 100 are graphs showing the relationship between the resistance and the magnetic field.

FIG. 98 represents the resistance-magnetic field characteristic of a magnetoresistance effect element which was manufactured in accordance with the first embodiment described above and shown in FIG. 95. This sensor comprised a bias film 311 made of CoZrNb and having a thickness of 15 nm, a bias film 313 made of FeMn and having a thickness of 8 nm, and a granular magnetic film 312 made of $Co_{70}Fe_7Ag_{23}$ alloy and having a thickness of 5 nm. The sensor further comprised a $Ni_{80}Fe_{20}$ film (1.5 nm thick) interposed between the granular magnetic film 312 and the bias film 313, and a Ti protective film (10 nm thick) formed on the bias film 313. The films 311, 312 and 313 were formed into 10 mm×1 mm layers, by means of sputtering employing a metal mask, thus constituting an elongated, multilayered, magnetoresistance effect element. This magnetoresistance effect element was maintained at 400° C. in an rotating magnetic field in a vacuum of 0.002 Pa. Thereafter, the direction of the magnetic field was locked or aligned with the lengthwise direction of the magnetoresistance effect element. Then, the element was cooled. At the temperature of 175° C. the direction of the magnetic field was changed by 90°. The element was further cooled. As a result, the bias film 313 made of FeMn applied an exchanger bias magnetic field in the widthwise direction of the element, whereas the bias film 311 made of CoZrNb applied an exchange bias magnetic field in the lengthwise direction of the element. An electric current was made to flow through the element in the lengthwise direction thereof, thereby testing the element for its resistance-magnetic field characteristic by using four voltage-detecting probes which were spaced at regular intervals of 5 mm. The element was found to exhibit a high resistance changing rate of 18% in a low magnetic field of 2000 A/m, to give a linear response to a neutral signal magnetic field, and to have a large dynamic range (±1500 A/m).

The second alternative direction-intensity relationship, which the exchange bias fields may assume in the first embodiment (FIG. 95), will now be described in detail.

The exchange bias fields are applied in different directions so that the magnetization directions of both surface portions of the granular magnetic film 312 may be rotated by the signal magnetic field applied to the element. It is therefore desirable that the bias films 311 and 313 be soft ferromagnetic material films whose magnetization directions can be rotated easily by a signal magnetic field. The magnetization of the bias films 311 and 313 at the none signal magnetic field can be kept in predetermined direction by various methods. One of these methods is to form a high-Hc or high-Hk ferromagnetic film beneath the bias film 311 or on the bias film 313 and to apply the exchange or magnetostatic magnetic field generated by this ferromagnetic film. Another of these methods is to supply a sense current in the same direction as the signal magnetic field and to apply the magnetic field generated from the sense current. Still another method is to arrange a hard magnetic film near the magnetoresistance effect element (i.e., the films 311, 312 and 313) and to apply the magnetostatic coupling field generated by the hard magnetic film.

Assume that the two exchange bias magnetic fields are applied in directions different by 180°, i.e., the direction of an arrow x in FIG. 99B and the exactly opposite direction, respectively. Then, the surface portions of the granular magnetic film 312 are magnetized anti-parallel to each other when a neutral signal magnetic field applied to the element, whereby the granular magnetic film 312 exhibits the maximum resistance. When a negative signal magnetic field is applied to the element, the surface portions of the film 312 are magnetized in the same direction (i.e., the direction opposite to that of an arrow y) as the direction of the signal magnetic field, as is illustrated in FIG. 99A, whereby the film 312 exhibits the minimum resistance. When a positive signal magnetic field is applied to the element, the surface portions of the film 312 are magnetized in the same direction (i.e., the direction the arrow y) as the direction of the signal magnetic field, as is shown in FIG. 99C, whereby the film 312 exhibits the minimum resistance. As a result, the magnetoresistance effect element has a great resistance changing rate, as can be understood from FIG. 100.

Since the magnetoresistance effect element cannot exhibit a linear response to a neutral signal magnetic field, it is necessary to superpose on the signal magnetic field a bias magnetic field (generally known as "operating-point bias") which extends in the direction of the arrow y. The operating-point bias may be a shunt bias, a current bias or a soft magnetic multi-layered bias, as in the existing thin film head which utilizes anisotropic magnetoresistance effect.

The method of changing the directions of the bias magnetic fields can be the same as the method employed to apply the exchange bias magnetic fields which extend at right angles to each other.

It is desirable that the magnetic grains be closely dispersed in both surface portions of the granular magnetic film 312. Preferably, the distance between any two adjacent grains should be 2 nm or less, so that exchange coupling may be readily attained among the grains to completely apply the exchange bias magnetic fields at the interface between the bias film 311 and the film 312 and the interface between the film 312 and the bias film 313. The magnetic grains in the intermediate portion of the granular magnetic film 312, which is located between the surface portions, should preferably be sparsely distributed, so that the angle between the magnetization axes of the surface portion may be changed greatly by the signal magnetic field applied to the element. Namely, it is desirable that the density of the magnetic grains gradually decrease from the surfaces of the granular magnetic film 312 toward the intermediate portion thereof.

The operating-point bias need not be applied in addition to the signal magnetic field, provided that the bias magnetic field of the bias films 311 and 313 are set at +45° and −45°, or +135° and −135°, respectively, to the axis of the signal magnetic field and thereby intersect at 90° with respect to each other. If the bias magnetic field of both bias films are set so, however, the bias magnetic fields may not be reliably applied due to anti-parallel bias magnetic fields which are generated the films 311, 312 and 313 are made in such a small size and such a shape as preferred for use in a thin film head.

Figure 100:
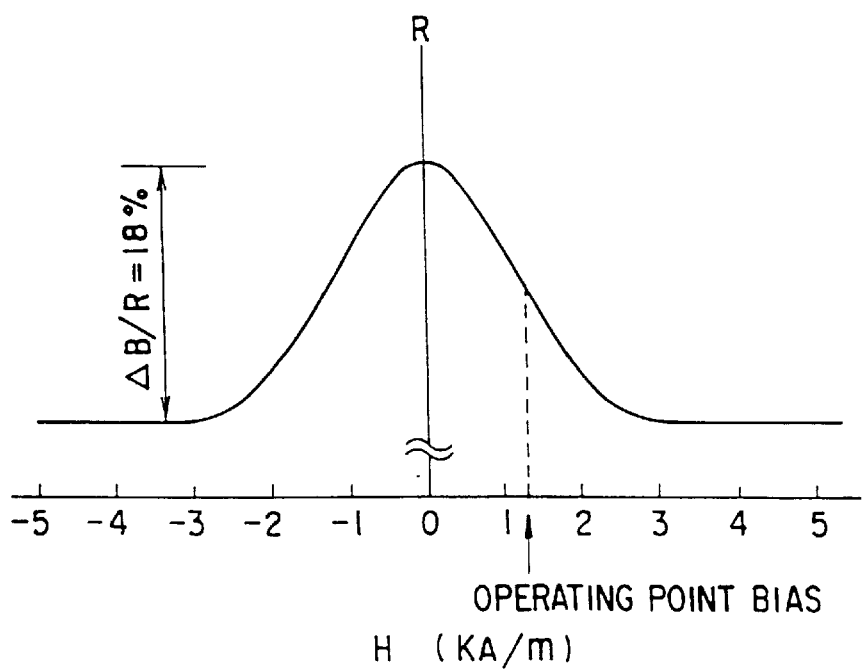

FIG. 100 represents the resistance-magnetic field characteristic of a magnetoresistance effect element of the type shown in FIGS. 99A, 99B, 99C which was actually manufactured. This element comprised bias films 311 and 313, both made of CoZrNb and having a thickness of 15 nm, and a granular magnetic film 312 identical to that incorporated in the element manufactured to have the structure shown in FIG. 95. The films 311, 312 and 313 were maintained at 400° C. in an rotating magnetic field. They are then formed into 4 mm×100 mm layers, by means of sputtering employing a metal mask, each elongated in the direction of the electrostatic magnetic field, thus constituting an elongated, multi-layered, magnetoresistance effect element. Thereafter, an electric current of about 10 mA was made to flow through the element substantially in the same direction as the signal magnetic field. The magnetization directions of the surface portions of the film 312 were thereby locked in anti-parallel relation (that is, in the direction of the arrow x and the opposite direction, respectively). The sensor was found to exhibit a high resistance changing rate of about 10% in a low magnetic field of 2400 A/m.

In the case where the exchange bias fields assume the second alternative direction-intensity relationship described above, the magnetoresistance effect element has but less linear response than the element wherein the exchange bias magnetic fields applied to the surface portions of the film 312 extend at right angles to each other. Nonetheless, the angle between the magnetization directions of the surface portion is changed by the signal magnetic field, twice as much as in the case where the bias magnetic fields extend at right angles. This is because the magnetization directions of both, not only one, of the surface portions of the granular magnetic film 312 rotate. As a result, the element exhibits twice as high a sensitivity to the signal magnetic field.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A thin film magnetic head comprising:

magnetoresistance effect element which includes a first magnetic film, a second magnetic film, and a nonmagnetic film sandwiched between the first and second magnetic films, wherein a magnetization of the second magnetic film is essentially locked; and leads connected to the magnetoresistance effect element and providing a sense current to the magnetoresistance effect element;

wherein a flowing direction of a sense current for sensing a resistance change is chosen so that a direction of a magnetic field at the second magnetic film caused by the sense current is substantially the same as that of the locked-magnetization of the second magnetic film.

2. The head according to claim 1, wherein the second magnetic film is disposed over the first magnetic film.

3. The head according to claim 1, wherein the first magnetic film is disposed over the second magnetic film.

4. The head according to claim 1, further comprising an anti-ferromagnetic film disposed on the second magnetic film.

5. The head according to claim 4, wherein the sense current is chosen so that magnetic field at the interface between the antiferromagnetic film and the locked film generated by the sense current is essentially parallel to the magnetization of the locked film.

6. The head according to claim 4, wherein the second magnetic film is directly in contact with the antiferromagnetic film.

7. The head according to claim 1, further comprising a pair of gap layers and a pair of shield layers, and the pair of gap layers and the pair of shield layers sandwich the magnetoresistance effect element from upper and lower sides to form a shield type magnetic head.

8. The head according to claim 1, further comprising leads connected to the magnetoresistance effect element, wherein a distance between the leads is smaller than the width of the first magnetic film.

9. The head according to claim 1, wherein at least a portion of the first magnetic film, which essentially responds to a signal magnetic field, extends to a medium-facing surface in a direction which is the same as that of the signal magnetic field.

10. The head according to claim 1, wherein the second magnetic film is disposed on an anti-ferromagnetic film, and the anti-ferromagnetic film and the second magnetic film are exchange coupled.

11. A magnetic reproducing apparatus comprising:

a reproducing head comprising a magnetoresistance effect element which includes a first magnetic film, a second magnetic film, and a nonmagnetic film sandwiched between the first and second magnetic films, wherein a magnetization of the second magnetoelectric film is essentially locked, and a flowing direction of a sense current for sensing a resistance change is chosen so that a direction of a magnetic field at the second magnetic film caused by the sense current is substantially the same as that of the locked-magnetization of the second magnetic film; and a driver circuit which provides the sensing current to the magnetoresistance effect element.

12. The apparatus according to claim 11, wherein the sensing current provided to the magnetoresistance effect element is not less than $10^6$ A/cm$^2$.

13. A thin film magnetic head comprising;

a magnetoresistance effect element which includes a first magnetic film, a second magnetic film, and a nonmagnetic film sandwiched between the first and the second magnetic films, wherein a magnetization of the second magnetic film is essentially locked; and leads connected to the magnetoresistance effect element and providing a sense current to the magnetoresistance effect element;

wherein a flowing direction of the current provided by the leads to the magnetoresistance film is chosen so that a direction of a magnetic field at the second magnetic film caused by the current is substantially the same as that of the locked-magnetization of the second magnetic film.

14. The head according to claim 13, wherein the second magnetic film is disposed over the first magnetic film.

15. The head according to claim 13, wherein the first magnetic film is disposed over the second magnetic film.

16. The head according to claim 13, further comprising an anti-ferromagnetic film disposed on the second magnetic film.

17. The head according to claim 13, further comprising a pair of gap layers and a pair of shield layers, and the pair of gap layers and the pair of shield layers sandwich the magnetoresistance effect element from upper and lower sides to form a shield type magnetic head.

18. The head according to claim 13, further comprising wherein a distance between the leads is smaller than the width of the first magnetic film.

19. The head according to claim 13, wherein at least a portion of the first magnetic film, which essentially responds to a signal magnetic field, extends to a medium-facing surface in a direction which is the same as that of the signal magnetic field.

20. The head according to claim 13, wherein the second magnetic film is disposed on an anti-ferromagnetic film, and the anti-ferromagnetic film and the second magnetic film are exchange coupled.

21. The head according to claim 13, wherein the second magnetic film is directly in contact with the antiferromagnetic film.

22. A magnetic reproducing apparatus comprising:

a reproducing head comprising a magnetoresistance effect element which includes a first magnetic film, a second magnetic film, and a nonmagnetic film sandwiched between the first and the second magnetic films, wherein a magnetization of the second magnetic film is essentially locked; and leads connected to the magnetoresistance effect element and providing a current to the magnetoresistance effect element wherein a flowing direction of the current provided by the leads to the magnetoresistance effect element is chosen so that a direction of a magnetic field at the second magnetic film caused by the current is substantially the same as that of the locked-magnetization of the second magnetic film; and a driver circuit which provides the current to the magnetoresistance effect element through the leads.

* * * * *